United States Patent
Maeda et al.

(10) Patent No.: US 10,728,889 B2
(45) Date of Patent: Jul. 28, 2020

(54) COMMUNICATION SYSTEM

(71) Applicant: Mitsubishi Electric Corporation, Tokyo (JP)

(72) Inventors: Miho Maeda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/955,863

(22) Filed: Apr. 18, 2018

(65) Prior Publication Data

US 2018/0242311 A1    Aug. 23, 2018

Related U.S. Application Data

(63) Continuation of application No. 15/649,219, filed on Jul. 13, 2017, which is a continuation of application
(Continued)

(30) Foreign Application Priority Data

Apr. 1, 2011    (JP) .................................. 2011-081799

(51) Int. Cl.
*H04W 72/04* (2009.01)
*H04B 17/327* (2015.01)
(Continued)

(52) U.S. Cl.
CPC ...... *H04W 72/0426* (2013.01); *H04B 17/327* (2015.01); *H04W 52/143* (2013.01);
(Continued)

(58) Field of Classification Search
CPC ............ H04W 72/0426; H04W 72/04; H04W 52/146; H04W 52/244; H04W 52/143; H04W 52/40; H04B 17/327; H04B 7/022
(Continued)

(56) References Cited

U.S. PATENT DOCUMENTS

| 5,396,645 A | 3/1995 | Huff |
| 6,201,972 B1 | 3/2001 | Kojiro et al. |

(Continued)

FOREIGN PATENT DOCUMENTS

| CN | 101600246 A | 12/2009 |
| EP | 2 230 870 A1 | 9/2010 |

(Continued)

OTHER PUBLICATIONS

European Office Action dated Apr. 17, 2018 in Patent Application No. 12 767 232.7, 6 pages.

(Continued)

*Primary Examiner* — Chi Tang P Cheng

(74) *Attorney, Agent, or Firm* — Oblon, McClelland, Maier & Neustadt, L.L.P.

(57) ABSTRACT

User equipment includes an antenna, a controller, a transmitter, and a receiver. The transmitter sends a first radio frequency signal for communication with a primary cell to the antenna according to a first timing advance set by the controller, and sends a second radio frequency signal for communication with a secondary cell to the antenna according to a second timing advance set by the controller. The receiver sends received data to the controller including information regarding at least one of the first timing advance and the second timing advance. The first timing advance indicating a first uplink transmission timing alignment value and the second timing advance indicating a second uplink transmission timing alignment value.

5 Claims, 28 Drawing Sheets

Related U.S. Application Data

No. 15/181,129, filed on Jun. 13, 2016, now Pat. No. 9,730,213, which is a continuation of application No. 14/009,226, filed as application No. PCT/JP2012/057735 on Mar. 26, 2012, now Pat. No. 9,392,599.

(51) Int. Cl.

| | | |
|---|---|---|
| *H04W 52/14* | (2009.01) | |
| *H04W 52/24* | (2009.01) | |
| *H04W 52/40* | (2009.01) | |
| *H04W 56/00* | (2009.01) | |
| *H04B 7/022* | (2017.01) | |

(52) U.S. Cl.
CPC ....... *H04W 52/146* (2013.01); *H04W 52/244* (2013.01); *H04W 52/40* (2013.01); *H04W 56/0045* (2013.01); *H04W 72/04* (2013.01); *H04B 7/022* (2013.01)

(58) Field of Classification Search
USPC .............................. 370/328, 329, 332, 437
See application file for complete search history.

(56) References Cited

U.S. PATENT DOCUMENTS

| | | | |
|---|---|---|---|
| 2001/0044306 A1 | 11/2001 | Shimono et al. | |
| 2003/0157921 A1 | 8/2003 | Kekki et al. | |
| 2004/0246923 A1* | 12/2004 | Achard | H04W 36/0072 370/331 |
| 2009/0073916 A1 | 3/2009 | Zhang et al. | |
| 2009/0305736 A1 | 12/2009 | Omori | |
| 2010/0278141 A1 | 11/2010 | Choi-Grogan et al. | |
| 2011/0053585 A1 | 3/2011 | Otonari | |
| 2011/0122812 A1* | 5/2011 | Jeong | H04W 36/18 370/328 |
| 2011/0141931 A1 | 6/2011 | Bae | |
| 2011/0189988 A1 | 8/2011 | Morimoto et al. | |
| 2011/0280223 A1 | 11/2011 | Maeda et al. | |
| 2012/0044922 A1 | 2/2012 | Ishii | |
| 2012/0142334 A1 | 6/2012 | Sato et al. | |
| 2012/0202554 A1* | 8/2012 | Seo | H04W 52/146 455/522 |

FOREIGN PATENT DOCUMENTS

| | | | |
|---|---|---|---|
| EP | 2 293 626 A1 | 3/2011 | |
| EP | 2 427 009 A1 | 3/2012 | |
| JP | 11-509069 A | 8/1999 | |
| JP | 2000-287250 | 10/2000 | |
| JP | 2002-369244 | 12/2002 | |
| JP | 2006-74468 | 3/2006 | |
| JP | WO 2009119857 A1 * | 10/2009 | ............ H04W 36/04 |
| JP | 2010-45547 | 2/2010 | |
| JP | 2010-263449 A | 11/2010 | |
| JP | 2011-55194 | 3/2011 | |
| JP | 2012-517760 A | 8/2012 | |
| WO | WO 2010/087172 A1 | 8/2010 | |
| WO | WO 2010/093198 A2 | 8/2010 | |
| WO | WO 2010/106763 A1 | 9/2010 | |
| WO | WO 2010/126105 A1 | 11/2010 | |
| WO | WO 2011/018906 A1 | 2/2011 | |

OTHER PUBLICATIONS

Office Action dated Apr. 25, 2018 in Chinese Patent Application No. 201280016475.9 with unedited computer generated English translation.

Office Action dated Oct. 25, 2018 in Chinese Patent Application No. 201280016475.9 (with unedited computer generated English translation).

Notice of Reexamination dated Jul. 17, 2018 in Chinese Patent Application No. 201280016475.9 (with unedited computer generated English translation), 9 pages.

International Search Report dated Jun. 26, 2013 in Application No. PCT/JP2012/057735.

International Preliminary Report on Patentability and Written Opinion dated Oct. 17, 2013 in Application No. PCT/JP2012/057735.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description: Stage 2 (Release 10)", 3GPP TS 36.300 V10.2.0 (Dec. 2010), 2010, pp. 1-200.

"3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.0.0 (Dec. 2010), 2010, pp. 1-33.

Extended European Search Report dated Dec. 1, 2014 in Patent Application No. 12767232.7.

Katsuhiko Hiramatsu, et al., "Technology evolutions in LTE/LTE-advanced and its applications" Communication Systems (ICCS), 2010 IEEE International Conference on, XP031848284, Nov. 17, 2010, pp. 161-165.

Japanese Office Action dated Sep. 29, 2015 in Japanese patent application No. 2013-508813 with partial English translation, 9 pages.

Combined Office Action and Search Report dated Jul. 25, 2016 in Chinese Patent Application No. 201280016475.9 with partial English translation.

Office Action dated Jan. 24, 2017 in Japanese Patent Application No. 2016-080068 (with partial English language translation).

Chinese Office Action dated Apr. 10, 2017, issued in Chinese Patent Application No. 201280016475.9 (with English translation).

Office Action dated Aug. 28, 2017 in Chinese Patent Application No. 201280016475.9 (with English language translation).

Extended European Search Report dated Dec. 14, 2018 in Application No. 18202662.5.

Ericsson et al., "Comments relating to Timing Advance: Reply LS on RAN2 Status on Carrier Aggregation", TSG-RAN Working Group 4 (Radio) meeting #52, R4-093052, Shenzhen, China, Aug. 24-28, 2009.

Nokia Siemens Networks, "Carrier Aggregation and Timing Advance", 3GPP TSG-RAN WG2 Meeting #67bis, R2-095519, Miyazaki, Japan, Oct. 12-16, 2009.

Texas Instruments, "Enabling Coordinated Multi-Point Reception", 3GPP TSG RAN WG1 #56bis, R1-091293, Seoul, Korea, Mar. 23-27, 2009.

Office Action dated Jan. 31, 2019 in Chinese Application No. 201280016475.9 (w/English translation).

Office Action dated Aug. 26, 2019 in Indian Application No. 7826/CHENP/2013.

* cited by examiner

F I G. 1
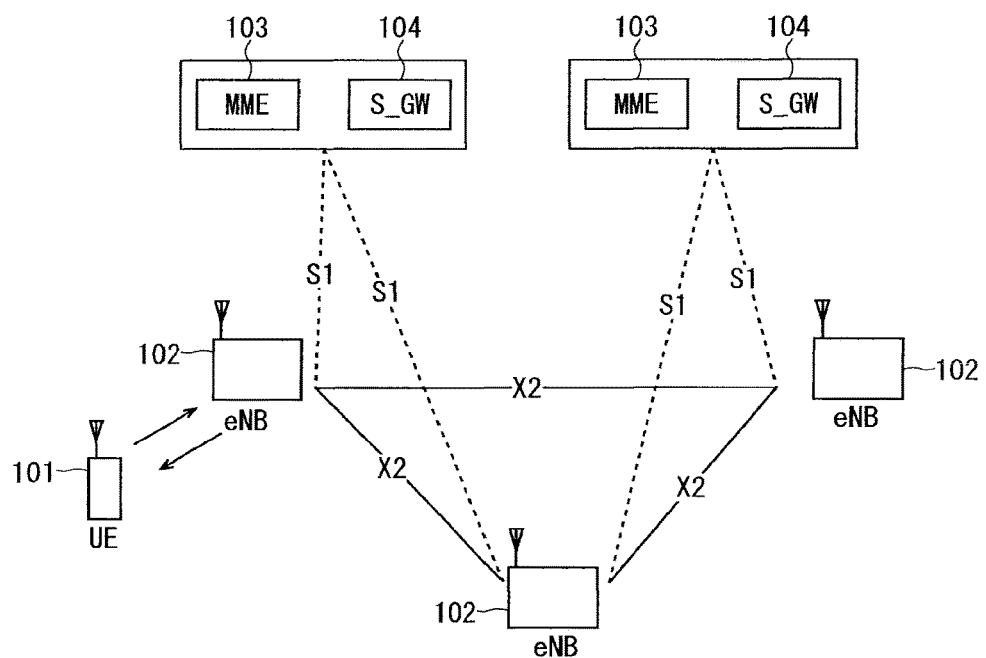

F I G. 4
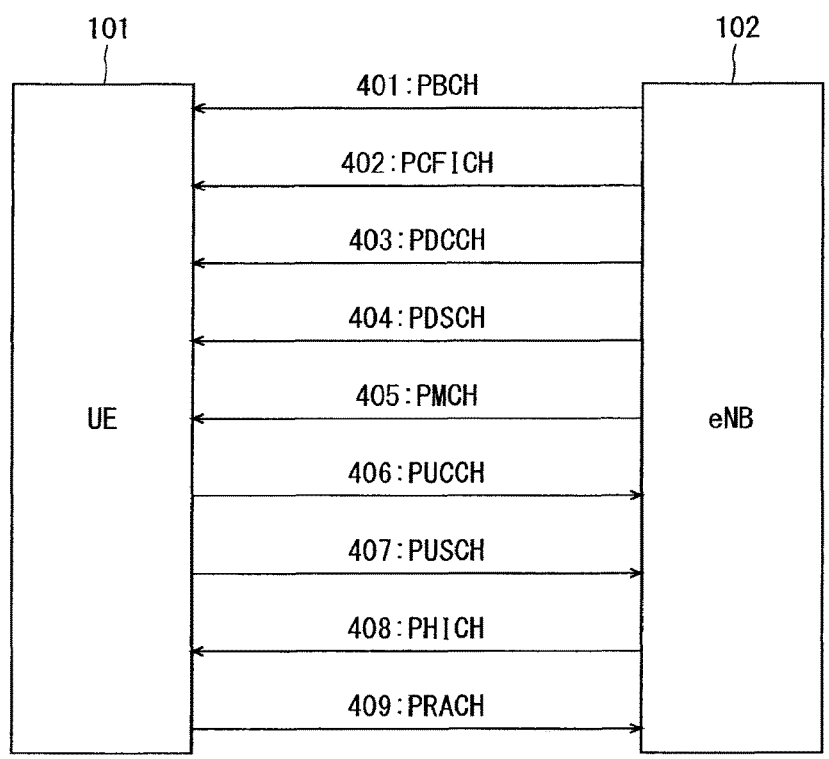

F I G. 5
(A)
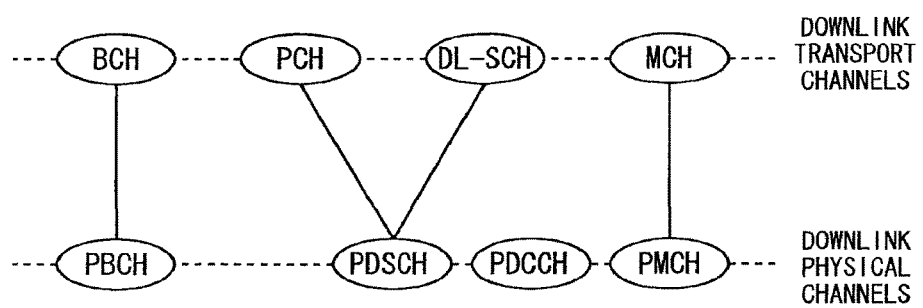
(B)
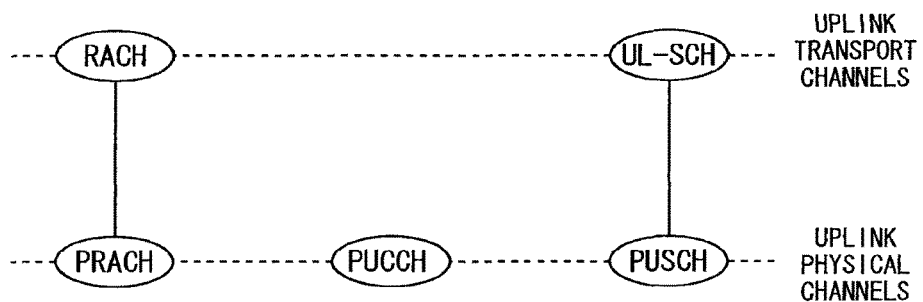

FIG. 6
(A)
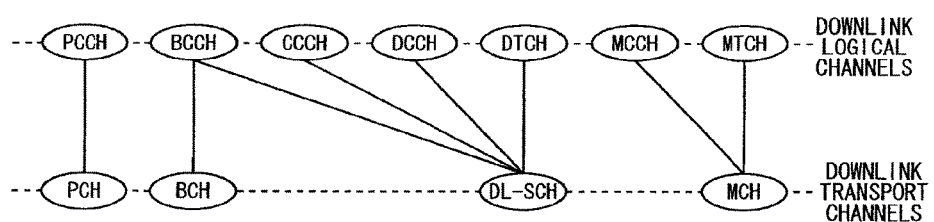
(B)
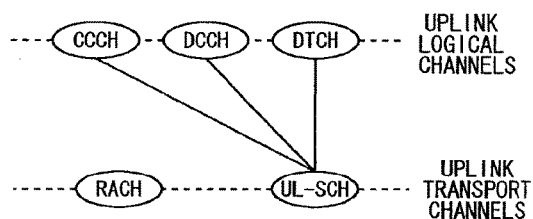

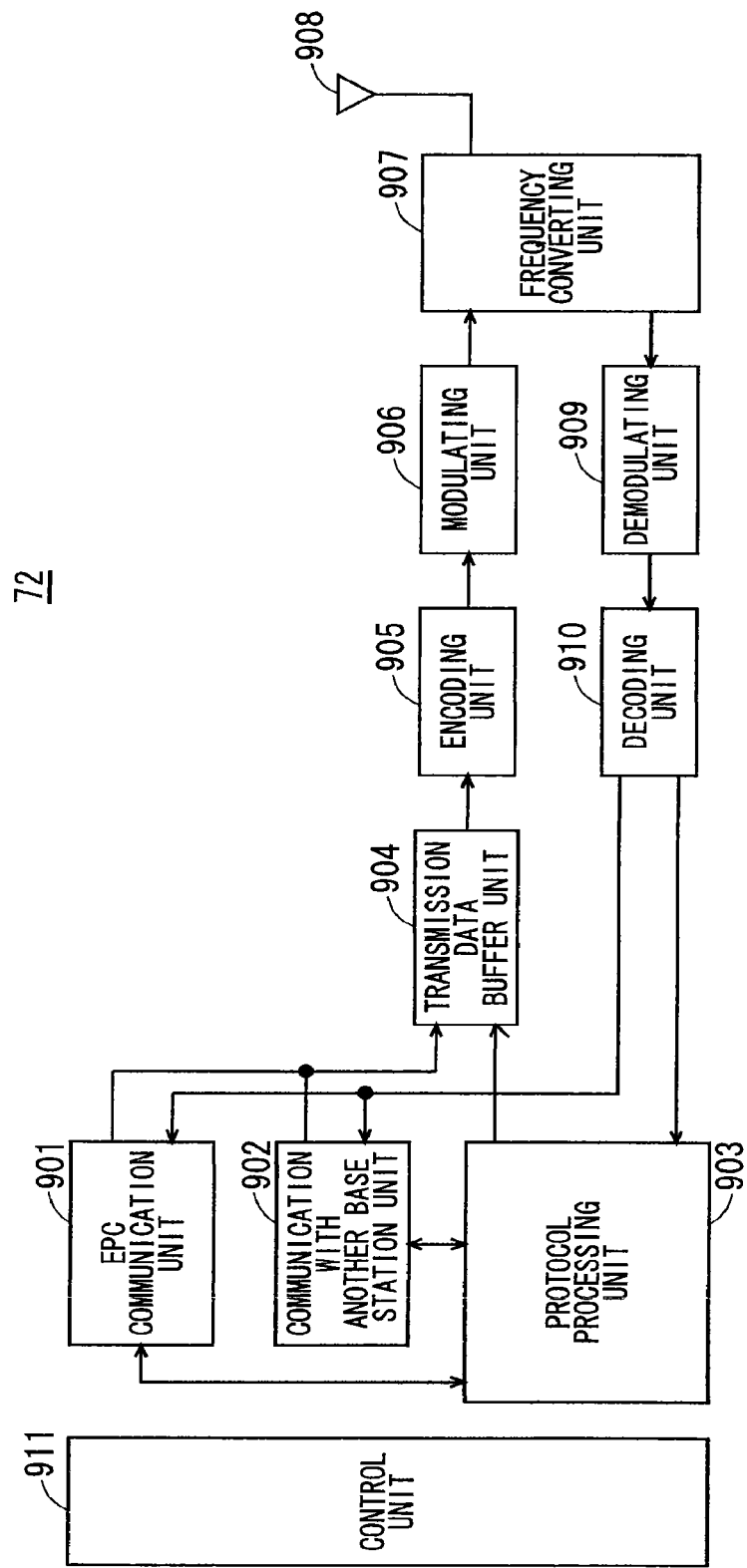

F I G. 1 0
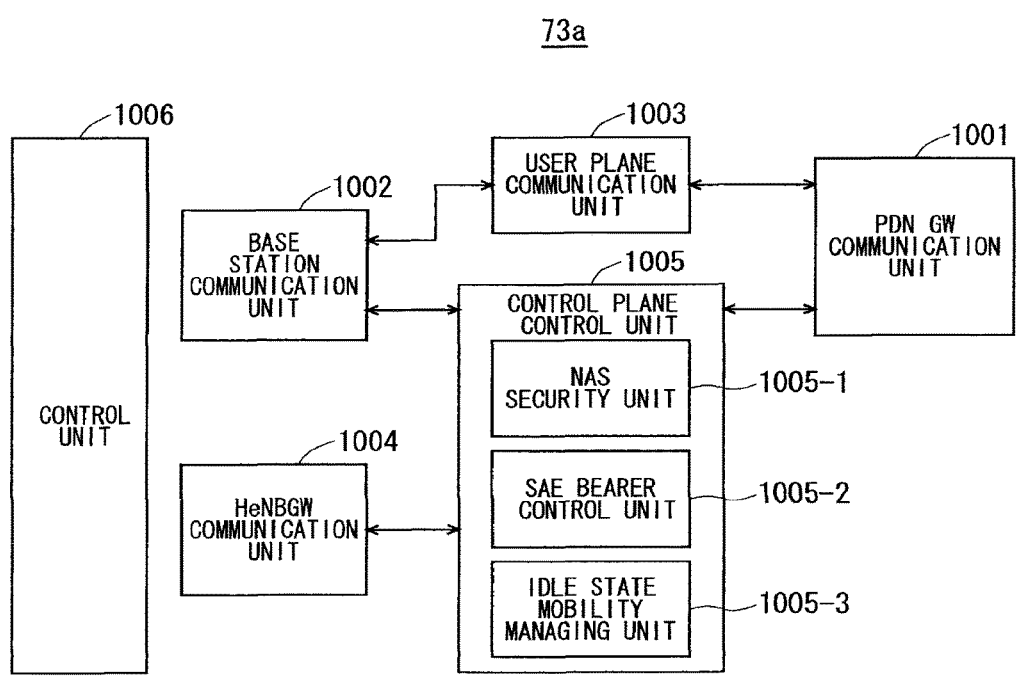

F I G. 1 1
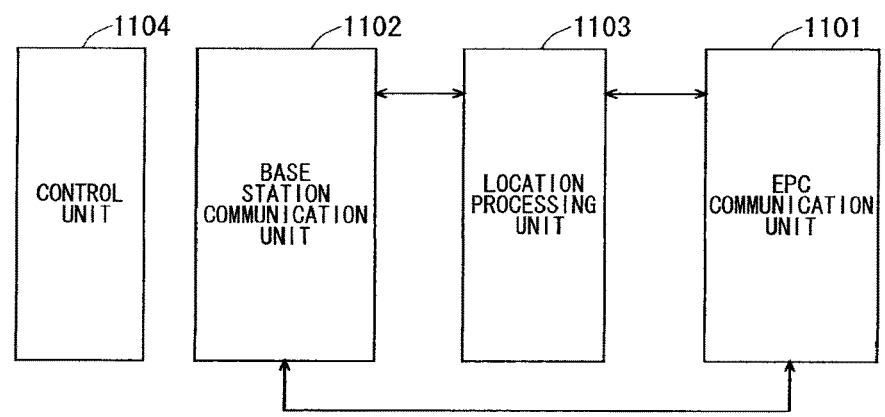

F I G. 1 5
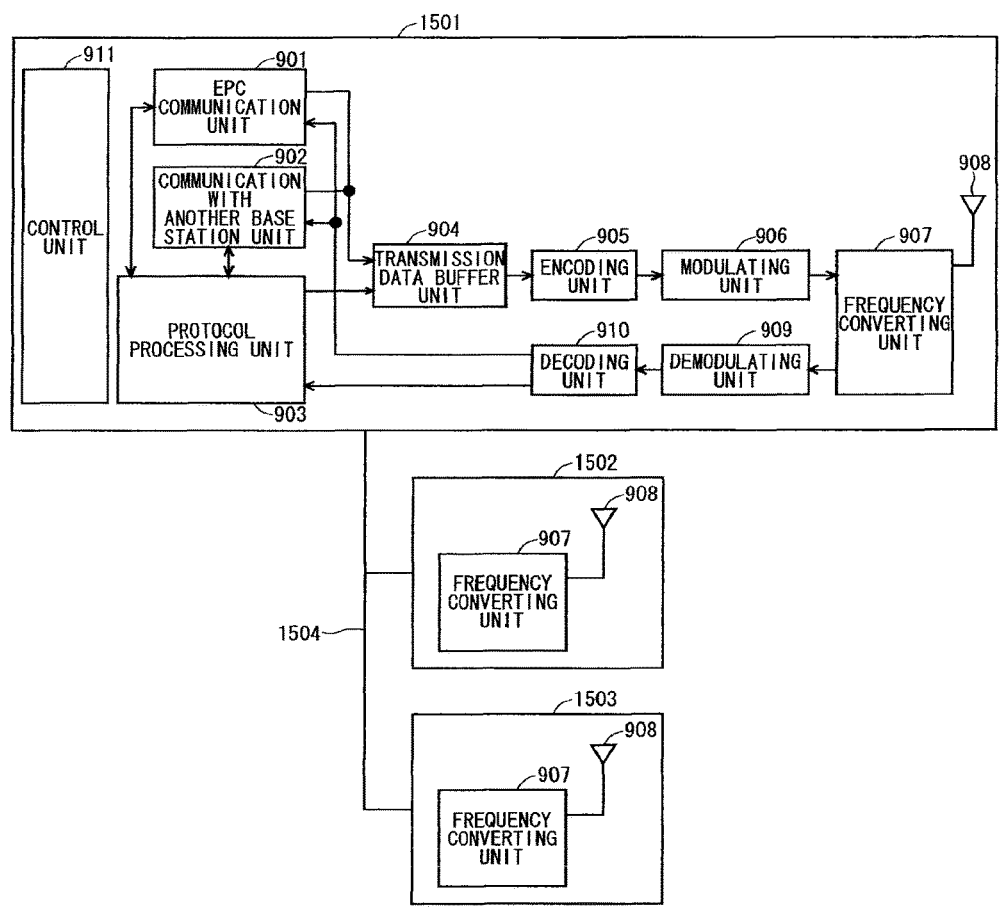

F I G . 1 8
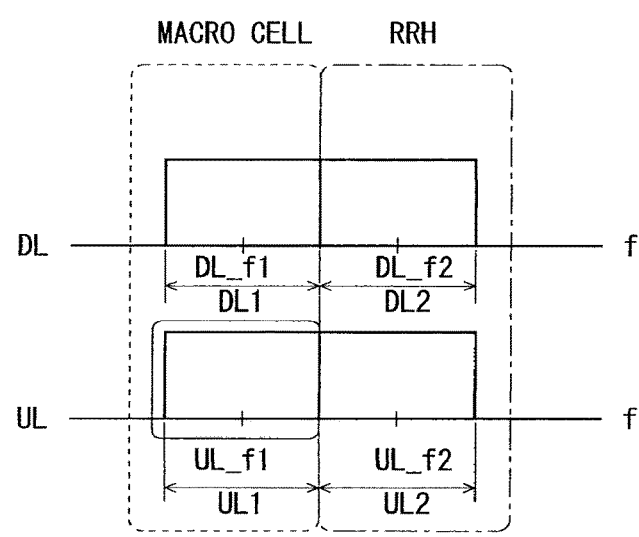

F I G. 1 9
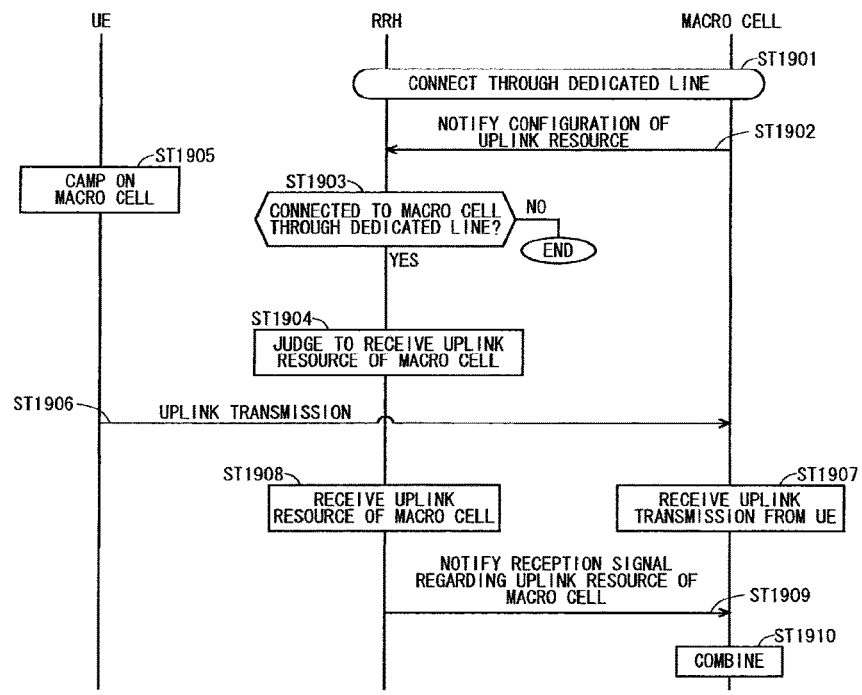

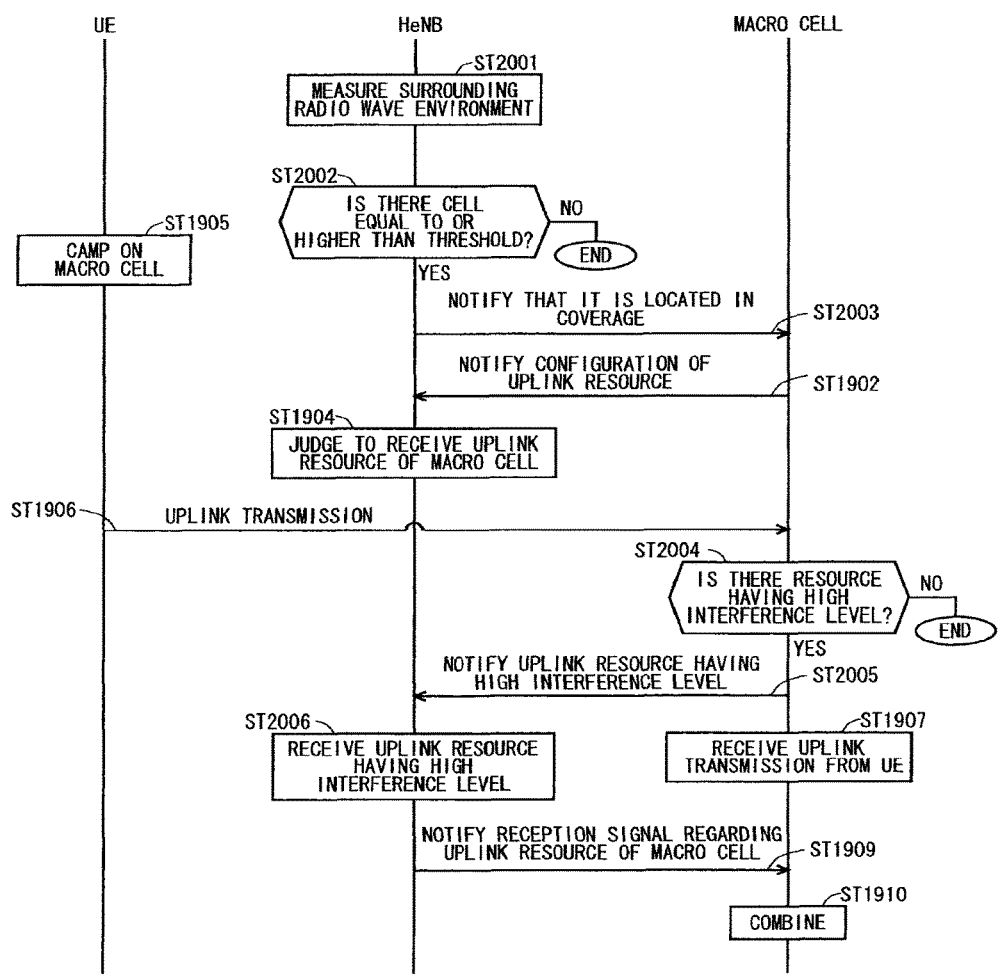

F I G. 2 2
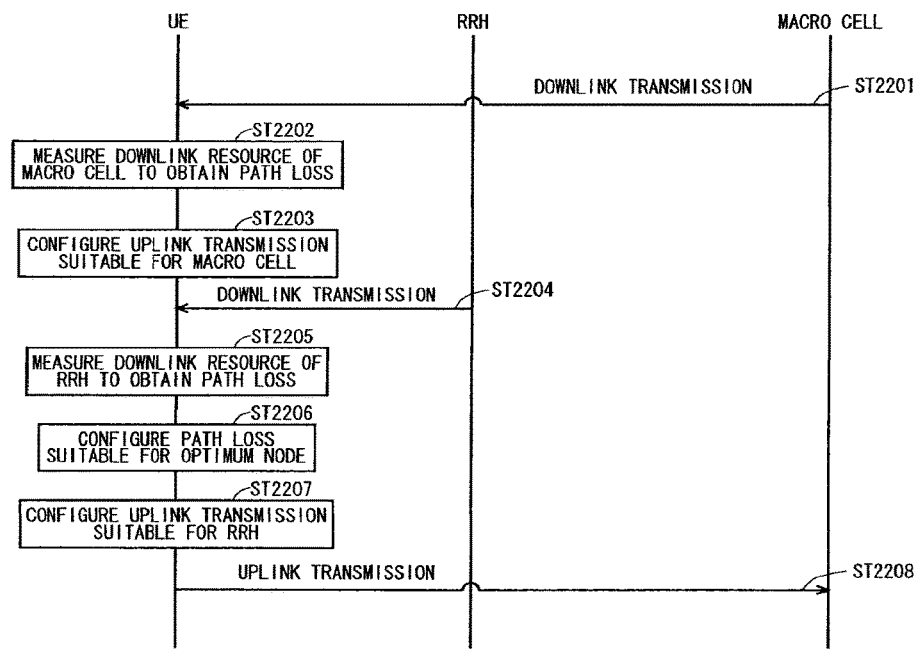

F I G . 2 3
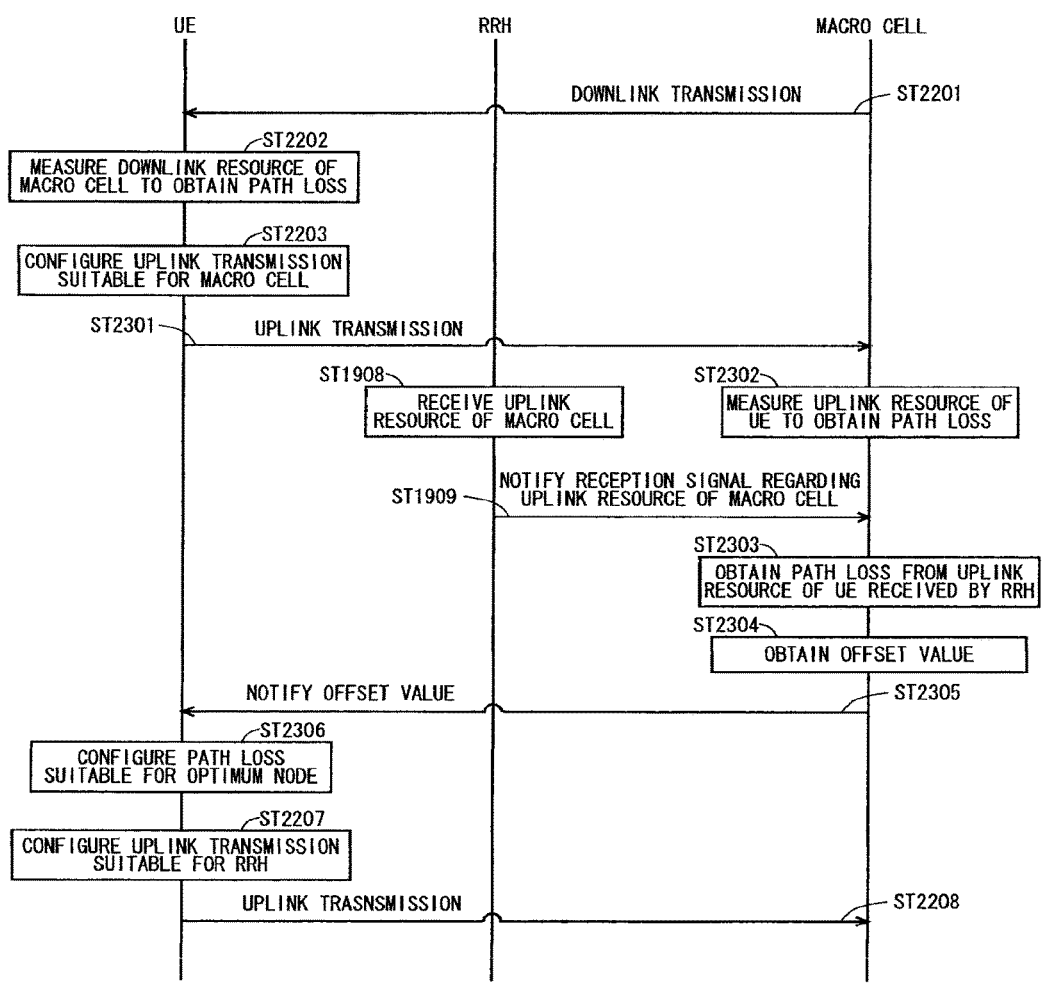

F I G . 2 4
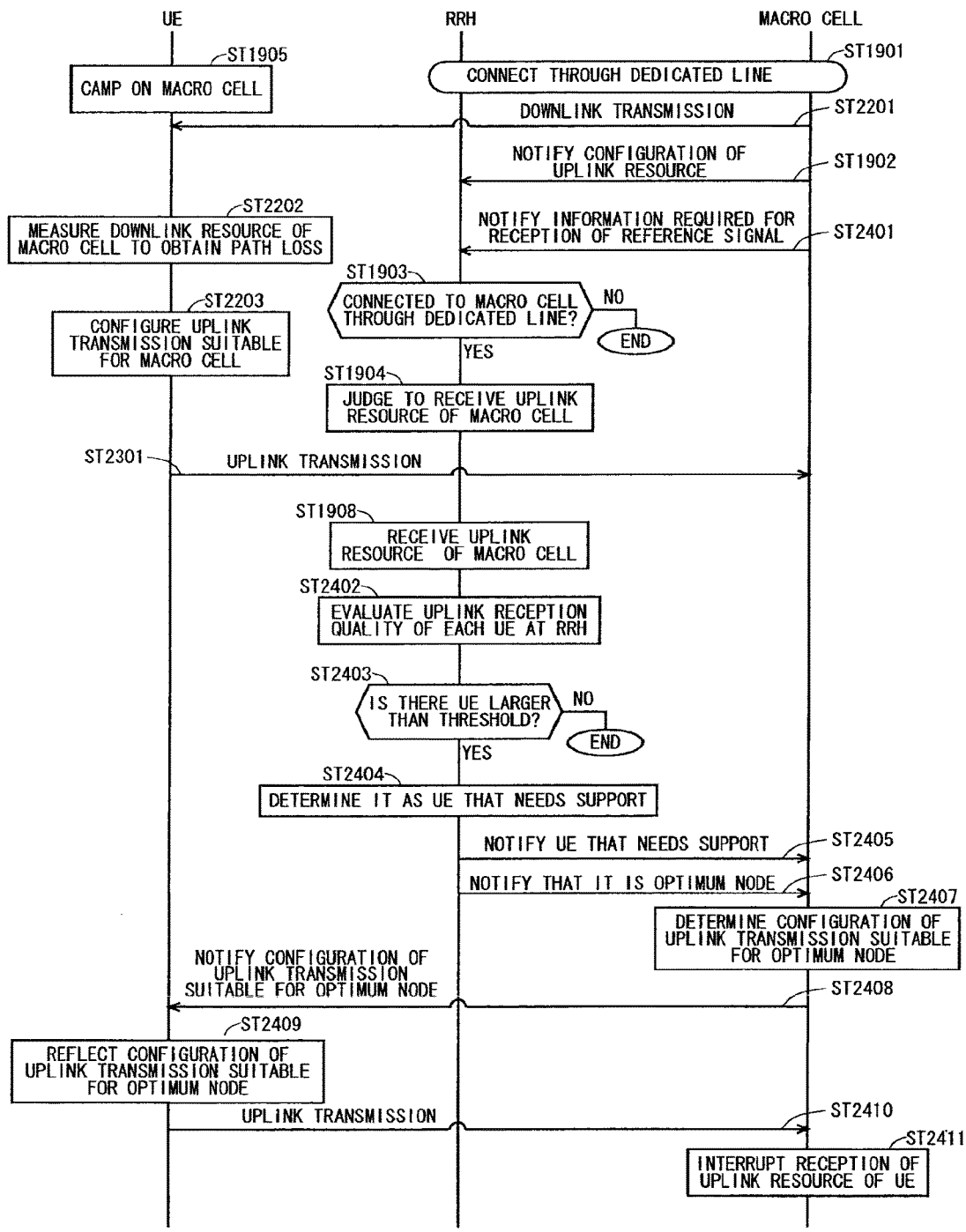

F I G. 2 6
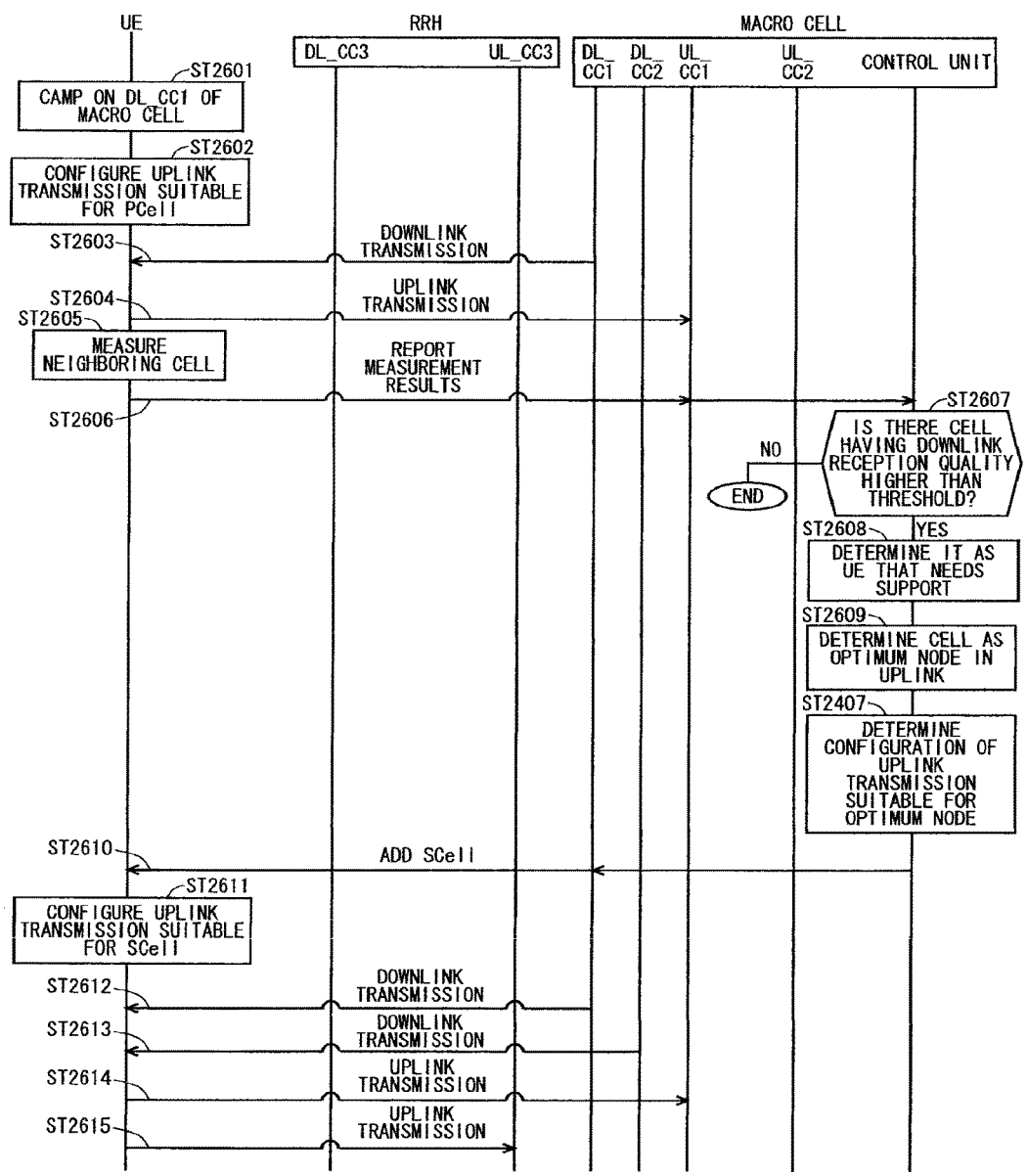

F I G . 2 8
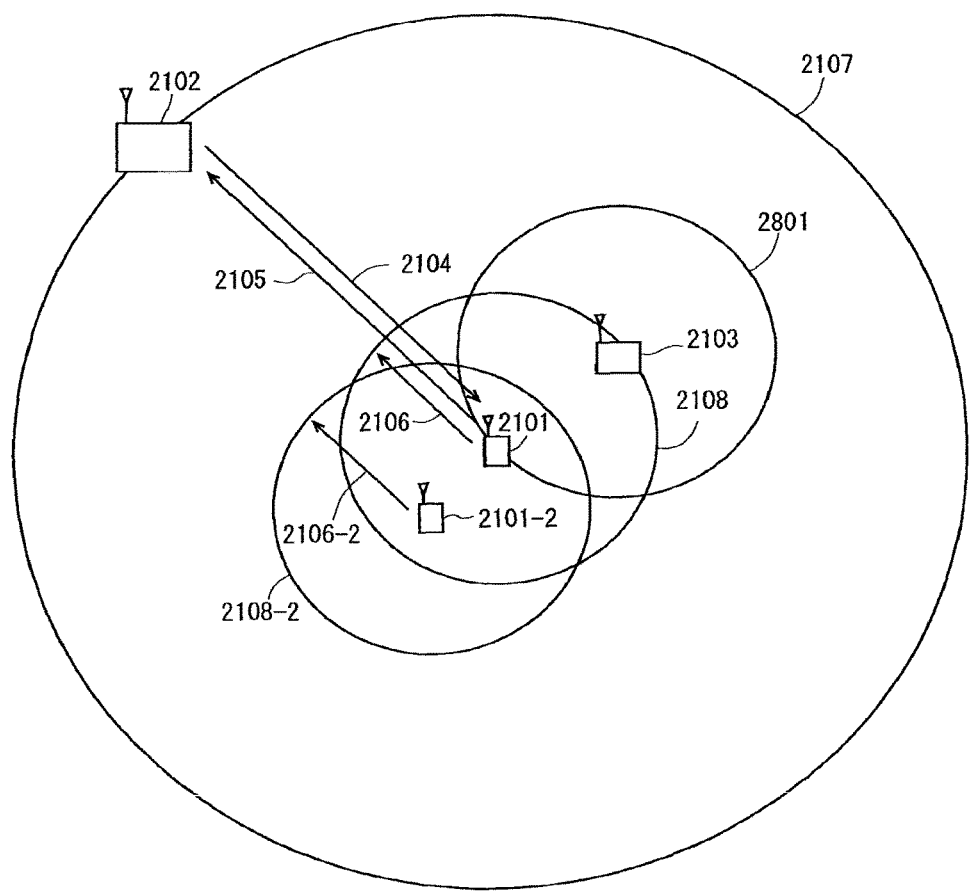

COMMUNICATION SYSTEM

CROSS-REFERENCE TO RELATED APPLICATIONS

This is a continuation of U.S. patent application Ser. No. 15/649,219, filed on Jul. 13, 2017, which is a continuation of U.S. patent application Ser. No. 15/181,129 (now U.S. Pat. No. 9,730,213), filed Jun. 13, 2016, which is a continuation of U.S. patent application Ser. No. 14/009,226 (now U.S. Pat. No. 9,392,599), filed Oct. 1, 2013, which is a National Stage Application of PCT Application No. PCT/JP12/057735, filed Mar. 26, 2012, which claims priority to Japanese Patent Application No. 2011-081799, filed Apr. 1, 2011. The entire content of U.S. patent application Ser. No. 14/009,226 is incorporated herein by reference.

TECHNICAL FIELD

The present invention relates to a communication system in which a base station device performs radio communication with a plurality of communication terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, new communication systems referred to as long term evolution (LTE) regarding radio areas and system architecture evolution (SAE) regarding the overall system configuration including a core network (merely referred to as network as well) as communication systems independent of W-CDMA is studied in 3GPP. This communication system is also referred to as 3.9 generation (3.9 G) system.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz per base station. Further, differently from the W-CDMA, circuit switching is not provided but a packet communication system is only provided in the LTE.

The LTE is defined as a radio access network independent of the W-CDMA network because its communication system is configured by a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system.

Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_Idle and RRC_CONNECTED. In RRC_IDLE, public land mobile network (PLMN) selection, system information (SI) broadcast, paging, cell re-selection, mobility and the like are performed. In RRC_CONNECTED, the user equipment has RRC connection, is capable of transmitting/receiving data to/from a network, and performs, for example, handover (HO) and measurement of a neighbor cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, a radio frame including the MBSFN subframes is allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod=radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group cell. (CSG cell) as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation of DL-SCH (downlink shared channel that is one of the transport channels shown in FIG. 5 described below) and PCH (paging channel that is one of the transport channels shown in FIG. 5), and HARQ information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal is a known symbol in a mobile communication system. The physical layer measurement objects of a user equipment include reference symbol received power (RSRP).

The transport channels described in Non-Patent Document 1 (Chapter 5) are described with reference to FIG. 5. FIG. 5 is a diagram illustrating transport channels used in the LTE communication system. FIG. 5(A) shows mapping between a downlink transport channel and a downlink physical channel. FIG. 5O(B) shows mapping between an uplink transport channel and an uplink physical channel.

Downlink transport channels are described. A broadcast channel (BCH) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in FIG. 5(B) is limited to control information. The RACH involves a collision risk. The RACH is mapped to the physical random access channel (PRACH).

The HARQ is described. The HARQ is the technique for improving the communication quality of a channel by combination of automatic repeat request and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

Logical channels described in Non-Patent Document 1 (Chapter 6) are described with reference to FIG. 6. FIG. 6 is a diagram illustrating logical channels used in an LTE communication system. FIG. 6(A) shows mapping between a downlink logical channel and a downlink transport channel. FIG. 6(B) shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting changes of the paging information and system information. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network.

In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel for point-to-point transmission of the dedicated control information between a user equipment and a network. The DCCH is used when a user equipment is in RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of the user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

GCI represents a global cell identity. A closed subscriber group cell (CSG cell) is introduced in the LTE, long term evolution advanced (LTE-A) described below, and universal mobile telecommunication system (UMTS). The CSG is described below (see Chapter 3.1 of Non-Patent Document 3). The closed subscriber group cell (CSG cell) is a cell in which subscribers who are allowed to use are specified by an operator (hereinafter, referred to as "cell for specific subscribers" in some cases).

The specified subscribers are allowed to access one or more cells of a public land mobile network (PLMN). One or more cells in which the specified subscribers are allowed access are referred to as "CSG cell(s)". Note that access is restricted in the PLMN. The CSG cell is part of the PLMN that broadcasts a specific CSG identity (CSG ID; CSG-ID) and broadcasts "TRUE" by CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling (calling of user equipments) even in an idle state. An area for tracking locations of user equipments is referred to as a tracking area.

A CSG whitelist is a list that may be stored in a universal subscriber identity module (USIM) in which all CSG IDs of the CSG cells to which the subscribers belong are recorded. The CSG whitelist is merely referred to as whitelist or is referred to as an allowed CSG list in some cases. The MME performs access control for the UEs accessing through CSG cells (see Chapter 4.3.1.2 of Non-Patent Document 9). Specific examples of the access by user equipments include attach, combined attach, detach, service request, and tracking area update procedure (see Chapter 4.3.1.2 of Non-Patent Document 9).

Service types of a user equipment in an idle state are described below (see Chapter 4.3 of Non-Patent Document 3). The service types of a user equipment in an idle state are classified into a limited service (also referred to as closed service), a normal service, and an operator service. The limited service includes emergency calls, an earthquake and tsunami warning system (ETWS), and a commercial mobile alert system (CMAS) on an acceptable cell described below. The normal service (also referred to as standard service) is the service for public use on a suitable cell described below. The operator service is the service for operators only on a reserved cell described below.

A "suitable cell" is described below. The "suitable cell" is a cell on which a UE may camp to obtain a normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE (contained in the CSG whitelist of the UE).

An "acceptable cell" is described below. This is the cell on which a UE may camp to obtain limited service. Such a cell shall fulfill all the requirements of (1) and (2) below.

(1) The cell is not a barred cell. (2) The cell fulfills the cell selection criteria.

"Barred cell" is shown in the system information. "Reserved cell" is shown in the system information.

"Camping on a cell" represents the state where a UE has completed the cell selection/reselection process and the UE has selected a cell for monitoring the system information and paging information. A cell on which the UE camps is referred to as "serving cell" in some cases.

Base stations referred to as Home-NodeB (Home-NB; HNB) and Home-eNodeB (Home-eNB; HeNB) are studied in 3GPP. HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

According to 3GPP, there is a range of PCIs in all physical cell identities (PCIs), which is reserved by the network for use by CSG Cells (see Chapter 10.5.1.1 of Non-Patent Document 1). Splitting the range of PCIs is referred to as PCI-split at times. The PCI split information is broadcast in the system information from the base station to the user equipments being served thereby. Non-Patent Document 5 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, specifications standard of long term evolution advanced (LTE-A) as Release 10 are pursued in 3GPP (see Non-Patent Document 6 and Non-Patent Document 7).

As to the LTE-A system, it is studied that a relay and a relay node (RN) are supported for achieving a high data rate, high cell-edge throughput, new coverage area, and the like. The relay node is wirelessly connected to the radio-access network via a donor cell (Donor eNB; DeNB). The network (NW)-to-relay node link shares the same frequency band (hereinafter, referred to as "frequency band" in some cases) with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from DeNB to RN is carried out in a downlink (DL) frequency band, and the transmission from RN to DeNB is carried out in an uplink (UL) frequency band. As the method of dividing resources in relays, a link from DeNB to RN and a link from RN to UE are time-division multiplexed in one frequency band, and a link from RN to DeNB and a link from UE to RN are also time-division multiplexed in one frequency band. This enables to prevent, in a relay, the transmission of the relay from interfering with the reception of the own relay.

Not only a normal eNB (macro cell) but also so-called local nodes such as pico eNB (pico cell). HeNB (HNB. CSG cell), node for hotzone cells, relay node, remote radio head (RRH) and repeater are studied in 3GPP. The network composed of various types of cells as described above is also referred to as a heterogeneous network (HetNet) in some cases.

The frequency bands (hereinafter, referred to as "operating bands" in some cases) usable for communication have been predetermined in the LTE. Non-patent Document 8 describes the frequency bands. In the frequency division duplex (FDD) communication, a frequency band for downlink (hereinafter, referred to as "downlink frequency band" in some cases) and a frequency band for uplink (hereinafter, referred to as "uplink frequency band" in some cases) that is paired with the downlink frequency band have been predetermined, where the uplink frequency band differs from the downlink frequency band. This is because the downlink and uplink are necessarily required for conventional communication such as voice communication so that transmission/reception are enabled at the same time by splitting the frequencies between downlink and uplink in the FDD.

In the FDD, a default value of an interval (TX-RX frequency separation) between a carrier frequency of resources for use in downlink (hereinafter, referred to as "downlink carrier frequency" in some cases) and a carrier frequency of resources for use in uplink (hereinafter, referred to as "uplink carrier frequency" in some cases) is determined per frequency band. Non-Patent Document 8 describes a default value at the TX-RX frequency separation.

In the LTE, a cell broadcasts, to UEs being served thereby, the frequency band information and uplink carrier frequency deployed by the own cell as broadcast information. Specifically, the frequency band information is included in the SIB1. The uplink carrier frequency is included in the SIB2. In a case where the uplink carrier frequency is not included in the SIB2, the uplink carrier frequency is derived from the downlink carrier frequency using the default value at the TX-RX frequency separation. The UE is capable of recognizing the downlink carrier frequency through cell selection or reselection and is capable of obtaining the frequency band and uplink carrier frequency deployed by the cell through reception of the broadcast information from the cell.

As disclosed in Non-Patent Document 1, the development of "long term evolution advanced (LTE-A)" specifications as Release 10 is pursued in 3GPP.

Carrier aggregation (CA) is studied in the LTE-A system, in which two or more component carriers (CCs) are aggregated to support wider transmission bandwidths up to 100 MHz.

A Release 8 or 9-compliant UE, which supports LTE, is capable of transmission/reception on only the CC corresponding to one serving cell. On the other hand, it is conceivable that a Release 10-compliant UE may have the capability of transmission/reception, only reception, or only transmission on the CCs corresponding to a plurality of serving cells at the same time.

Each CC employs the configuration of Release 8 or 9, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

In each SCell, a UE is capable of using resources for uplink (UL) in addition to resources for downlink (DL). The number of DL SCCs is equal to or more than the number of UL SCCs. No SCell is used for only resources for UL. Each resource for UL belongs to only one serving cell for one UE. The number of serving cells depends on the UE capability.

The PCell is changed through only a HO procedure. The PCell is used for transmission of PUCCH. The PUCCH for HARQ of the DL-SCH without UL-SCH is transmitted through only UL PCC. Differently from SCells, the PCell is not de-activated.

Re-establishment is triggered when the PCell results in a radio link failure (RLF). Re-establishment is not triggered in a case of SCells. The NAS information is obtained from the PCell.

The SCells are reconfigured, added, or removed through RRC. Also in handover within the LTE, the SCells used together with a target PCell are added, removed, or reconfigured through RRC.

In a case of SCell addition, dedicated RRC signaling is used to transmit the all system information (SI) required for the SCell. That is, addition is performed in a connected mode, and the UE does not have to receive the SI broadcast from the SCell.

It is studied that a PCell notifies user equipments of SCell addition/modification using "RRC Connection Reconfiguration message" of dedicated RRC signaling (see Non-Patent Document 2). It is studied that SCell release is notified UEs by a PCell using "RRC Connection Reconfiguration message" of dedicated RRC signaling or is triggered by "RRC Connection re-establishment" (see Non-Patent Document 2). "RRC Connection Reconfiguration message" of dedicated RRC signaling contains "SCell To AddModList" and "SCell To ReleaseList".

In each cell, the SIB2 represents a carrier frequency of a resource for uplink.

Local nodes are installed for complementing a macro cell in response to demands for various services such as high-speed and high-capacity communication. Accordingly, the local node may be installed within the coverage of the macro cell. In this case, an interference may occur from a user equipment to the local node.

A case in which a local node is a remote radio head (RRH) and the coverage of the macro cell is larger than the coverage of the RRH, that is, a case in which the downlink transmission power of the macro cell is larger than the downlink transmission power of the RRH is considered here as a specific example. The downlink reception power of the user equipment at each point becomes smaller as the distance from each node increases. The uplink transmission power of the user equipment to each node needs to be increased as the distance from each node increases.

The user equipment according to the conventional technique camps on a cell having the best downlink reception quality, and thereafter, starts communication as required (see Non-Patent Document 3). In areas where the downlink reception power from the macro cell is larger than the downlink reception power from the RRH, the user equipment camps on the macro cell and performs uplink transmission to the macro cell.

In the area where the uplink transmission power from the user equipment to the macro cell is larger than the uplink transmission power from the user equipment to the RRH among the above-mentioned areas, the link between the UE and RRH is better than the other link in uplink, whereas the link between the UE and macro cell is better than the other link in downlink. As described above, an imbalance in link, that is, a link imbalance occurs.

When a link imbalance occurs, an interference occurs from the user equipment to the RRH due to relatively large uplink transmission power from the user equipment to the macro cell. Due to this interference, the communication between the user equipment and macro cell or the communication between the user equipment and RRH is hindered, leading to a reduction in throughput of the entire communication system. Therefore, there is required a method of reducing an interference occurring in a HetNet being a heterogeneous network in which a macro cell and a local node coexist, to thereby improve a throughput of the entire communication system.

Non-Patent Document 10 discloses a solution to the inter-cell interference problem in a heterogeneous network.

Specifically, the use of a radio link exclusively in uplink and downlink during the communication of a user equipment is disclosed as a solution. In this solution, the same frequency is used in the respective cells.

Non-Patent Document 11 also discloses a solution to the inter-cell interference problem in a heterogeneous network. Specifically, the following solutions are disclosed: carrier aggregation is performed in each cell with different carrier frequencies between the macro cell and pico cell, and the user equipment accesses the pico cell when the user equipment comes closer to the pico cell. However, Non-Patent Document 11 does not disclose the details of the method in which the user equipment accesses the pico cell when the user equipment comes closer to the pico cell.

Non-Patent Document 1 discloses several scenarios regarding carrier aggregation. Among the scenarios disclosed in Non-Patent Document 1, scenario 4 discloses that the RRH operating on a frequency 2 (F2) is aggregated with the macro cell operating on a frequency 1 (F1).

PRIOR ART DOCUMENTS

Non-Patent Documents

Non-Patent Document 1: 3GPP TS 36.300 V10.2.0
Non-Patent Document 2: 3GPP TS 36.331 V10.0.0
Non-Patent Document 3: 3GPP TS 36.304 V10.0.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.3.0
Non-Patent Document 8: 3GPP TS 36.101 V10.0.0
Non-Patent Document 9: 3GPP TR 23.830 V9.0.0
Non-Patent Document 10: 3GPP R1-094246
Non-Patent Document 11: 3GPP R1-100061

SUMMARY OF INVENTION

Problem to be Solved by the Invention

As described above, Non-Patent Document 10 discloses, as a solution to the inter-cell interference problem in a heterogeneous network, the use of a radio link exclusively in uplink and downlink during the communication of a user equipment. However, Non-Patent Document 10 does not disclose the details of the method of using a radio link exclusively in uplink and downlink.

Non-Patent Document 11 discloses the following as solutions to the inter-cell interference problem in a heterogeneous network: carrier aggregation is performed in respective cells with different carrier frequencies between the macro cell and pico cell, and the user equipment accesses the pico cell when the user equipment comes closer to the pico cell. However, Non-Patent Document 11 does not disclose the details of the method in which the user equipment accesses the pico cell when the user equipment comes closer to the pico cell. Besides, Non-Patent Document 11 does not disclose the configuration for carrier aggregation between the macro cell and pico cell.

Non-Patent Document 1 discloses the carrier aggregation between the RRH operating on the frequency 2 (F2) and the macro cell operating on the frequency 1 (F1). However, Non-Patent Document 1 does not disclose the details of the method of carrier aggregation between the RRH and macro cell.

An object of the present invention is to provide a communication system capable of improving the communication quality in a case where a plurality of communication devices having different sizes of ranges coexist, in which communication with a terminal device is possible, to thereby improve the entire throughput.

Means to Solve the Problem

A communication system according to the present invention includes a movable terminal device and a plurality of communication devices configured to perform radio communication with the terminal device. The plurality of communication devices include a large-scale communication device having a relatively large range in which communication with the terminal device is possible and a small-scale communication device having a relatively small range in which the communication is possible. The large-scale communication device and the small-scale communication device are configured to communicate with each other and are installed such that at least parts of the ranges in which the communication is possible overlap each other. The small-scale communication device is configured to receive an uplink resource transmitted to the large-scale communication device from the terminal device and, upon receipt of the uplink resource, transmits a reception signal regarding the uplink resource received to the large-scale communication device. The large-scale communication device combines a reception signal regarding the uplink resource transmitted from the terminal device and received and the reception signal regarding the uplink resource transmitted from the small-scale communication device and received.

Further, a communication system according to the present invention includes a movable terminal device and a plurality of communication devices configured to perform radio communication with the terminal device. The plurality of communication devices include a large-scale communication device having a relatively large range in which communication with the terminal device is possible and a small-scale communication device having a relatively small range in which the communication is possible. The large-scale communication device and the small-scale communication device are installed such that at least parts of the ranges in which the communication is possible overlap each other. A first cell is formed of a first large-scale downlink component carrier and a large-scale uplink component carrier, the first large-scale downlink component carrier being used in a downlink transmission from the large-scale communication device to the terminal device, the large-scale uplink component carrier being used in an uplink transmission from the terminal device to the large-scale communication device. A second cell is formed of a second large-scale downlink component carrier and a small-scale uplink component carrier, the second large-scale downlink component carrier having a frequency different from that of the first large-scale downlink component carrier and being used in a downlink transmission from the large-scale communication device to the terminal device, the small-scale uplink component carrier being used in an uplink transmission from the terminal device to the small-scale communication device. The terminal device sets a transmission condition for performing the uplink transmission from the terminal device to the large-scale communication device or the small-scale communication device as a transmission condition set in advance for any one of the first cell and the second cell that includes a component carrier having higher reception quality with respect to the reception signal received from the transmission from the terminal device, to thereby perform the uplink transmission.

Effects of the Invention

According to the communication system of the present invention, the communication quality in a case where a large-scale communication device and a small-scale communication device are installed to coexist can be improved, to thereby improve the throughput of the entire communication system. Further, an effect of relatively large uplink transmission power from the terminal device to the large-scale communication device can be prevented from affecting the reception of uplink transmission in the small-scale communication device, leading to a reduction in interference as the entire communication system.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 9 is a block diagram showing the configuration of a base station (base station 72 of FIG. 7) according to the present invention.

FIG. 10 is a block diagram showing the configuration of an MME (MME unit 73 of FIG. 7) according to the present invention.

FIG. 11 is a block diagram showing the configuration of a HeNBGW 74 shown in FIG. 7 that is a HeNBGW according to the present invention.

FIG. 15 is a block diagram showing an example of the configuration in a case where a remote radio head is added to a base station.

FIG. 18 is a diagram for describing the concept of a solution in a first embodiment.

FIG. 19 is a diagram showing an example of a sequence of a communication system in the first embodiment.

FIG. 20 is a diagram showing an example of a sequence of a communication system in a first modification of the first embodiment.

FIG. 22 is a diagram showing an example of a sequence in a case where a user equipment configures a path loss suitable for an optimum node based on measurement results.

FIG. 23 is a diagram showing an example of a sequence in a case where a macro cell obtains an offset value and notifies a user equipment of the offset value to configure path loss suitable for an optimum node.

FIG. 24 is a diagram showing an example of a sequence of a communication system in a second embodiment.

FIG. 26 is a diagram showing an example of a sequence of a communication system in the third embodiment.

FIG. 28 is a diagram for describing a problem in a fifth embodiment.

EMBODIMENTS FOR CARRYING OUT THE INVENTION

First Embodiment

Figure 2:
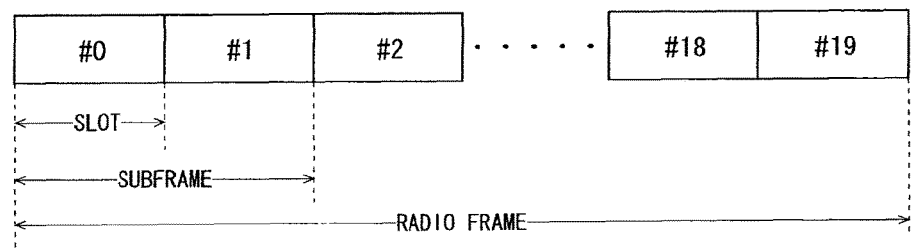
FIG. 2 is a diagram illustrating the configuration of a radio frame used in the LTE communication system.
Figure 3:
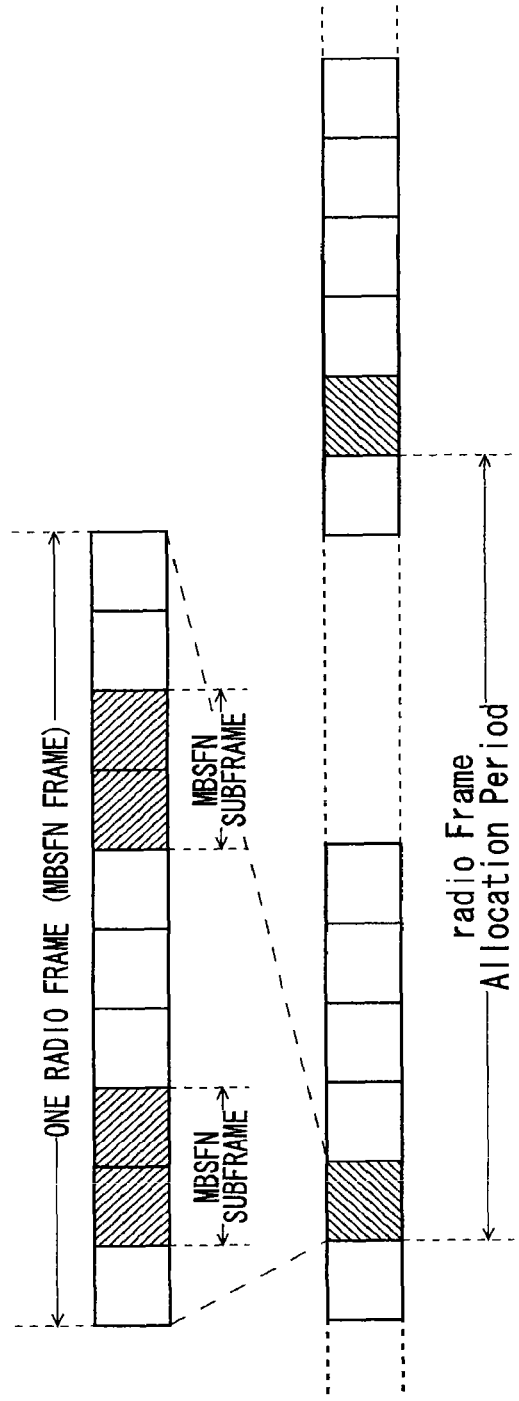
FIG. 3 is a diagram illustrating the configuration of an MBSFN frame.
Figure 7:
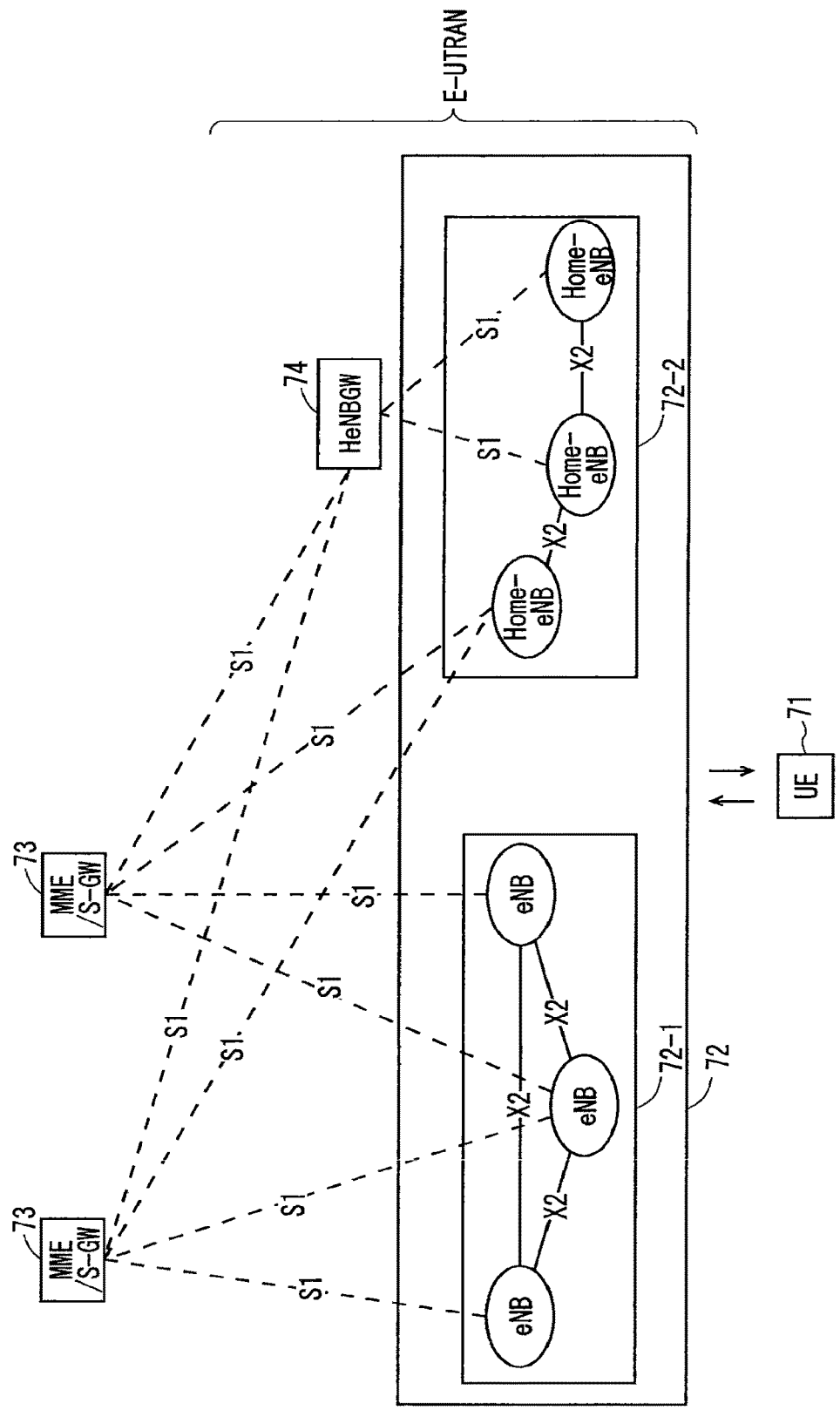
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) is studied in 3GPP and, as to E-UTRAN, the configuration as shown in FIG. 7 is proposed (see Chapter 4.6.1 of Non-Patent Document 1).

FIG. 7 is described. A user terminal device (hereinafter, referred to as "user equipment" or "UE") 71 is capable of performing radio communication with a base station device (hereinafter, referred to as "base station") 72 and transmits/receives signals through radio communication. The user terminal device is equivalent to a communication terminal device. The base stations 72 are classified into an eNB 72-1 that is a macro cell and a Home-eNB 72-2 that is a local node. The eNB 72-1 is equivalent to a large-scale base station device and has a relatively large-scale coverage as the coverage in a range in which communication with the user equipment (UE) 71 is possible. The Home-eNB 72-2 is equivalent to a small-scale base station device and has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and the control information is communicated between the Home-eNB 72-2 and the MME unit 73. A plurality of Home-eNBs 72-2 are connected to one MME unit 73. Also, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface. The MME unit 73 and HeNBGW 74 are equivalent to host node devices, and control the connection between the user equipment (UE) 71 and each of the eNB 72-1 and Home-eNB 72-2 being a base station.

Further, the configuration below is currently studied in 3GPP. The X2 interface between the Home-eNBs 72-2 is supported. That is, the Home-eNBs 72-2 are connected to each other by means of the X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73. The interfaces between the Home-eNBs 72-2 and the MME units 73 are the same, which are the S interfaces, in both of the case where the Home-eNB 72-2 is connected to the MME unit 73 through the HeNBGW 74 and the case where the Home-eNB 72-2 is directly connected to the MME unit 73. The HeNBGW 74 does not support the mobility to the Home-eNB 72-2 or the mobility from the Home-eNB 72-2 that spans the plurality of MME units 73. The Home-eNB 72-2 supports a single cell.

Figure 8:
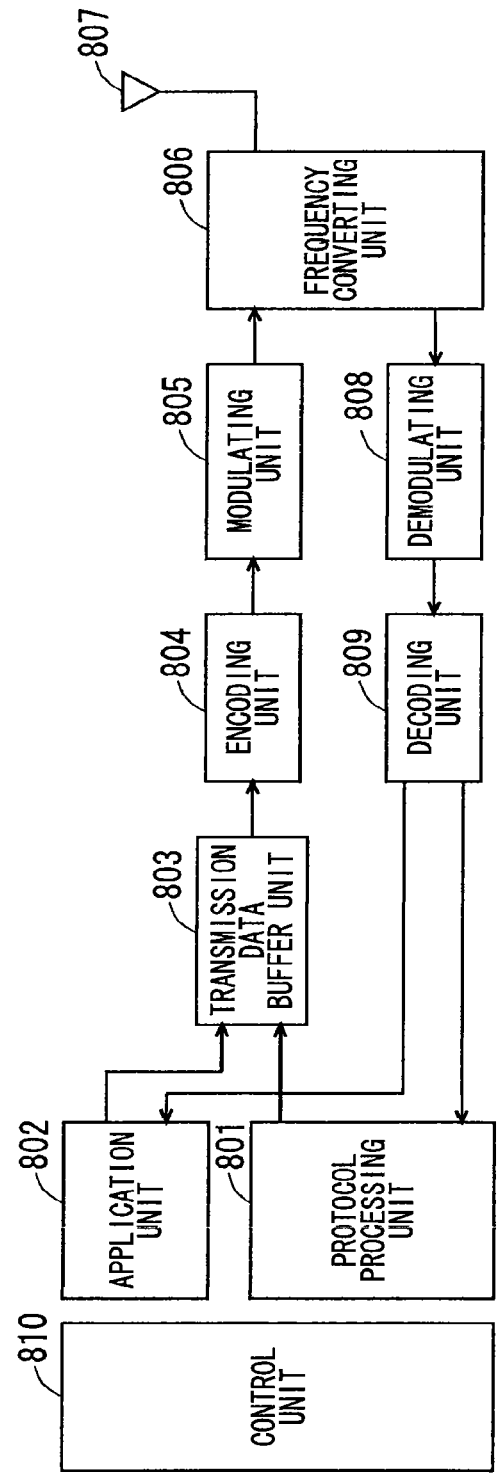
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted to one or a plurality of user equipments 71 through an antenna 908.

While, the reception process of the base station 72 is executed as follows. Radio signals from one or a plurality of user equipments 71 are received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

FIG. 10 is a block diagram showing the configuration of the MME according to the present invention. FIG. 10 shows the configuration of an MME 73*a* included in the MME unit 73 shown in FIG. 7 described above. A PDN GW communication unit 1001 performs data transmission/reception between the MME 73*a* and a PDN GW. A base station communication unit 1002 performs data transmission/reception between the MME 73*a* and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73*a* and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signaling in an idle state, addition, deletion, update, and search of a tracking area (TA) of one or a plurality of user equipments 71 being served thereby, and tracking area list (TA list) management.

The MME 73*a* begins a paging protocol by transmitting a paging message to the cell belonging to a tracking area (TA) with which the UE is registered. The idle state mobility managing unit 1005-3 may manage the CSG of the Home-eNBs 72-2 to be connected to the MME 73*a*, CSG-IDs, and a whitelist.

In the CSG-ID management, the relationship between a user equipment corresponding to the CSG-ID and the CSG cell is managed (added, deleted, updated or searched). For example, it may be the relationship between one or a plurality of user equipments whose user access has been registered with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73*a*. A series of processes by the MME 73*a* is controlled by a control unit 1006. This means that, though not shown in FIG. 10, the control unit 1006 is connected to the respective units 1001 to 1005.

The function of the MME 73*a* currently under discussion of 3GPP is described below (see Chapter 4.6.2 of Non-Patent Document 1). The MME 73*a* performs access control for one or a plurality of user equipments being members of closed subscriber groups (CSGs). The MME 73*a* recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73*a* by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73*a* through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not linked to the user equipment 71 though it is a part of the procedures toward the Home-eNB 72-2 and towards the MME 73*a*. When the HeNBGW 74 is deployed, the procedure that is not linked to the user equipment 71 is communicated between the Home-eNB 72-2 and the HeNBGW 74 and between the HeNBGW 74 and the MME 73*a*. The X2 interface is not set between the HeNBGW 74 and another node. The HeNBGW 74 recognizes the execution of paging optimization as an option.

Figure 12:
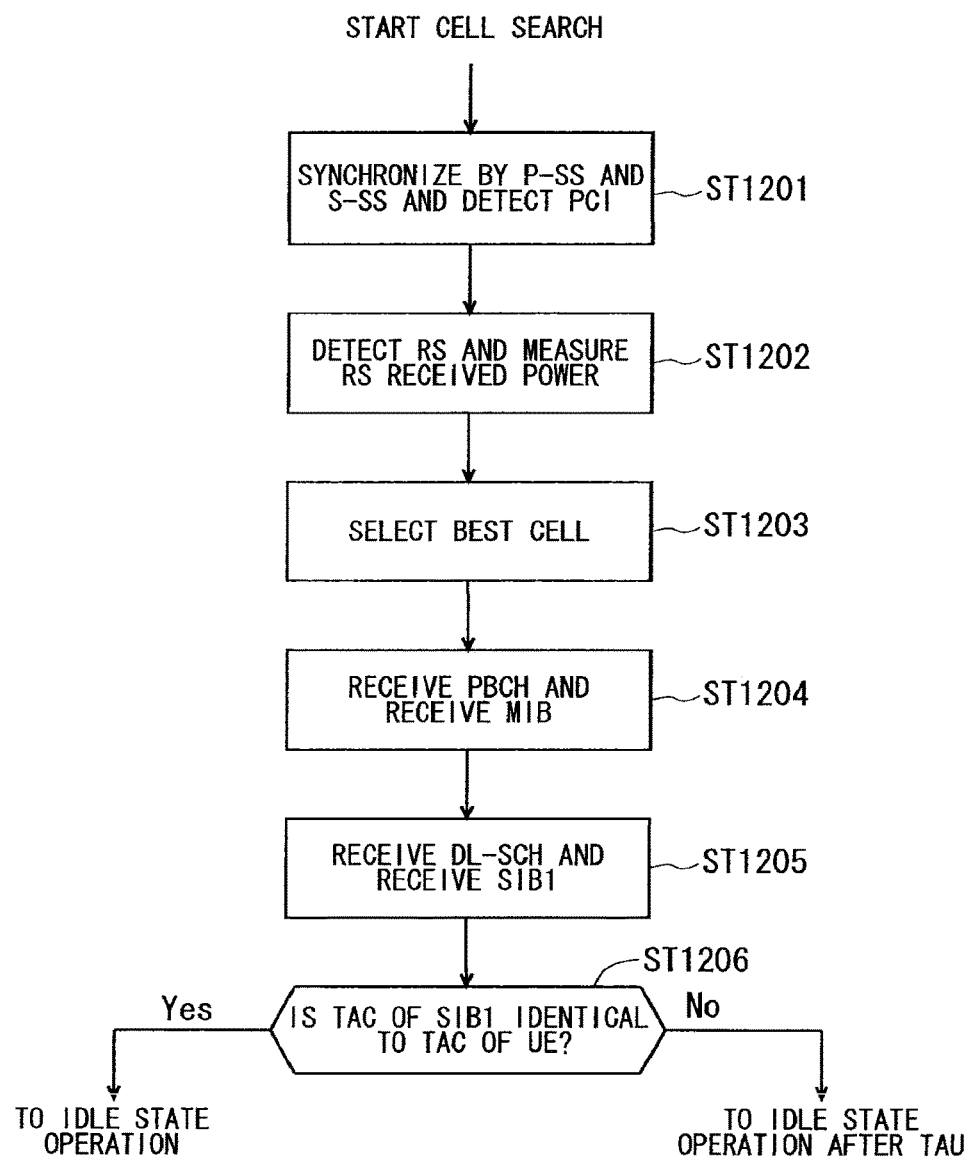
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from a cell search to an idle state operation performed by a user equipment (UE) in the LTE communication system. When starting the cell search, in Step ST1201, the user equipment synchronizes the slot timing and frame timing by a primary synchronization signal (P-SS) and a secondary synchronization signal (S-SS) transmitted from a neighbour base station. Synchronization codes, which correspond to physical cell identities (PCIs) assigned per cell one by one, are assigned to the synchronization signals (SSs) including the P-SS and S-SS. The number of PCIs is currently studied in 504 ways, and these 504 ways are used for synchronization, and the PCIs of the synchronized cells are detected (specified).

Next, in Step ST1202, the user equipment detects a reference signal (RS) (cell-specific reference signal (CRS)) transmitted from the base station per cell and measures the received power (also referred to as RSRP). The code corresponding to the PCI one by one is used for the reference signal (RS), and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality, for example, cell having the highest RS received power, that is, best cell from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection, and scheduling information of other SIB (SIBk; k is an integer equal to or larger than two). In addition, the SIB1 contains a tracking area code (TAC).

In Step ST1206, next, the user equipment compares the TAC of the SIB received in Step ST1205 with the TAC in the tracking area (TA) list that has been already possessed by the user equipment. In a case where the TAC received in Step ST1205 is identical to the TAC included in the tracking area (TA) list as a result of the comparison, the user equipment enters an idle state operation in the cell. In a case where the TAC received in Step ST1205 is not included in the tracking area (TA) list as a result of the comparison, the user equipment requires a core network (EPC) (including MME and the like) to change a tracking area (TA) through the cell for performing tracking area update (TAU). The core network updates the tracking area (TA) list based on an identification number (such as a UE-ID) of the user equipment transmitted from the user equipment together with a TAU request signal. The core network transmits the updated tracking area (TA) list to the user equipment. The user equipment rewrites (updates) the TAC list of the user equipment with the received tracking area (TA) list. After that, the user equipment enters the idle state operation in the cell.

As to the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE and LTE-A or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

All physical cell identities (PCIs) are split into ones reserved for CSG cells and the others reserved for non-CSG cells is discussed in 3GPP (see Non-Patent Document 1). There is a range of PCIs in all the PCIs, which is reserved by the network for use by CSG cells (see Chapter 10.5.1.1 of Non-Patent Document 1). Splitting the range of PCIs is referred to PCI-split as times. The PCI split information is broadcast in the system information from the base station to the user equipments being served thereby. Non-Patent Document 5 discloses the basic operation of a user equipment by PCI split. The user equipment that does not have the PCI split information needs to perform cell search using all the PCIs, for example, using all 504 codes. On the other hand, the user equipment that has the PCI split information is capable of performing cell search using the PCI split information.

Further, it has been determined that the PCIs for hybrid cells are not contained in the PCI range for CSG cells in 3GPP (see Chapter 10.7 of Non-Patent Document 1).

According to 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to a user. The list of CSGs provided to the user by the user equipment is not limited to the CSGs included in the allowed CSG list stored in the user equipment. The user selects the CSG based on the list of CSGs, and then, the user equipment camps on the cell with the selected CSG ID, to thereby attempt registration (see Non-Patent Document 3).

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. In such a service, the operator correspondingly sets a higher accounting fee compared with a normal service.

In order to achieve the above-mentioned service, the closed subscriber group cell (CSG cell) accessible only to the registered (subscribed or member) user equipments is introduced. It is required to install a large number of closed subscriber group cells (CSG cells) in shopping malls, apartment buildings, schools, companies and the like. For example, the following manner of use is required; the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

As described above, CA is studied in the LTE-A system, in which two or more CCs are aggregated to support frequency bandwidths up to 100 MHz, which are wider than the frequency bandwidths of the LTE system.

Figure 13:
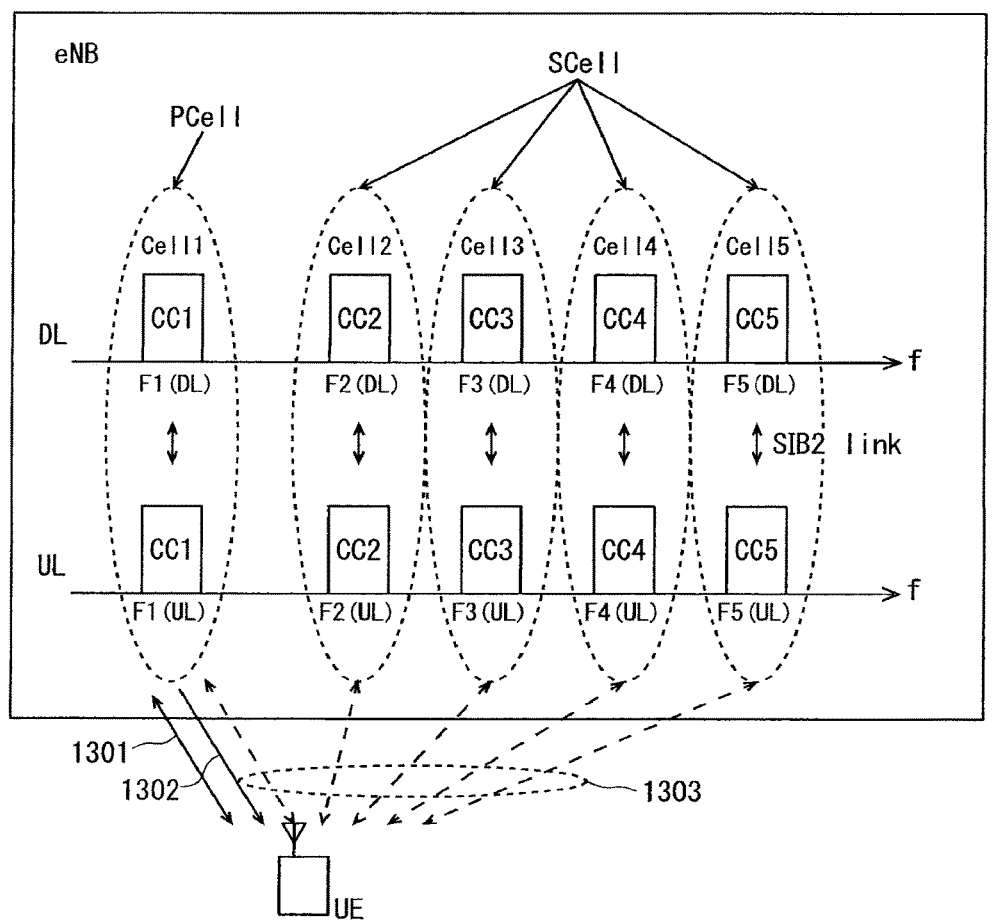
FIG. 13 is a diagram showing the concept of CA.

FIG. 13 is a diagram showing the concept of CA. An eNB shown in FIG. 13 configures a cell n configured by a DL CCn and a UL CCn which is associated with the DL-CCn by a DL/UL link via SIB2. The carrier frequency of the DL CCn is denoted by Fn (DL), and the carrier frequency of the UL CCn is denoted by Fn (UL). Here, n is an integer of one to five.

A UE camps on the cell 1 and performs RRC connection indicated by an arrow 1301. As a result, the cell 1 becomes a PCell.

After that, the eNB notifies the UE of the information related to the CCs to be aggregated through dedicated RRC signaling indicated by an arrow 1302. The information related to a cell m configured by a DL CCm and a UL CCm, for example, system information is notified as the information related to the CCs. Here, m is an integer of two to five. The eNB notifies the UE of the information related to the CCs in this manner, whereby the cell 2 to the cell 5 become SCells.

As described above, the eNB performs CA for the UE with the cell 1 to the cell 5. Then, the UE performs communication with the cell 1 to the cell 5 based on CA, as indicated by an arrow 1303.

A configuration example of a UE that supports CA is described. It suffices that in the configuration shown in FIG. 8 described above, a part or the whole of the modulating unit 805, frequency converting unit 806, antenna 807, and demodulating unit 808 is caused to support a wider bandwidth. In the transmitter, a part or the whole of the modulating unit 805, frequency converting unit 806, and antenna 807 may be caused to operate in a band including a predetermined number of contiguous UL CCs. In the receiver, a part or the whole of the antenna 807, frequency converting unit 806, and demodulating unit 808 may be caused to operate in a band including a predetermined number of contiguous DL CCs. This enables to support CA by a predetermined number of contiguous UL CCs or DL CCs.

As another method, it suffices that a plurality of a part or the whole of the modulating unit 805, frequency converting unit 806, antenna 807, and demodulating unit 808 are provided in parallel so as to operate in a band including a predetermined number of non-contiguous UL CCs or DL CCs. In the transmitter, a plurality of a part or the whole of the modulating unit 805, frequency converting unit 806, and antenna 807 may be provided in parallel so as to operate in a band including a predetermined number of non-contiguous UL CCs. In the receiver, a plurality of a part or the whole of the antenna 807, frequency converting unit 806, and demodulating unit 808 may be provided in parallel so as to operate in a band including a predetermined number of non-contiguous DL CCs. This enables to support CA with a predetermined number of non-contiguous UL CCs or DL CCs. Alternatively, the two configurations described above may be appropriately combined.

A configuration example of an eNB that supports CA is described. It suffices that in the configuration shown in FIG. 9 described above, the protocol processing unit 903 performs the process for a UE for which CA is performed per cell configured by an eNB, and the transmission data buffer unit 904, encoding unit 905, modulating unit 906, frequency converting unit 907, antenna 908, demodulating unit 909, and decoding unit 910 are configured per cell. This enables to perform CA for a UE by cells configured by an eNB.

The base station has a configuration as described above in FIG. 9. The remote radio head (RRH) is described below. The base station is composed of functional units below. The functional units include a control unit, a baseband unit, a path interface unit, and a radio functional unit. The correspondence between each functional unit and units forming the base station 72 shown in FIG. 9 is described.

The control unit includes a control unit 911 that controls the whole of the base station and a protocol processing unit 903 that processes the protocol related to the control for calling. The baseband unit includes a transmission data buffer unit 904 that stores user data and control data, an encoding unit 905 that performs encoding, and a decoding unit 910 that performs decoding.

The path interface unit includes an EPC communication unit 901 that performs data transmission/reception with the EPC, and a communication with another base station unit 902 that performs data transmission/reception with another base station. The radio function unit includes a modulating unit 906 that performs modulation, a frequency converting unit 907, an antenna 908 through which transmission/reception of radio signals are performed, and a demodulating unit 909 that performs demodulation. The frequency converting unit 907 converts a baseband frequency of a baseband signal into a radio transmission frequency and converts a radio transmission frequency into a baseband frequency of a baseband signal.

It is possible not only to collectively install all the functional units forming the base station at one place but also to separately install them. On this occasion, the separation needs not to be made in units of the functional units described above but may be separated in units that form each functional unit. In a case where the units of the functional units are separately installed, the separated units are connected to each other through a dedicated line for enabling high-speed communication.

In a case where the units of the functional units are separately installed, the portion including a radio portion for transmission/reception of radio signals, specifically, the portion including the antenna 908, in the configuration of the base station is referred to as "remote radio head (RRH)". The portion including the configuration that is not included in the remote radio head, that is, the portion that does not include the radio portion, in the configuration of the base station may be referred to as "macro cell".

Figure 14:
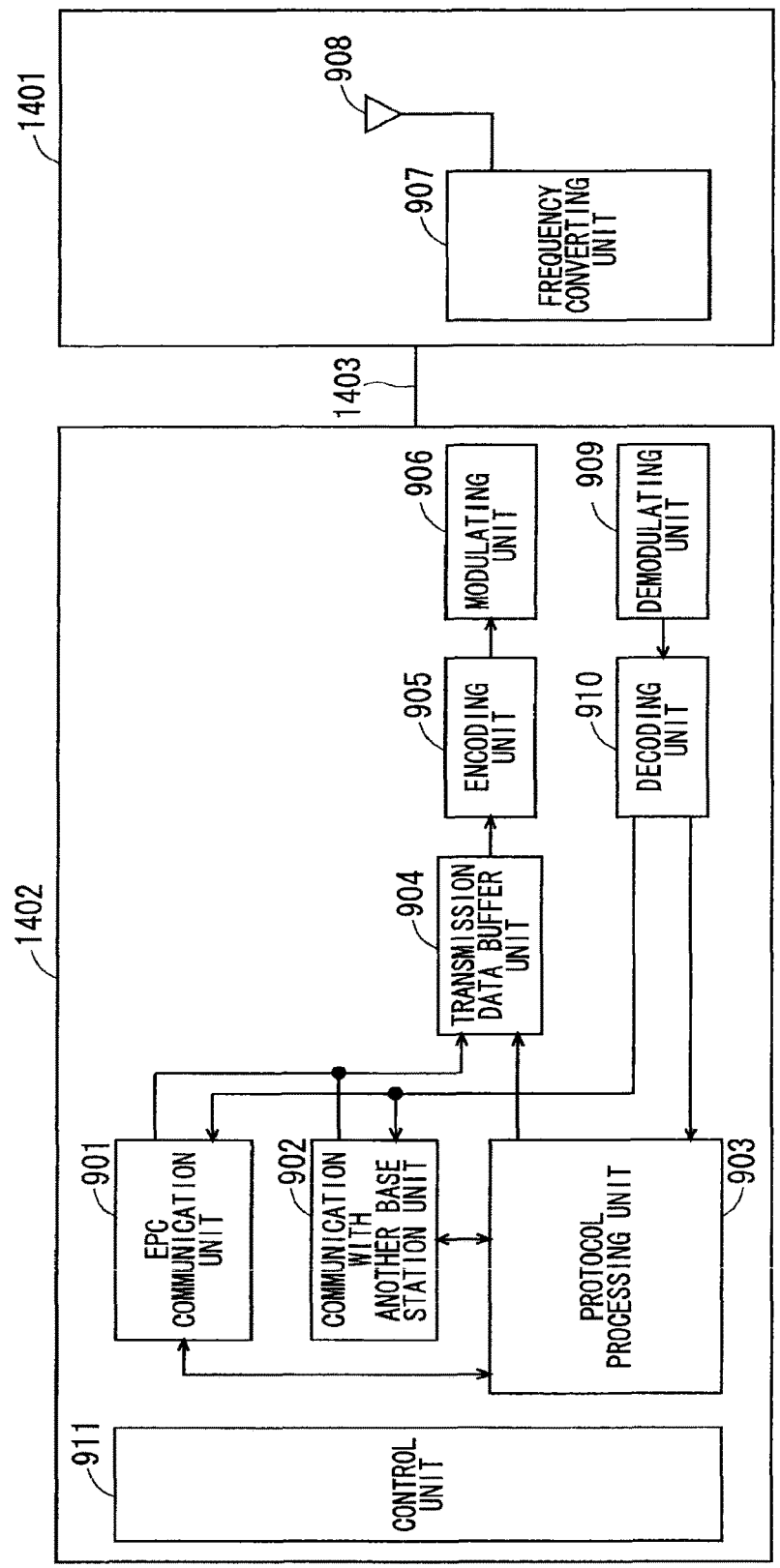
FIG. 14 is a block diagram showing an example of the respective configurations of a remote radio head 1401 and a macro cell 1402.

FIG. 14 is a block diagram showing an example of the configurations of a remote radio head 1401 and a macro cell 1402. The respective configurations of the remote radio head 1401 and macro cell 1402 shown in FIG. 14 are similar to the configuration of the base station 72 shown in FIG. 9, and thus, the corresponding portions are denoted by the same reference numbers and common description is not given here.

The remote radio head 1401 shown in FIG. 14 includes the antenna 908 and a frequency converting unit 907 that serve as a radio functional unit. The macro cell 1402 includes the components of the base station except for the components that are included in the remote radio head 1401. In the example shown in FIG. 14, the macro cell 1402 includes the EPC communication unit 901, communication with another base station unit 902, protocol processing unit 903, transmission data buffer unit 904, encoding unit 905, modulating unit 906, demodulating unit 909, decoding unit 910, and control unit 911.

The remote radio head 1401 and macro cell 1402 are connected to each other through a dedicated line 1403. Data transmission/reception is performed between the remote radio head 1401 and macro cell 1402 by baseband signals.

There is a conceivable case in which the remote radio head includes the antenna 908, frequency converting unit 907, modulating unit 906, and demodulating unit 909, and the macro cell includes the encoding unit 905, decoding unit 910, transmission data buffer unit 904, EPC communication unit 901, communication with another base station unit 902, protocol processing unit 903, and control unit 911, though different from the present embodiment. In this case, data transmission/reception is performed between the remote radio head and macro cell through the data before modulation and data after demodulation.

There is another conceivable case in which the remote radio head includes the antenna 908, frequency converting unit 907, modulating unit 906, demodulating unit 909, encoding unit 905, and decoding unit 910, and the macro cell includes the transmission data buffer unit 904, EPC communication unit 901, communication with another base station unit 902, protocol processing unit 903, and control unit 911. In this case, data transmission/reception is performed between the remote radio head and macro cell through the data before encoding and data after decoding.

There is still another conceivable case in which the remote radio head includes the antenna 908 and the macro cell includes the frequency converting unit 907, modulating unit 906, demodulating unit 909, encoding unit 905, decoding unit 910, transmission data buffer unit 904, EPC communication unit 901, communication with another base station unit 902, protocol processing unit 903, and control unit 911. In this case, data transmission/reception is performed between the remote radio head and macro cell by radio signals (RF signals).

As shown in FIG. 9 described above, the remote radio head is not used solely in a case where the base station 72 including all the functional units that are integrally formed is separately installed. For example, it is conceivable that the remote radio head being a portion including a radio portion may be added to the base station.

FIG. 15 is a block diagram showing an example of the configuration in which the remote radio head is added to the base station. The configuration shown in FIG. 15 is similar to the configuration shown in FIG. 9, and thus, the corresponding portions are denoted by the same reference numbers and common description is not given here.

The base station shown in FIG. 15 includes a macro cell 1501 corresponding to the base station 72 shown in FIG. 9 and two remote radio heads 1502 and 1503. The remote radio heads 1502 and 1503 shown in FIG. 15 each include the antenna 908 and frequency convening unit 907 that serve as the radio functional unit shown in FIG. 14. The remote radio heads 1502 and 1503 are each connected to the macro cell 1501 through a dedicated line 1504. While two remote radio heads are provided in the example shown in FIG. 15, one or a plurality of remote radio heads may be provided.

The problem to be solved in the first embodiment is described below. The macro cell and a local node such as remote radio head (RRH) are installed to coexist, which construct a network referred to as a heterogeneous network. In the heterogeneous network, the local node is installed to complement the macro cell in response to demands for various services such as high-speed and high-capacity communication. Therefore, the local node may be installed in the coverage of the macro cell. In this case, an interference may occur between the macro cell and local node.

Figure 16:
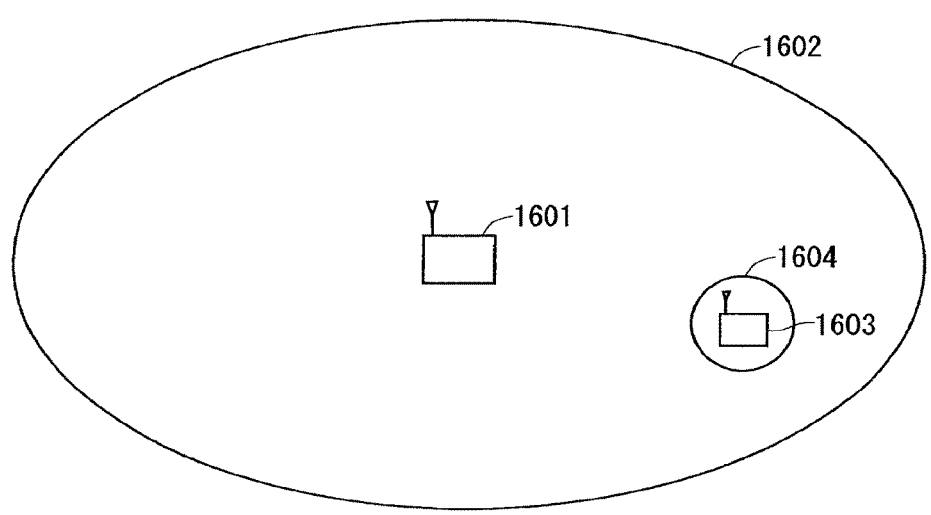
FIG. 16 is a diagram showing a situation in a case where an RRH 1603 is installed in a coverage 1602 of a macro cell 1601.
Figure 17:
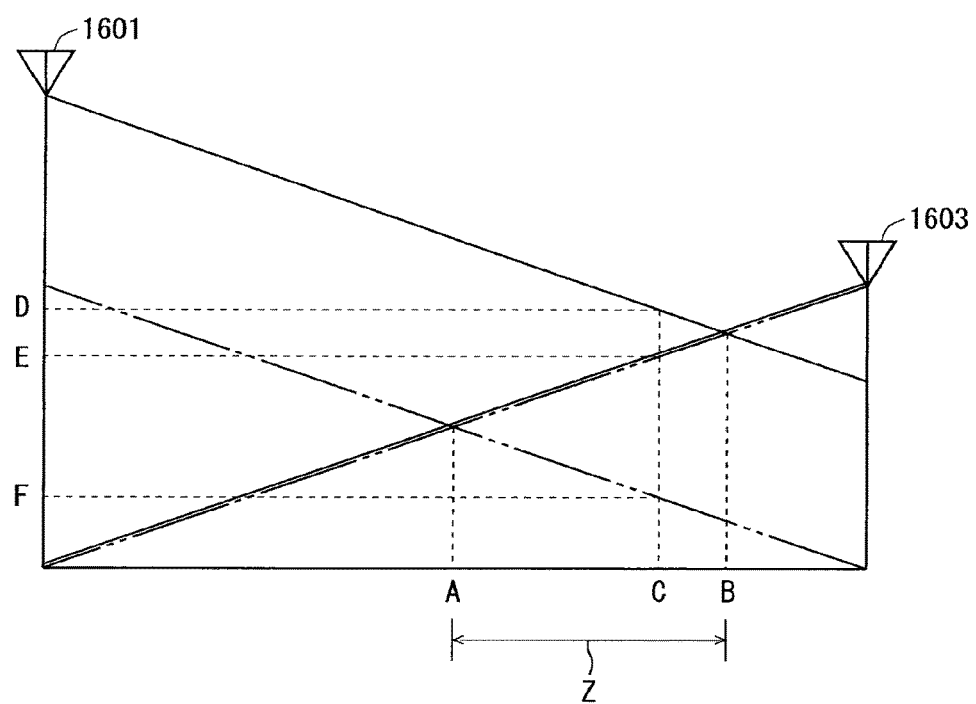
FIG. 17 is a diagram showing the downlink reception power and uplink transmission power of a user equipment at points between the macro cell 1601 and RRH 1603.

A specific example of the interference occurring in a case where the local node is installed in the coverage of the macro cell is described below with reference to FIGS. 16 and 17. FIG. 16 is a diagram showing a situation in which an RRH 1603 is installed in a coverage 1602 of a macro cell 1601. FIG. 17 is a diagram showing the downlink reception power and uplink transmission power of a user equipment at each point between the macro cell 1601 and RRH 1603. In FIG. 17, the macro cell 1601 and RRH 1603 shown in FIG. 16 are represented as antennas.

In FIG. 17, the vertical axis and horizontal axis represent the power and position, respectively. In FIG. 17, the downlink reception power from the macro cell 1601 at each point is indicated by a solid line downward to the right. The downlink reception power from the RRH 1603 at each point is indicated by a solid line downward to the left. The uplink transmission power to the macro cell 1601 at each point is indicated by a chain double-dashed line upward to the right. The uplink transmission power to the RRH 1603 at each point is indicated by a chain double-dashed line upward to the left.

In the example shown in FIG. 16, the RRH 1603 is installed in the coverage 1602 of the macro cell 1601. The RRH 1603 has a coverage 1604. Considered here is a case in which the coverage 1602 of the macro cell 1601 is larger than the coverage 1604 of the RRH 1603 as a comparison therebetween, as shown in FIG. 16. This means that the downlink transmission power of the macro cell 1601 is larger than the downlink transmission power of the RRH 1603 as a result of the comparison of downlink transmission power.

As indicated by the solid line downward to the right and solid line downward to the left in FIG. 17, the downlink reception power of the user equipment at each point becomes smaller as the distances from the nodes, that is, the macro cell 1601 and RRH 1603 increase. As indicated by the chain double-dashed line upward to the right and chain double-dashed line upward to the left in FIG. 17, the uplink transmission power to the nodes of the user equipment, that is, the macro cell 1601 and RRH 1603 being base stations needs to be increased as the distances from the nodes increase. These are affected by a propagation loss. This propagation loss may be referred to as "path loss".

The user equipment according to the conventional technique camps on a cell having the best downlink reception quality, and thereafter, starts communication as required (see Non-Patent Document 3). For example, a case in which the user equipment is located at a point C is considered here. As indicated by the solid line downward to the right in FIG. 17, the downlink reception power from the macro cell 1601 at the point C has a value D. As indicated by the solid line downward to the left, the downlink reception power from the RRH 1603 at the point C has a value E. The value D is larger than the value E as shown in FIG. 17, and accordingly, the user equipment camps on the macro cell 1601, and thereafter, starts communication as required. That is, the user equipment performs uplink transmission to the macro cell 1601 at the point C.

As indicated by the chain double-dashed line upward to the right in FIG. 17, the uplink transmission power to the macro cell 1601 at the point C has the value E. As indicated by the chain double-dashed line upward to the left, the uplink transmission power to the RRH 1603 at the point C has a value F. That is, at the point C, the transmission power required for the uplink transmission from the user equipment to the macro cell 1601 is larger than the transmission power required for the uplink transmission from the user equipment to the RRH 1603.

Therefore, at the point C, the link between the user equipment and RRH 1603 is good in uplink, and the link between the user equipment and macro cell 1601 is good in downlink.

In an area Z between the point A and point B shown in FIG. 17, similarly to the point C, the downlink reception power from the macro cell 1601 is larger than the downlink reception power from the RRH 1603, and the uplink transmission power to the macro cell 1601 is larger than the uplink transmission power to the RRH 1603. Therefore, in the area Z between the point A and point B, similarly to the point C, the link between the user equipment and RRH 1603 is good in uplink, and the link between the user equipment and macro cell 1601 is good in downlink.

As described above, an imbalance in link, that is, link imbalance occurs in the area Z between the point A and point B. In this area Z where a link imbalance has occurred, the uplink transmission power from the user equipment to the macro cell 1601 is larger than the uplink transmission power from the user equipment to the RRH 1603, causing an interference from the user equipment to the RRH 1603. This interference hinders the communication between the user equipment and macro cell 1601 or the communication between the user equipment and RRH 1603, leading to a reduction in throughput of the entire communication system.

Therefore, there is a required method of reducing an interference occurring in a heterogeneous network in which the macro cell 1601 and the local node such as the RRH 1603 are installed to coexist as shown in FIG. 16, that is, in a HetNet, to thereby improve the throughput of the entire communication system.

Therefore, the first embodiment aims to reduce interferences occurring from a user equipment to a local node by relatively large uplink transmission power from the user equipment to the macro cell due to an occurrence of a link imbalance. The first embodiment also aims to prevent a reduction in throughput of the entire system due to communication being hindered by this interference.

A solution in the first embodiment is described below. The present embodiment specifically describes the remote radio head (RRH) as a representative example of the local node. In the present embodiment, the carrier frequency of the RRH and the carrier frequency of the macro cell are different from each other, and the RRH is provided with a function of receiving the uplink resource of the macro cell, specifically, uplink carrier frequency band. The carrier frequency may be a frequency of a component carrier. The uplink resource of the macro cell refers to an uplink resource from a user equipment (UE) to a macro cell, that is, uplink resource transmitted from a UE to a macro cell.

The carrier frequency of the RRH and the carrier frequency of the macro cell are different from each other as in the present embodiment, which enables to reduce interferences from a user equipment (UE) to a local node that occurs due to relatively large uplink transmission power from the UE to the macro cell.

A specific example of the solution in the first embodiment is described with reference to FIG. 18. FIG. 18 is a diagram for describing the concept of the solution of the first embodiment. The downlink carrier frequency and uplink carrier frequency of the macro cell are represented as DL_f1 and UL_f1, respectively. The downlink carrier frequency band and uplink carrier frequency band of the macro cell are represented as DL1 and UL1, respectively. The downlink carrier frequency and uplink carrier frequency of the RRH are represented as DL_f2 and UL_f2, respectively. The downlink carrier frequency band and uplink carrier frequency band of the RRH are represented as DL2 and UL2, respectively. The macro cell and RRH are equivalent to a large-scale communication device and a small-scale communication device, respectively. The downlink carrier frequency and uplink carrier frequency of the macro cell are equivalent to a first frequency, and the downlink carrier frequency and uplink carrier frequency of the RRH are equivalent to a second frequency.

In the present embodiment, the RRH is provided with a function of receiving the UL1 being the uplink carrier frequency band of the macro cell in addition to a function of receiving the UL2 being the uplink carrier frequency band of the RRH. More specifically, the RRH is provided with the function of receiving the UL1 being the uplink carrier frequency band of the macro cell in addition to a function of transmitting the DL2 being the downlink carrier frequency band of the RRH and the function of receiving the UL2 being the uplink carrier frequency band of the RRH. That is, the RRH is provided with a function of receiving the uplink carrier frequency band of the macro cell in a portion surrounded by a solid line in addition to a function of transmitting or receiving a carrier frequency band of the RRH in a portion surrounded by a dashed line shown in FIG. 18.

Meanwhile, the macro cell is provided with a function of receiving the UL1 being the uplink carrier frequency band of the macro cell. More specifically, the macro cell is provided with a function of transmitting the DL1 being the downlink carrier frequency band of the macro cell and a function of receiving the UL1 being the uplink carrier frequency band of the macro cell. That is, the macro cell is provided with a function of transmitting or receiving the carrier frequency band of the macro cell in the portion surrounded by a broken line shown in FIG. 18.

While FIG. 18 shows a case in which the DL1 being the downlink carrier frequency band of the macro cell and the DL2 being the downlink carrier frequency band of the RRH are contiguous, the downlink carrier frequency band of the macro cell and the downlink carrier frequency band of the RRH may be non-contiguous. Also, while FIG. 18 shows a case in which the UL1 being the uplink carrier frequency band of the macro cell and the UL2 being the uplink carrier frequency band of the RRH are contiguous, the uplink carrier frequency band of the macro cell and the uplink carrier frequency band of the RRH may be non-contiguous.

Here, the data in the uplink resource, which is transmitted from the user equipment to the macro cell and is received by the macro cell, and the data in the uplink resource of the macro cell, which is received by the RRH, are the same.

Specific examples regarding which RRH is provided with a function of receiving the uplink resource of the macro cell include a case in which the RRH being served by the macro cell is provided with a function of receiving the uplink resource of the macro cell.

The following three (1) to (3) are disclosed as specific examples of the RRH being served by the macro cell.

(1) RRH connected to the macro cell through a dedicated line. It may be judged that the RRH connected to the macro cell through a dedicated line receives the uplink resource of the macro cell.

(2) RRH sharing the function of the macro cell, which is, for example, RRH that processes a protocol by a control unit located in the macro cell. The RRH sharing the function of the macro cell may judge to receive the uplink resource of the macro cell.

(3) RRH located in the coverage of the macro cell. The RRH that has judged to be located in the coverage of the macro cell may judge to receive the uplink resource of this macro cell. Specific examples of the method in which the RRH judges whether or not it is located in the coverage of the macro cell include the method in which the RRH measures the surrounding radio wave environment, that is, radio wave environment of a neighboring cell. The RRH measures the surrounding radio wave environment in power-on, during initialization, or while transmission is stopped. Also, the RRH measures the reception power of the cell existing near itself and obtains the PCI being a cell identity of a cell, to thereby detect the cell. On this occasion, the RRH may detect a cell having reception power equal to or larger than a predetermined threshold. The RRH judges to be located in the coverage of a cell having reception power equal to or larger than the threshold. The RRH notifies a cell, in the coverage of which the own RRH has judged to be located, that the own RRH is located in the coverage of the cell.

The method disclosed in the present embodiment is appropriately applicable also to a case in which the radio wave environment between the macro cell and RRH changes or the coverage area changes due to changes in transmission power of the macro cell and antenna configuration of the macro cell.

The following two (a) and (b) are disclosed as specific examples of the notification method in a case where there are a plurality of cells that have been judged to have the reception power equal to or higher than a threshold. (a) The RRH notifies all the cells that the own RRH is located in the coverages of those cells. (b) The RRH notifies a cell having the best measurement results, that is, a cell having high reception power or small path loss that the own RRH is located in the coverage of the cell.

A specific example of the process after the RRH has received the uplink resource of the macro cell is disclosed below. The RRH transmits a reception signal or reception data regarding the uplink resource of the macro cell to the macro cell. The macro cell combines the reception signal regarding the uplink resource of the macro cell received by the macro cell and the reception signal regarding the uplink resource of the macro cell received from the RRH. This combining process improves the uplink reception quality from the user equipment to the macro cell. As a result, the throughput of the entire communication system can be improved.

The following two (1) and (2) are disclosed as specific examples of the method of notifying a reception signal or reception data from an RRH to a macro cell. (1) A dedicated line between the macro cell and RRH is used. This achieves an effect that high-speed communication is allowed. (2) An X2 interface is used. This achieves an effect that in a case of the application to a local node other than the RRH, the use of the X2 interface between the macro cell and local node eliminates the need to newly provide an interface.

The following two (1) and (2) are disclosed as specific examples of the method of combining reception signals or pieces of reception data in the macro cell. (1) Combining is performed by simple addition. That is, reception powers are added together. (2) Selective combining is performed. Selective combining refers to that pieces of data received at the nodes, the macro cell and RRH, are decoded separately, and then, the data having normal decoding results is selected. In a case where the data received by the macro cell and the data received by the RRH have normal decoding results, any of the pieces of data is selected.

The following three (1) to (3) are disclosed as specific examples of the signal or data to be transmitted from the RRH to the macro cell.

(1) RF signal. In the case of the specific example (1), the RRH needs not to recognize, for example, an identifier of a user equipment being served by a macro cell, such as a cell radio network temporary identifier (C-RNTI), and scheduling information to the user equipment. This is more effective than the specific example (3) described below in that a communication system can be prevented from becoming complex.

Examples of the configurations of the remote radio head and macro cell in the case where a signal or data to be transmitted from the RRH to the macro cell is an RF signal include the configurations in which the remote radio head includes the antenna 908 and the macro cell includes the frequency converting unit 907, modulating unit 906, demodulating unit 909, encoding unit 905, decoding unit 910, transmission data buffer unit 904, EPC communication unit 901, communication with another base station unit 902, protocol processing unit 903, and control unit 911, where the reference numbers shown in FIG. 9 described above are used.

(2) Baseband signal, for example, analog baseband signal or digital baseband signal. The specific example (2) has an effect that a signal amount of the communication between the RRH and macro cell is smaller compared with that of the specific example (1). In the case of the specific example (2), the RRH needs not to recognize, for example, an identifier of a user equipment being served by a macro cell, such as C-RNTI, and scheduling information to the user equipment. This is more effective than the specific example (3) described below in that a communication system can be prevented from becoming complex.

Examples of the configurations of the remote radio head and macro cell in a case where the signal or data to be transmitted from the RRH to the macro cell is a baseband signal include the configurations in which the remote radio head 1401 includes the antenna 908 and frequency converting unit 907, and the macro cell 1402 includes the EPC communication unit 901, communication with another base station unit 902, protocol processing unit 903, transmission data buffer unit 904, encoding unit 905, modulating unit 906, demodulating unit 909, decoding unit 910, and control unit 911, as shown in FIG. 14 described above.

(3) Demodulated data or decoded data. The specific example (3) has an effect that a signal amount of the communication between the RRH and macro cell is smaller compared with the specific examples (1) and (2). In the case of the specific example (3), the RRH needs to recognize, for example, an identifier of a user equipment being served by a macro cell, such as C-RNTI, and scheduling information to the user equipment.

Examples of the configurations of the remote radio head and macro cell in a case where a signal or data to be transmitted from the RRH to the macro cell is the demodulated data include the configurations in which the remote radio head includes the antenna 908, frequency converting unit 907, modulating unit 906, and demodulating unit 909, and the macro cell includes the encoding unit 905, decoding unit 910, transmission data buffer unit 904, EPC communication unit 901, communication with another base station unit 902, protocol processing unit 903, and control unit 911, where the reference numbers shown in FIG. 9 described above are used.

Examples of the configurations of the remote radio head and macro cell in a case where a signal or data to be transmitted from the RRH to the macro cell is the decoded data include the configurations in which the remote radio head includes the antenna 908, frequency converting unit 907, modulating unit 906, demodulating unit 909, encoding unit 905, and decoding unit 910, and the macro cell includes the transmission data buffer unit 904, EPC communication unit 901, communication with another base station unit 902, protocol processing unit 903, and control unit 911, where the reference numbers shown in FIG. 9 described above are used.

Specific examples of the method in which an RRH recognizes an identifier of a user equipment being served by a macro cell and scheduling information to the user equipment include the method in which the macro cell notifies the RRH of the above through a dedicated line. In a case where the method is applied to a local node other than RRH, it is conceivable that the macro cell may notify a local node of the above by means of an X2 interface.

The RRH may selectively modulate or decode only the reception signal or reception data from a specific user equipment being served by a macro cell and notify the macro cell of the resultant. In that case, it suffices that the macro cell notifies the RRH of, for example, only an identifier of the specific user equipment being served thereby, such as C-RNTI, and scheduling information to the specific user equipment. It suffices that the RRH performs decoding using one or a plurality of received identifiers, such as C-RNTIs, and scheduling information, and notifies the macro cell of the resultant.

The following two (1) and (2) are disclosed as specific examples of the method of making a hybrid automatic repeat request (HARQ) in the present embodiment.

(1) A macro cell makes a HARQ. In this case, whether or not the reception data has been successfully decoded can be judged after combining the reception signal regarding the uplink resource of the macro cell received by the macro cell and the reception signal regarding the uplink resource of the macro cell received from the RRH. The reception quality is improved, leading to a fewer number of retransmission times. As a result, radio resources can be used effectively, leading to an improvement in throughput as a communication system.

(2) The RRH makes a HARQ. In this case, the RRH judges whether or not the uplink resource of the macro cell has been successfully decoded. In a case of judging that the uplink resource has been successfully decoded, the RRH notifies the macro cell of "Ack" together with the decoded data. In a case of judging that the uplink resource has not been successfully decoded, the RRH notifies the macro cell of "Nack". In a case of notifying "Nack", the RRH needs not to notify the decoded data. This leads to an effect of a fewer signal amount of the connection between the RRH and macro cell than that of the specific example (1).

In a case where the macro cell does not combine the reception signal regarding the uplink resource of the macro cell received by the macro cell and the reception signal regarding the uplink resource of the macro cell received from the RRH, the specific example (2) is effectively used. This is because the use of the specific example (1) cannot achieve the effects of combining. The specific example (2) is effectively used also in a case where the reception quality of the uplink resource of the macro cell is good in the RRH. This is because the reception quality of the uplink resource of the macro cell is good even though the effects of combining with the use of the specific example (1) are not expected.

A specific example in which an RRH knows the configuration of an uplink resource of a macro cell is disclosed below. The macro cell notifies the RRH of the configuration of the uplink resource of the own cell. Specific examples of the configuration of the uplink resource include a carrier frequency and a bandwidth. The following three (1) to (3) are disclosed as specific examples of the method in which a macro cell notifies an RRH of the configuration of the uplink resource of the own cell.

(1) A dedicated line between a macro cell and an RRH is used. The specific example (1) is effective in that high-speed communication is allowed. (2) An X2 interface is used. In a case of the application to a local node other than RRH, the use of the X2 interface between the macro cell and local node leads to an effect that an interface needs not to be newly provided. (3) An operating and maintenance tool (OMT) is used. This leads to an effect that an interface needs not to be newly provided.

Next, a specific example of a sequence of a communication system in the first embodiment is described with reference to FIG. 19. FIG. 19 is a diagram showing an example of the sequence of the communication system in the first embodiment. This operation example discloses a case in which an RRH is installed in the coverage of the macro cell, and also discloses a case in which a user equipment camps on the macro cell and a node optimum for uplink is an RRH.

This operation example discloses, as a specific example regarding which RRH is provided with a function of receiving an uplink resource of a macro cell, the above-mentioned case in which the function is provided to an RRH connected to the macro cell through a dedicated line. The above-mentioned case in which a dedicated line between the macro cell and RRH is used is disclosed as a specific example of the method in which an RRH notifies a macro cell of a reception signal. The above-mentioned case in which combining is performed by simple addition is disclosed as a specific example of the method of combining the reception signals or pieces of reception data in the macro cell. The above-mentioned case in which a baseband signal is used is disclosed as a specific example of the signal to be transmitted from the RRH to the macro cell. The above-mentioned case in which a dedicated line between the macro cell and RRH is used is disclosed as a specific example of the method in which an RRH knows the configuration of the uplink resource of the macro cell.

In Step ST1901, the macro cell and RRH are connected through a dedicated line. In Step ST1902, the macro cell notifies the RRH of the configuration of the uplink resource of the macro cell. The dedicated line is used in this notification.

In Step ST1903, the RRH judges whether or not it is connected to the macro cell through the dedicated line. In a case of judging that the RRH is connected to the macro cell through the dedicated line in Step ST1903, the RRH moves to Step ST1904. In a case of judging that the RRH is not connected to the macro cell through the dedicated line in Step ST1903, the RRH ends the process and moves to other process. The other process is not specific to the present invention, which is not described here.

In Step ST1904, the RRH judges to receive the uplink resource of the macro cell and then moves to Step ST1908.

In Step ST1905, the user equipment camps on the macro cell as a cell having the best downlink reception quality. In Step ST1906, the user equipment performs uplink transmission to the macro cell.

In Step ST1907, the macro cell receives uplink transmission from the user equipment, specifically, an uplink transmission signal transmitted from the user equipment.

In Step ST1908, the RRH receives the uplink resource of the macro cell. In a case of receiving the uplink resource of the macro cell, the RRH uses the configuration of the uplink resource of the macro cell received in Step ST1902. The RRH may perform the process of Step ST1908 after receiving the configuration of the uplink resource of the macro cell in Step ST1902.

In Step ST1909, the RRH notifies the macro cell of the reception signal regarding the uplink resource of the macro cell received by the RRH. A dedicated line is used in this notification.

In Step ST1910, the macro cell combines the uplink transmission signal transmitted from the user equipment, which has been received in Step ST1907, and the reception signal regarding the uplink resource of the macro cell received by the RRH, which has been received in Step ST1909.

The first embodiment described above can achieve the following effects. The carrier frequency of the RRH being a local node and the carrier frequency of the macro cell are different from each other, whereby relatively large uplink transmission power from the user equipment (UE) to the macro cell can be prevented from affecting the reception of uplink in the RRH. This enables to reduce interferences as an entire communication system.

Further, the uplink transmission signals from a UE being served by a macro cell to the macro cell are received by the macro cell and RRH and are combined together, leading to an improvement in communication quality of uplink transmission. This enables to improve a throughput of the entire communication system.

According to the first embodiment, the uplink transmission signals transmitted from the user equipment (UE) to the macro cell are received by the macro cell and RRH and are combined together as described above. Accordingly, the communication quality in a case where the macro cell and the local node such as RRH are installed to coexist is improved, which improves an entire throughput. Additionally, the carrier frequency of the local node such as RRH and the carrier frequency of the macro cell are different from each other, which enables to prevent relatively large uplink transmission power from the UE to the macro cell from affecting the reception of uplink in the RRH. This achieves a reduction in interference as an entire communication system.

In the solution of the first embodiment, the UE operates as in the conventional uplink transmission. That is, the UE performs uplink transmission to the macro cell on which it has camped. Accordingly, the UE needs not to be additionally notified or be additionally provided with a function. In this regard, the first embodiment can construct a communication system having excellent backward compatibility.

While the present embodiment has disclosed the case in which the carrier frequency of the local node is different from the carrier frequency of the macro cell, the present embodiment is also applicable to a case in which the carrier frequency of the local node is identical to the carrier frequency of the macro cell. This achieves similar effects to those of the present embodiment.

While the present embodiment has described the configuration of the communication system in a case where a remote radio head (RRH) is used as a local node, the local node is not limited to the RRH but may be a local node other than the RRH. Specific examples of the local nodes other than the RRH include a pico eNB (pico cell), HeNB (HNB, CSG cell), node for hotzone cells, relay node, and repeater. The present embodiment is also applicable to local nodes other than RRH, and thus, similar effects to those of the present embodiment can be achieved.

First Modification of First Embodiment

While the first embodiment has mainly disclosed the solution in a case where an RRH is used as a representative of the local node, a first modification of the first embodiment discloses a case in which the first embodiment is applied to a local node other than RRH. The present modification mainly describes a portion different from the solution of the first embodiment above, and a portion not to be described is similar to the first embodiment.

The present modification describes a case of the application to a local node having all the functions by itself, differently from an RRH. Specific examples of the local node having all the functions by itself include a pico eNB, HeNB, relay node, repeater, and node for hotzone cells. The present modification describes a case in which a HeNB is used as a representative of the local node having all the functions by itself.

In the present modification, the carrier frequency of the HeNB is different from the carrier frequency of the macro cell. The HeNB processes the uplink resource for the own node by itself. In addition, the HeNB is provided with a function of receiving the uplink resource of the macro cell, specifically, uplink carrier frequency.

Here, the data in the uplink resource which is transmitted from a user equipment to a macro cell and is received by the macro cell is identical to the data in the uplink resource of the macro cell which is received by a HeNB.

A specific example of the process after the HeNB has received the uplink resource of the macro cell is disclosed below. The HeNB transmits a reception signal or reception data regarding the uplink resource of the macro cell to the macro cell. The HeNB does not process the reception signal or reception data regarding the uplink resource of the macro cell by the own node.

The following two (1) and (2) are disclosed as specific examples of the uplink resource of the macro cell received by the HeNB.

(1) The HeNB receives all of the uplink resource of the macro cell. This specific example (1) is more effective than the specific example (2) described below in that control is more easily made because a demand from the macro cell is not required.

(2) The HeNB receives an uplink resource of a macro cell, reception of which is requested by the macro cell. Specific examples of the uplink resource include a resource block (RB) unit and a component carrier unit. In the specific example (2), an uplink resource of a macro cell, which is received by a HeNB, is fewer compared with the specific example (1) described above. Accordingly, the processing load of the HeNB can be reduced, and the communication amount from the HeNB to the macro cell can be reduced.

The above-mentioned specific examples (1) and (2) regarding the uplink resource of the macro cell received by the HeNB are also applicable to the first embodiment described above.

The following three (1) to (3) are disclosed as specific examples of the uplink resource, which the macro cell requests a HeNB to receive.

(1) Resource of poor reception quality regarding an uplink resource of a macro cell received by the macro cell. The HeNB is requested to receive the resource of poor reception quality, whereby an improvement in communication quality owing to the combination with the uplink resource of the macro cell received by the HeNB is expected.

(2) Resource having a high interference level at a macro cell. The reception quality of the resource having a high interference level is typically poor. Therefore, if the HeNB is requested to receive a resource having a high interference level at a macro cell, an improvement in communication quality owing to the combination with the uplink resource of the macro cell received by the HeNB is expected.

(3) Uplink resource in which a user equipment is scheduled. If the HeNB is requested to receive the uplink resource, unnecessary reception of the uplink resource in which a user equipment has not been scheduled at a macro cell can be reduced in the HeNB.

The specific examples (1) to (3) regarding the uplink resource, which the macro cell requests a HeNB to receive, are also applicable to the first embodiment described above.

The following two (1) and (2) are disclosed as specific examples of the method in which a macro cell notifies a HeNB of an uplink resource which is requested to be received.

(1) The macro cell notifies the HeNB of the uplink resource which is requested to be received, using the X2 signaling or X2 message. The following two (a) and (b) are disclosed as specific examples of the method in which a macro cell notifies a HeNB of the uplink resource requested to be received by the HeNB, using X2 signaling or X2 message.

(a) X2 signaling or X2 message is newly provided. A parameter to be mapped to the newly-provided X2 signaling is the information indicating an uplink resource which is requested to be received by a HeNB. The information indicating the uplink resource which is requested to be received by the HeNB may be notified together with the cell identifier of the macro cell. The cell identifier of the macro cell is, for example, PCI or GCI.

(b) Existing X2 signaling or X2 message is used. The specific example (b) is more effective than the specific example (a) in that it is not necessary to provide new signaling. The use of the specific example (b) enables to prevent a communication system from becoming complex. A specific example of the method of notifying a HeNB of an uplink resource which is requested to be received using the existing X2 signaling is disclosed below. "LOAD INFOR- MATION message" of X2 signaling, which is disclosed in Chapter 8.3.1.2 of TS 36.423 V10.0.0 (hereinafter, referred to as "Non-Patent Document 12") by 3GPP, is used.

"UL Interference Overload Indication" in "LOAD INFORMATION message" disclosed in Non-Patent Document 12 indicates an interference level that source cell being a transmission source receives per resource block on all the resource blocks. It suffices that the resource block indicating a high interference level by "UL Interference Overload Indication" in "LOAD INFORMATION message" shows an uplink resource that a macro cell requests a HeNB to receive. The reception quality in a resource having a high interference level is typically poor. Therefore, if the HeNB is requested to receive a resource having a high interference level, an improvement in communication quality owing to the combination with the uplink resource of the macro cell received by the HeNB is expected.

An indicator showing what is indicated by "UL Interference Overload Indication" may be newly added. The following three (A) to (C) are disclosed as specific examples of the contents to be shown. (A) An interference level is indicated as in a conventional case. (B) A notification destination is requested to receive an uplink resource of the own cell. In a case where an interference level equal to or higher than a threshold is indicated, the notification destination may be requested to receive an uplink resource of the own cell. (C) Both (A) and (B) above are indicated.

"UL High Interference Indication" in "LOAD INFORMATION message" disclosed in Non-Patent Document 12 indicates, per resource block, the occurrence of the detection of high interference sensitivity, as seen from a source cell being a transmission source. It suffices that the resource block for which the occurrence of detection of high interference sensitivity is indicated by "UL High Interference Indication" in "LOAD INFORMATION message" indicates an uplink resource that a macro cell requests the HeNB to receive. The reception quality in the resource in which high interference sensitivity has been detected is typically poor. Therefore, if a HeNB is requested to receive the resource in which high interference sensitivity has been detected, an improvement in communication quality owing to the combination with the uplink resource of the macro cell received by the HeNB is expected.

An indicator showing what is indicated by "UL High Interference Indication" may be newly added. The following three (A) to (C) are disclosed as specific examples of the contents to be shown. (A) Interference sensitivity is shown as in a conventional case. (B) A notification destination is requested to receive an uplink resource of the own cell. In a case where interference sensitivity equal to or higher than a threshold is indicated, the notification destination may be requested to receive an uplink resource of the own cell. (C) Both (A) and (B) above are indicated.

"LOAD INFORMATION message" is a signal for controlling intra-frequency neighboring cells (see Non-Patent Document 12). Therefore, in the first modification of the first embodiment where a carrier frequency of a local node is different from a carrier frequency of a macro cell, in a case where "LOAD INFORMATION message" is used as the method in which a macro cell notifies a HeNB of an uplink resource which is requested to be received, it suffices that "LOAD INFORMATION message" is extended as a signal for controlling inter-frequency neighboring cells.

(2) The macro cell notifies the HeNB of the uplink resource which is requested to be received, using a dedicated line.

The specific examples (1) and (2) of the method in which a macro cell notifies a HeNB of an uplink resource which is requested to be received are also applicable to the first embodiment described above.

Next, a specific example of a sequence of a communication system in the first modification of the first embodiment is described with reference to FIG. 20. FIG. 20 is a diagram showing an example of the sequence of the communication system in the first modification of the first embodiment. The sequence shown in FIG. 20 is similar to the sequence shown in FIG. 19, and thus, the same steps are denoted by the same step numbers and common description is not given here.

This operation example discloses a case in which the HeNB is installed in the coverage of the macro cell, and also discloses a case in which the user equipment camps on the macro cell and a node optimum for uplink is the HeNB.

This operation example discloses, as a specific example regarding which HeNB is provided with a function of receiving an uplink resource of a macro cell, the above-mentioned case in which a HeNB located in the coverage of the macro cell is provided this function. The above-mentioned case in which an X2 interface is used is disclosed as a specific example of the method in which a HeNB notifies a macro cell of a reception signal. The above-mentioned case where combining is performed by simple addition is disclosed as a specific example of the method in which a macro cell combines reception signals or pieces of reception data. The above-mentioned case in which a baseband signal is used is disclosed as a specific example of the signal to be transmitted from the HeNB to the macro cell.

The above-mentioned case in which an X2 interface is used is disclosed as a specific example of the method in which a HeNB knows the configuration of an uplink resource of a macro cell. The above-mentioned case in which the HeNB receives an uplink resource of the macro cell, whose reception is requested by the macro cell, is disclosed as a specific example of the uplink resource of the macro cell to be received by the HeNB. The above-mentioned case of a resource having a high interference level in a macro cell is disclosed as a specific example of the uplink resource that the macro cell requests the HeNB to receive.

In Step ST2001, the HeNB measures a surrounding radio wave environment, that is, measures a radio wave environment of a neighboring cell.

In Step ST2002, the HeNB judges whether or not a cell having reception power equal to or higher than a predetermined threshold exists based on the measurement results of the surrounding radio wave environment in Step ST2001. In a case of judging that a cell having reception power equal to or higher than a predetermined threshold exists in Step ST2002, the HeNB moves to Step ST2003. In a case of judging that a cell having reception power equal to or higher than a predetermined threshold does not exist in Step ST2002, the HeNB ends the process and moves to other process. The other process is not specific to the present invention, which is not described here.

In a case of judging that a cell having reception power equal to or higher than a predetermined threshold exists as a result of the measurements of a surrounding radio wave environment, the HeNB judges that the own HeNB is located in the coverage of that cell. Meanwhile, in a case of judging that a cell showing a value equal to or higher than a predetermined threshold does not exist as a result of the measurement of a surrounding radio wave environment, the HeNB judges that the own HeNB is not located in the coverage of that cell. In this operation example, the HeNB detects a macro cell as a cell having reception power equal to or higher than a threshold.

In Step ST2003, the HeNB notifies the cell judged to have reception power equal to or higher than a threshold in Step ST2002, which is the macro cell in this operation example, that the own HeNB is located in the coverage. An X2 interface or dedicated line is used in this notification.

In Step ST1902, the macro cell notifies the HeNB of the configuration of the uplink resource of the macro cell. An X2 interface is used in this notification. This notification is performed on, for example, all the local nodes being served by the macro cell, but may be performed on only a local node that has notified that it is located in the coverage.

In Step ST1904, the HeNB judges to receive the uplink resource of the macro cell and then moves to Step ST2006.

In Step ST1905, the user equipment camps on the macro cell as a cell having the best downlink reception quality. In Step ST1906, the user equipment performs uplink transmission to the macro cell.

In Step ST2004, the macro cell judges whether or not there is a resource having a high interference level in the uplink resource of the own cell. In a case of judging that there is a resource having a high interference level in Step ST2004, the macro cell moves to Step ST2005. In a case of judging that there is no resource having a high interference level in Step ST2004, the macro cell ends the process and moves to other process. The other process is not specific to the present invention, which is not described here.

In Step ST2005, the macro cell notifies the HeNB of a resource having a high interference level. Specifically, the macro cell notifies the HeNB, which has notified the macro cell that it is located in the coverage of the macro cell in Step ST2003, of the resource having a high interference level. The macro cell may notify the HeNB of the uplink resource requested to be received. The X2 interface or dedicated line is used in this notification.

In Step ST2006, the HeNB receives the uplink resource of the macro cell having a high interference level which has been received in Step ST2005. In a case of receiving the uplink resource of the macro cell having a high interference level, the HeNB uses the configuration of the uplink resource of the macro cell received in Step ST1902.

In Step ST1907, the macro cell receives the uplink transmission from the user equipment, specifically, the uplink transmission signal transmitted from the user equipment.

In Step ST1909, the HeNB notifies the macro cell of a reception signal regarding the uplink resource of the macro cell received by the HeNB. The X2 interface or dedicated line is used in this notification.

In Step ST1910, the macro cell combines the uplink transmission signal transmitted from the user equipment, which has been received in Step ST1907, and the reception signal regarding the uplink resource of the macro cell received by the HeNB, which has been received in Step ST1909.

The first modification of the first embodiment can achieve the following effects in addition to the effects of the first embodiment. In the present modification, the local node receives the uplink resource of the macro cell, whose reception is requested by the macro cell. This enables to reduce the processing load of a local node and reduce the communication amount from the local node to the macro cell.

While the present modification has disclosed the case in which the carrier frequency of the local node is different from the carrier frequency of the macro cell, the present modification is also applicable to a case in which the carrier frequency of the local node and the carrier frequency of the macro cell are identical to each other, and similar effects to those of the present modification can be achieved.

Also, while the present modification has described the configuration of the communication system in a case where the HeNB is used as a local node, the local node is not limited to a HeNB. Local nodes other than HeNB may be used as long as the local nodes have all the functions by themselves. The present modification is also applicable to local nodes other than HeNB, and similar effects to those of the present modification can be achieved.

Second Embodiment

A problem to be solved in a second embodiment is described below. Even in cases where the first embodiment and the first modification of the first embodiment are used, another problem may occur. This problem is described with reference to FIG. 17 described above.

As described above, in the area Z between the point A and point B shown in FIG. 17, a link between the user equipment (UE) and RRH 1603 is good in uplink, and a link between the UE and macro cell 1601 is good in downlink. An imbalance in link, that is, link imbalance occurs as described above.

In the conventional technique, the user equipment camps on a cell having the best downlink reception quality, and thereafter, starts communication with the cell as required (see Non-Patent Document 3). Accordingly, in the conventional technique, a situation in which an optimum link is not used in uplink communication occurs in, for example, the area Z between the point A and point B shown in FIG. 17. In this case, the transmission power required by the user equipment is larger than that in a case where an optimum link is used. This causes a problem of increased power consumption of the user equipment.

A solution in the second embodiment is described below. The present embodiment mainly describes a portion different from the solutions in the first embodiment and the first modification of the first embodiment described above, and a portion not to be described is similar to the first embodiment and the first modification of the first embodiment.

In the present embodiment, a user equipment configures the uplink transmission suitable for an optimum node. A user equipment whose optimum node differs between uplink and downlink may configure the uplink transmission suitable for a node optimum for uplink. A user equipment whose optimum node differs between uplink and downlink may configure the uplink transmission suitable for a node optimum for uplink while camping on the optimum node in downlink, as in the conventional technique. A user equipment whose optimum node differs between uplink and downlink performs uplink transmission to an optimum node in downlink as in the conventional technique, where uplink transmission may be configured to be suitable for a node optimum for uplink.

Figure 21:
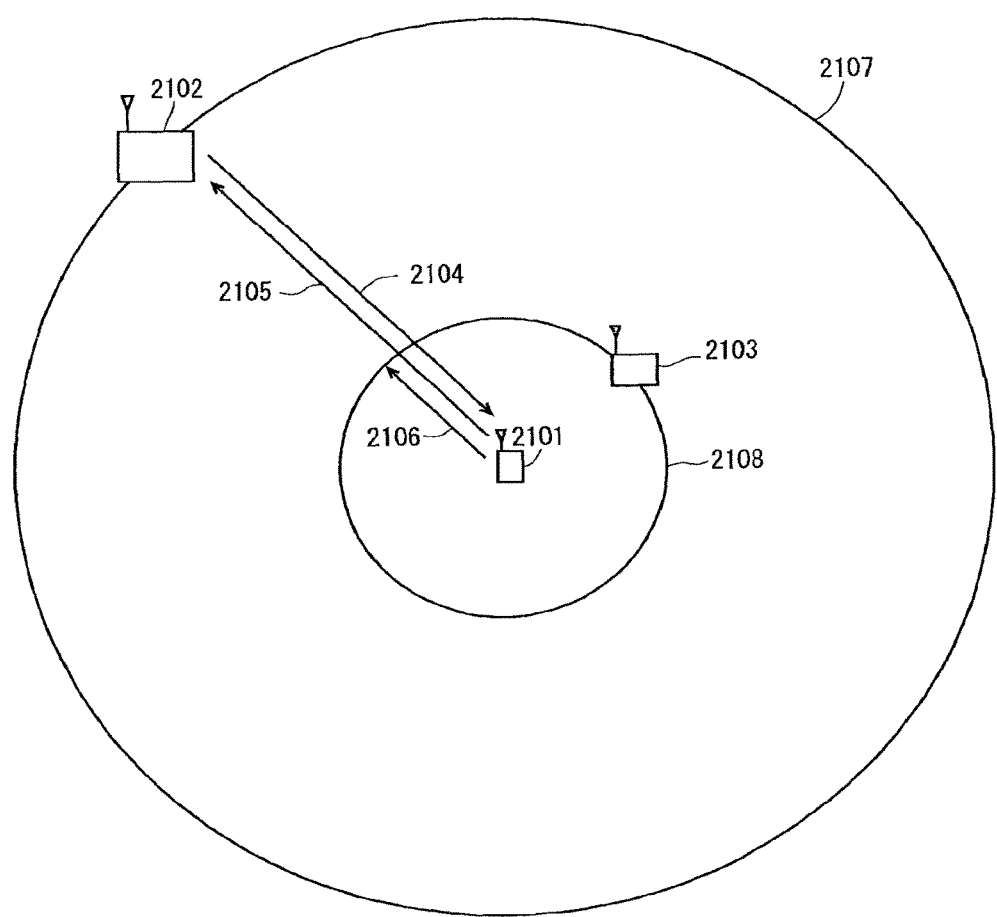
FIG. 21 is a diagram for describing the concept of a solution in a second embodiment.

The concept of the solution in the second embodiment is described with reference to FIG. 21. FIG. 21 is a diagram for describing the concept of the solution in the second embodiment. Considered here is a case in which a user equipment 2101 judges that the downlink reception quality of a downlink 2104 of a macro cell 2102 is the best and camps on the macro cell 2102. The user equipment 2101 starts uplink communication with the macro cell 2102 using an uplink 2105 as required. The length of an arrow indicating the uplink 2105 represents the uplink transmission power of the user equipment 2101. That is, an uplink transmission signal transmitted from the user equipment 2101 can be received within the range of a circle indicated by reference numeral 2107 where the length of the arrow indicating the uplink 2105 is a radius of the circle.

An RRH 2103 is located near the user equipment 2101. The RRH 2103 is an optimum node in uplink of the user equipment 2101. In the present embodiment, the user equipment 2101 configures the uplink transmission suitable for an optimum node. That is, the user equipment 2101 configures the uplink transmission suitable for the RRH 2103 being an optimum node in uplink. As a specific example, for example, the user equipment 2101 sets the uplink transmission power to the transmission power for allowing the RRH 2103 to receive the uplink transmission signal from the user equipment 2101. That is, the user equipment 2101 performs uplink transmission to the macro cell 2102 using an uplink 2106 configured in the uplink transmission suitable for the RRH 2103.

The length of an arrow indicating the uplink 2106 shows the uplink transmission power after the uplink transmission is configured to be suitable for the RRH 2103 being an optimum node for the user equipment 2101. That is, an uplink transmission signal transmitted from the user equipment 2101 can be received within the range of a circle indicated by reference numeral 2108 where the length of the arrow indicating the uplink 2106 is a radius. Also in this case, a serving cell being a camp-on destination is not changed to the RRH 2103, and thus, the uplink transmission destination of the user equipment 2101 is still the macro cell 2102.

The following two (1) and (2) are disclosed as specific examples of the method of determining a user equipment that needs support or a method of determining a user equipment whose optimum node differs between uplink and downlink. The method of determining a node optimum for uplink is also described below.

(1) A macro cell determines a user equipment. The following two (A) and (B) are disclosed as specific examples.

(A) Method in which a user equipment supports the determination by a macro cell. The following two (A1) and (A2) are disclosed as specific examples of the method in which a user equipment supports the determination by a macro cell.

(A1) A user equipment measures a surrounding radio wave environment, that is, measures a radio wave environment of a neighboring cell. The user equipment performs a measurement for changing the configuration of uplink transmission (hereinafter, may be referred to as "uplink transmission configuration"). That is, the user equipment measures a downlink resource of a neighboring local node. This measurement may be performed while the user equipment is in an idle state or is connected.

In a case of the measurement during an idle state, a threshold different from the conventional threshold for starting a measurement, which is disclosed in Non-Patent Document 3, is provided. For example, a measurement threshold for changing the uplink transmission configuration is provided. This enables to start a measurement for changing the uplink transmission configuration also in a case where the serving cell has good downlink communication quality. The user equipment notifies the macro cell of the measurement results.

In a case where there is a cell having better downlink reception quality than the threshold, the macro cell determines the user equipment that has performed a measurement as "user equipment that needs support" and determines that cell as "optimum node for uplink". Alternatively, in a case where there is a cell having better downlink reception quality than the threshold as a result of the measurement of a neighboring cell, the user equipment may determine the own user equipment as "user equipment that needs support" and determine that cell as "optimum node for uplink".

In a case of the measurement while the user equipment is connected, a configuration different from the conventional measurement configuration, measurement object, and reporting configuration, which are disclosed in Non-Patent Document 2, is provided. For example, a measurement configuration for changing an uplink transmission configuration, a measurement object for changing an uplink transmission configuration, and a reporting configuration for changing an uplink transmission configuration are provided. This allows the measurement for changing an uplink transmission configuration and measurement reporting also in a case where the serving cell has good downlink communication quality.

In a case where there is a cell having the downlink reception quality better than the threshold, the macro cell determines the user equipment that has performed a measurement as "user equipment that needs support" and determines that cell as "optimum node for uplink". Alternatively, in a case where there is a cell having the better downlink reception quality than the threshold as a result of the measurement of a neighboring cell, the user equipment may determine the own user equipment as "user equipment that needs support" and determine that cell as "optimum node for uplink".

The measurement for a user equipment to change the uplink transmission configuration can be switched on and off. That is, to execute or not execute a measurement can be switched. The following four (a) to (d) are disclosed as specific examples of the conditions for switching on and off. (a) The user equipment switches on and performs a measurement if there is an RRH connected to the macro cell through a dedicated line, or switches off and does not perform a measurement if there is no such an RRH. (b) The user equipment switches on and performs a measurement if there is an RRH sharing the function of the macro cell, or switches off and does not perform a measurement if there is no such an RRH. (c) The user equipment switches on and performs a measurement if there is an RRH located in the coverage of the macro cell, or switches off and does not perform a measurement if there is no such an RRH. (d) Combination of (a) to (c) above.

The following two (a) and (b) are disclosed as specific examples of the method of notifying a user equipment of switching on or off of the measurement for the user equipment to change the uplink transmission configuration. (a) A notification is made in the broadcast information. (b) A notification is made in the dedicated information. For example, a notification is made by RRC signaling or RRC message. Alternatively, a notification is made by MAC signaling or MAC message. Still alternatively, a notification is made by layer 1 signaling, as a specific example, using PDCCH.

(A2) An indicator for notifying that the user equipment is located near "optimum node for uplink" is provided. The macro cell may notify a cell identifier such as PCI or GCI of a local node and a downlink carrier frequency of a local node. As a result, a user equipment can reduce measurement objects, leading to lower power consumption of the user equipment.

When the downlink reception quality from the local node becomes equal to or larger than a predetermined threshold irrespective of the downlink reception quality of the serving cell, the macro cell notifies that the user equipment is located near "optimum node for uplink". This notification may contain a cell identifier such as PCI or GCI, an identifier of a local node, and reception quality such as downlink reception quality and path loss. The identifier of local node may be broadcast from the local node. The notification of the identifier of a local node may be unnecessary as long as a cell identifier is associated with the local node identifier by the macro cell.

The macro cell determines the user equipment that has notified that it is located near "optimum node for uplink" as "user equipment that needs support" and determines an object cell as "optimum node for uplink". Alternatively, in a case of judging that a user equipment is located near the optimum node for uplink, the user equipment may determine the own user equipment as "user equipment that needs support" and determine that cell as "optimum node for uplink".

The function of the conventional proximity indication (see Non-Patent Document 2) may be extended as described above. As a result, it is not required to newly provide an indicator, which enables to prevent a communication system from becoming complex.

(B) Method in which an RRH supports the determination of a macro cell. The macro cell makes a judgment based on the reception quality of the uplink resource of the macro cell, which has been received by the RRH and notified the macro cell. The RRH adds an identifier of the own RRH when transmitting a reception signal or reception data regarding the uplink resource of the macro cell to the macro cell. This enables the macro cell to identify "optimum node for uplink". The macro cell evaluates the uplink reception quality at the RRH of each user equipment using the reception signal or reception data of the uplink resource of the macro cell, which has been notified from the RRH.

Examples of the signal for use in the evaluation of uplink reception quality include reference signals. The reference signals include a demodulation reference signal and a sounding reference signal. In a case where there is a cell having the uplink reception quality better than a threshold from the evaluation results about the uplink reception quality at an RRH of each user equipment, the macro cell determines this user equipment as "user equipment that needs support" and determines that cell as "optimum node for uplink".

The method (B) in which an RRH supports the determination of a macro cell is more effective than the method (A) in which a user equipment supports the determination of the macro cell in the following respect. The above-mentioned method (A) is a method in which a determination is made based on the downlink reception quality. Meanwhile, the above-mentioned method (B) is a method in which a determination is made based on the uplink reception quality. In the present embodiment, the carrier frequency differs between downlink and uplink. Each reception quality has different frequency characteristics. Therefore, in selection of an optimum node for uplink, fewer errors occur if a judgment is made in uplink. The RRH needs an operation in downlink in the above-mentioned method (A), whereas the RRH does not need an operation in downlink in the above-mentioned method (B). As a result, radio resources can be effectively used in the above-mentioned method (B).

(2) An RRH determines a user equipment. The RRH makes a judgment based on the reception quality of the received uplink resource of the macro cell. The RRH evaluates the uplink reception quality in the RRH of each user equipment using the reception signal or reception data of the uplink resource of the macro cell. Examples of the signals for use in the evaluation of uplink reception quality include reference signals. The reference signals include a demodulation reference signal and a sounding reference signal.

In a case where there is a cell having better uplink reception quality than a threshold from the evaluation results of the uplink reception quality in the RRH of each user equipment, the RRH determines that user equipment as "user equipment that needs support" and determines the own cell as "optimum node for uplink". The RRH notifies the macro cell of the identifier of the user equipment, such as UE-ID or C-RNTI, as the information of "user equipment that needs support". The RRH notifies the macro cell of the identifier of the own RRH, such as PCI or GCI, as the information of "optimum node for uplink".

The above-mentioned method of the specific example (2) in which an RRH determines a user equipment is more effective in the following point compared with the method (A) in which a user equipment supports the determination of a macro cell in the above-mentioned specific example (1) in which a macro cell determines a user equipment. The method (A) of the specific example (1) described above is a method in which a determination is made based on the downlink reception quality. Meanwhile, the method of the specific example (2) is a method in which a determination is made based on the uplink reception quality. In the present embodiment, the carrier frequency differs between downlink and uplink. Each reception quality has different frequency characteristics. Therefore, in the selection of an optimum node for uplink, fewer errors occur in a case where a determination is made in uplink. The RRH needs an operation in downlink in the method (A) of the specific example (1) described above, whereas the RRH does not need an operation in downlink in the method of the specific example (2) described above. As a result, radio resources can be effectively used in the method of the specific example (2) described above.

The method of the specific example (2) in which an RRH determines a user equipment has the following four problems (a) to (d) in the reception of a reference signal. A solution to each problem is disclosed as the method in which a local node receives a reference signal from a user equipment to a macro cell.

(a) An uplink reference signal is scrambled with an identifier of a user equipment (see TS 36.211 V10.0.0 (hereinafter, referred to as "Non-Patent Document 13") by 3GPP). The RRH that is not connected with the user equipment does not recognize the identifier of the user equipment. Accordingly, the RRH cannot evaluate the uplink reference signal transmitted from the user equipment to the macro cell unless any improvement is made.

The solution to this problem (a) is disclosed below. A macro cell notifies an RRH of the identifier of a user equipment being served thereby, such as UE-ID or C-RNTI. The macro cell may notify an RRH of the identifier of the user equipment during connection which is being served thereby. For example, a dedicated line or X2 interface is used in this notification.

(b) The sequence of uplink reference signaling may depend on an identifier of a cell (see Non-Patent Document 13). The RRH does not recognize an identifier of a macro cell. Accordingly, at times, the RRH cannot evaluate the uplink reference signal transmitted from the user equipment to the macro cell unless any improvement is made. The following two (b1) and (b2) are disclosed as solutions to this problem (b).

(b1) The macro cell notifies an RRH of an identifier of a cell such as PCI or GCI. The macro cell may notify the RRH of an identifier of a cell as required. Specific examples of the case where the notification is required include the case in which hopping is applied for an uplink reference signal. For example, a dedicated line or X2 interface is used in this notification.

(b2) The macro cell and RRH have the same cell identifier, specifically. PCI. The macro cell and the RRH being served by the macro cell may have the same cell identifier. A specific example of the RRH being served by the macro cell is similar to that of the first embodiment described above, which is not described here.

(c) A method of transmitting an uplink reference signal depends on a user-equipment-specific parameters regarding the method of transmitting a reference signal specified by higher layers (see Non-Patent Document 13). Specific examples of the parameters include "srs-bandwidth" indicating a bandwidth of a sounding reference signal, "transmissionComb" indicating that the sounding reference signal is periodic, and "transmissionComb-ap" indicating that the sounding reference signal is aperiodic.

The RRH that is not connected with the user equipment does not recognize a user-equipment-specific parameter regarding the method of transmitting a reference signal specified by higher layers. Accordingly, the RRH cannot evaluate the uplink reference signal transmitted from the user equipment to the macro cell unless any improvement is made.

A solution to this problem (c) is disclosed below. The macro cell notifies the RRH of the user-equipment-specific parameter regarding the method of transmitting a reference signal specified by higher layers. The macro cell may notify the RRH of a user-equipment-specific parameter regarding the method of transmitting a reference signal specified by higher layers to a user equipment during connection that is being served by the macro cell. For example, a dedicated line or X2 interface is used in this notification.

(d) The method of transmitting uplink reference signals depends on a cell-specific parameter regarding the method of transmitting reference signals specified by the higher layers (see Non-Patent Document 13). Specific examples of the parameters include "Group-hopping-enabled" indicating whether or not the sequence of reference signaling is subjected to group hopping, "srs-bandwidth" indicating the bandwidth for sounding reference signals, and "MaxUpPts" regarding sounding reference signals. The RRH does not recognize the cell-specific parameters regarding the method of transmitting reference signals specified by higher layers. Therefore, the RRH cannot evaluate the uplink reference signals transmitted from the user equipment to the macro cell unless any improvement is made. The following two (d1) and (d2) are disclosed as solutions to the problem (d).

(d1) The macro cell notifies the RRH of the cell-specific parameters regarding the method of transmitting reference signals specified by the higher layers. The macro cell may notify the RRH of identifier of a cell as required. For example, a dedicated line or X2 interface is used in this notification.

(d2) The cell-specific parameters regarding the method of transmitting reference signals specified by higher layers are the same between the macro cell and RRH. The cell-specific parameters regarding the method of transmitting reference signals specified by higher layers may be the same between the macro cell and the RRH being served by the macro cell. A specific example of the case where the RRH is being served by the macro cell is as in the first embodiment described above, which is not described here.

In a case where the demodulated data or decoded data in the specific example (3) described above is used as a signal to be transmitted from the RRH to the macro cell in the first embodiment described above, the following problem arises as in the above-mentioned case. That is, unless any improvement is made, the RRH cannot receive and use the uplink reference signals transmitted from the user equipment to the macro cell. Therefore, the RRH cannot demodulate and decode the uplink data transmitted from the user equipment to the macro cell. Also in that case, the problem can be solved through application of the "method in which a local node receives a reference signal from a user equipment to a macro cell" described above.

In a case where the uplink transmission from a user equipment is received at points other than the point targeted for uplink communication, the following problem arises as described above. That is, unless any improvement is made, uplink reference signals cannot be received and used at points other than the point targeted for uplink communication. Therefore, the uplink data transmitted to points targeted for uplink communication, which has been transmitted by the user equipment, cannot be demodulated and decoded at points other than the point targeted for uplink communication. Also in that case, the problem can be solved through application of the "method in which a local node receives a reference signal from a user equipment to a macro cell" described above.

The following three (1) to (3) are disclosed as specific examples of the configuration of the conventional uplink transmission.

(1) The user equipment configures the uplink transmission power based on a path loss (see Chapter 5.1 of TS 36.213 V10.0.1 (hereinafter, referred to as "Non-Patent Document 14") by 3GPP).

(2) Time alignment (TA) means that uplink transmission timing is advanced or delayed. The time alignment (TA) is obtained from a timing advance command. The time alignment (TA) indicates an adjusted value relative to the uplink transmission timing at that point in time. Upon receipt of a timing advance command, the user equipment adjusts the uplink transmission timing of the PUCCH, PUSCH, and sounding reference signal (SRS) (see Chapter 4.2.3 of Non-Patent Document 14).

(3) The user equipment performs frequency synchronization based on a downlink signal frequency (hereinafter, also referred to as "reference frequency f") (see Non-Patent Document 1).

As the method of configuring an uplink transmission suitable for an optimum node, the uplink transmission is configured using the parameter suitable for an optimum node. The parameters are equivalent to the transmission conditions. The uplink transmission is configured by the conventional method using the parameters suitable for an optimum node. The conventional method of configuring an uplink transmission is used, which enables to construct a communication system having excellent backward compatibility. Specific examples of the parameters include a path loss (PL), timing advance command, and reference frequency f. Timing advance command may be time alignment (TA).

The following two (1) and (2) are disclosed as the method of configuring a path loss suitable for an optimum node.

(1) A path loss is configured by the user equipment based on measurement results. The user equipment measures an optimum node, for example, a downlink resource of the RRH to obtain a path loss, and configures the obtained path loss as a path loss suitable for an optimum node. This configuration method (1) is more advantageous than the configuration method (2) described below in that an optimum node, for example, a downlink resource of the RRH is actually measured, leading to fewer errors.

A specific example of the sequence of the communication system in the method (1) of configuring a path loss suitable for an optimum node is described with reference to FIG. 22. FIG. 22 is a diagram showing an example of the sequence in a case where the user equipment configures a path loss suitable for an optimum node based on the measurement results. This operation example discloses a case in which an RRH is installed in the coverage of a macro cell, and also discloses a case in which a user equipment camps on a macro cell and the optimum node for uplink is an RRH.

In Step ST2201, the macro cell performs downlink transmission to the user equipment (UE). The downlink transmission may be the transmission dedicatedly to a user equipment or the broadcast information.

In Step ST2202, the user equipment measures a downlink resource of the macro cell from the downlink transmission transmitted from the macro cell in Step ST2201, to thereby obtain a path loss from the macro cell.

In Step ST2203, the user equipment configures an uplink transmission suitable for the macro cell using the path loss obtained in Step ST2202.

In Step ST2204, the RRH performs a downlink transmission to the user equipment. The following two (1) and (2) are disclosed as specific examples of the downlink transmission. (1) The transmission power information of reference signals of the RRH are transmitted by the broadcast information. (2) The reference signals are transmitted. This transmission may be the transmission dedicatedly to a user equipment or the broadcast information.

In Step ST2205, the user equipment measures a downlink resource of the RRH from the downlink transmission transmitted from the RRH in Step ST2204, to thereby obtain a path loss from the RRH. A specific example of the method of obtaining a path loss is disclosed below. The user equipment measures the reception power of reference signals of the RRH. The user equipment receives the broadcast information of the RRH to obtain the transmission power information regarding the reference signals of the RRH. The user equipment obtains a path loss from a difference between the transmission power information regarding the reference signals of the RRH and the actually-received reception power of the reference signals of the RRH.

In Step ST2206, the user equipment configures the path loss obtained in Step ST2205 as a path loss suitable for an optimum node (RRH).

In Step ST2207, the user equipment configures the uplink transmission suitable for an optimum node, as a specific example, configures the uplink transmission power, using the path loss configured in Step ST2206. In this operation example, an optimum node is an RRH.

In Step ST2208, the user equipment performs an uplink transmission to the macro cell based on the configuration of the uplink transmission configured in Step ST2207.

However, the method (1) of configuring a path loss suitable for an optimum node needs the downlink operation in the RRH, which poses a problem in effective use of radio resources. Specific examples of the problem include the need to transmit the reference signals of the RRH and the transmission power information of the reference signals by the RRH. The method (2) of configuring a path loss suitable for an optimum node is disclosed below as the method of solving this problem.

(2) The macro cell configures a path loss for the user equipment. The following four (A) to (D) are disclosed as specific examples of the value to be configured.

(A) The macro cell obtains a path loss from the user equipment in the RRH and notifies the user equipment of the resultant. As in the first embodiment described above, the RRH receives the uplink resource transmitted from the user equipment to the macro cell. The RRH notifies the macro cell of a reception signal of the uplink resource of the macro cell received by the RRH. The macro cell obtains the path loss from the user equipment in the RRH, from the reception signal of the uplink resource of the macro cell received by the RRH. The macro cell notifies the user equipment of the path loss from the user equipment in the RRH. The user equipment configures the received path loss from the user equipment in the RRH as a path loss suitable for an optimum node.

(B) The macro cell obtains an offset value and notifies the user equipment of the obtained offset value. As in the first embodiment described above, the RRH receives the uplink resource transmitted from the user equipment to the macro cell. The RRH notifies the macro cell of a reception signal of the uplink resource of the macro cell received by the RRH. The macro cell obtains a path loss from the user equipment in the RRH, from the reception signal regarding the uplink resource of the macro cell received by the RRH. The macro cell separately obtains a path loss from the user equipment in the macro cell, from the reception signal of the uplink resource of the macro cell received by the macro cell. The macro cell calculates, as an offset value, a difference between the path loss from the user equipment in the RRH and the path loss from the user equipment in the macro cell. The macro cell notifies the user equipment of this offset value. The user equipment measures a downlink resource of the macro cell to obtain a path loss, and adds the offset value received from the macro cell to the obtained path loss, to thereby configure the resultant as a path loss suitable for an optimum node.

A specific example of a sequence of a communication system in a case where the macro cell obtains an offset value and notifies the user equipment of the obtained offset value in (B) of the method (2) of configuring a path loss suitable for an optimum node is described with reference to FIG. 23. FIG. 23 is a diagram showing an example of the sequence in a case where the macro cell obtains an offset value and notifies the user equipment of the obtained offset value to configure a path loss suitable for an optimum node. The sequence shown in FIG. 23 is similar to the sequences shown in FIGS. 19 and 22, and thus, the same steps are denoted by the same step numbers and common description is not given here. This operation example discloses a case in which an RRH is installed in the coverage of the macro cell. Also disclosed is a case in which the user equipment camps on the macro cell and an optimum node for uplink is an RRH.

In Step ST2301, the user equipment (UE) performs an uplink transmission to the macro cell based on the uplink transmission configuration suitable for the macro cell, which has been configured in Step ST2203.

In Step ST2302, the macro cell measures the uplink transmission transmitted from the user equipment (UE) to the macro cell in Step ST2301, that is, uplink resource of the macro cell from the user equipment, to thereby obtain a path loss from the user equipment to the macro cell.

In Step ST1908, the RRH receives the uplink resource of the macro cell from the UE. In Step ST1909, the RRH notifies the macro cell of the reception signal regarding the uplink resource of the macro cell, which has been received by the RRH.

In Step ST2303, the macro cell obtains a path loss from the user equipment to the RRH, from the reception signal regarding the uplink resource from the UE to the macro cell received by the RRH, which has been received in Step ST1909.

In Step ST2304, the macro cell obtains an offset value from the path loss from the user equipment to the macro cell, which has been obtained in Step ST2302, and the path loss from the user equipment to the RRH, which has been obtained in Step ST2303. Specific examples of the way of obtaining an offset value include to obtain a difference between the path loss from the user equipment to the macro cell, which has been obtained in Step ST2302, and the path loss from the user equipment to the RRH, which has been obtained in Step ST2303.

In Step ST2305, the macro cell notifies the user equipment of the offset value obtained in Step ST2304. Dedicated transmission to the user equipment may be used in this notification.

In Step ST2306, the user equipment configures a path loss using the offset value received in Step ST2305, as a path loss suitable for an optimum node. Specific examples of the method of configuring a path loss using an offset value include the addition of the offset value received in Step ST2305 to the path loss from the user equipment to the macro cell, which has been obtained in Step ST2202.

In Step ST2207, the user equipment configures an uplink transmission suitable for an optimum node, as a specific example, configures uplink transmission power, using the path loss configured in Step ST2306. In this operation example, the optimum node is an RRH.

In Step ST2208, the user equipment performs an uplink transmission to the macro cell based on the configuration of the uplink transmission configured in Step ST2207.

The specific examples (A) and (B) described above pose such a problem that the path loss from the user equipment in the RRH changes every time the user equipment moves, and accordingly, a notification from the macro cell is required each and every time, which complicates control.

Also, the specific examples (A) and (B) described above pose such a problem that an uplink resource to be transmitted from the user equipment to the macro cell is required, and the uplink resource cannot be used for an initial uplink transmission, for example, for RACH. Specific examples (C) and (D) are disclosed below as the solutions to those problems.

(C) The macro cell obtains an offset value and notifies the user equipment of the obtained offset value. The RRH notifies the macro cell of the transmission power information of the RRH. The macro cell calculates an offset value from a difference between the transmission power from the macro cell and the transmission power from the RRH. The macro cell notifies the user equipment of this calculated offset value. The user equipment measures a downlink resource of the macro cell to obtain a path loss, and adds the offset value received from the macro cell to the obtained path loss, to thereby configure the resultant as a path loss suitable for an optimum node.

(D) A path loss suitable for an optimum node is predetermined in a static or semi-static manner. In a case where, for example, a local node has small coverage, it is conceivable that the path loss of a constant value may pose no problem regardless of a user equipment location. For example, in a case where the RRH has small coverage, the path loss may be determined as "0". Alternatively, a path loss may be determined per local node. A path loss suitable for an optimum node may be notified from the macro cell by the broadcast information or dedicated signaling. The user equipment configures, as a path loss suitable for an optimum node, the path loss received from the macro cell by the broadcast information or dedicated signaling.

The uplink resource to be transmitted from the user equipment to the macro cell is not required in the specific examples (C) and (D) differently from the specific examples (A) and (B) described above. Therefore, the specific examples (C) and (D) are advantageously used also in the initial uplink transmission from the user equipment. In the specific examples (C) and (D), the notification of an offset value from the macro cell to the user equipment is not required even in a case where the user equipment moves. Therefore, in a case where the user equipment moves, the specific examples (C) and (D) are more advantageous than the specific examples (A) and (B) described above in easy control.

In the method (2) of configuring a path loss suitable for an optimum node described above, downlink operation in the RRH is not required. Accordingly, the method (2) of configuring a path loss is more advantageous than the above-mentioned method (1) of configuring a path loss in effective use of radio resources.

The above-mentioned configuration method (1) and configuration method (2) can be used in combination. The following two (a) and (b) are disclosed as specific examples of the combination.

(a) The configuration method (1) described above is adopted in a case where the RRH operates a downlink resource. Meanwhile, the configuration method (2) is adopted in a case where the RRH does not operate a downlink resource.

(b) The method (2) of configuring a path loss suitable for an optimum node is adopted to configure a path loss. Even in this case, overwriting is allowed based on the path loss in the method (1) of configuring a path loss suitable for an optimum node.

The following two (b1) and (b2) are disclosed as specific examples of the timing of overwriting in the specific example (b); (b1) timing at which the RRH starts operation of a downlink resource, and (b2) timing at which the user equipment starts receiving the downlink resource of the RRH.

The specific examples (A) to (C) regarding the value to be configured can be used in combination also in the configuration method (2) above. A specific example of the combination is disclosed below. The specific example (C) is used in the initial uplink transmission, and the specific example (A) or specific example (B) is used in the following uplink transmissions.

The method of configuring a timing advance command suitable for an optimum node is disclosed below. The macro cell configures a value for the user equipment A specific example of the value to be configured is disclosed below. A timing advance command suitable for an optimum node is predetermined in a static or semi-static manner. In a case where, for example, a local node has small coverage, it is conceivable that the timing advance command of a constant value will pose no problem regardless of a user equipment location. For example, in a case where the RRH has small coverage, the timing advance command may be determined as 'V'. Alternatively, a timing advance command may be determined per local node. A timing advance command suitable for an optimum node may be notified from the macro cell by the broadcast information or dedicated signaling.

In the configuration method described above, the RRH needs not to perform downlink operation. Accordingly, radio resources can be used effectively. In addition, an uplink resource to be transmitted from the user equipment to the macro cell is not required. Therefore, the uplink resource can be used also in the initial uplink transmission from the user equipment.

The following two (1) and (2) are disclosed as the method of configuring a reference frequency suitable for an optimum node. (1) The user equipment configures a reference frequency based on the measurement results. The user equipment measures the downlink resource of the RRH and configures the downlink carrier frequency as a reference frequency. The downlink resource of the RRH is actually measured in this configuration method (1), and thus is more effective than the configuration method (2) described below in fewer errors.

A specific example of the method (1) of configuring a reference frequency is described with reference to FIG. 18 described above. The downlink carrier frequency and uplink carrier frequency of the macro cell are represented as DL_f1 and UL_f1, respectively. The downlink carrier frequency and uplink carrier frequency of the RRH are represented as DL_f2 and UL_f2, respectively.

The user equipment measures a downlink resource of an RRH, and recognizes and configures the downlink carrier frequency DL_f2 as a reference frequency.

However, the RRH needs to operate the downlink in the method (1) of configuring a reference frequency, which poses a problem in effective use of radio resources. The methods (2) and (3) of configuring a reference frequency suitable for an optimum node are disclosed below as the method of solving the problem.

(2) The RRH synchronizes reference frequencies with the macro cell. The following three (a) to (c) are disclosed as specific examples of the synchronization method.

(a) The macro cell notifies the RRH of the frequency information. The frequency information may be a reference frequency or downlink carrier frequency. The RRH that has received the frequency information synchronizes the RRH frequency with the macro cell frequency. The user equipment synchronizes frequencies based on the downlink signal frequency of the macro cell. The RRH frequency and macro cell frequency are in synchronization with each other. Accordingly, the frequency of the user equipment is synchronized with that of the macro cell, whereby the frequency of the user equipment is synchronized with that of the RRH.

A specific example of the specific example (a) of the method (2) of configuring a reference frequency is described with reference to FIG. 18 described above. The downlink carrier frequency and uplink carrier frequency of the macro cell are represented as DL_f1 and UL_f1, respectively. The downlink carrier frequency and uplink carrier frequency of the RRH are represented as DL_f2 and UL_f2, respectively. The macro cell notifies the RRH of the frequency information. The downlink carrier frequency DL_f1 or the uplink carrier frequency UL_f1 of the macro cell is conceivable as the frequency information. The RRH synchronizes the carrier frequencies DL_f2 and UL_f2 of the RRH to the frequency information received from the macro cell. The user equipment synchronizes frequencies based on the downlink carrier frequency DL_f1 of the macro cell.

(b) The RRH receives a downlink signal from the macro cell and synchronizes frequencies based on the frequency of the macro cell. The user equipment synchronizes frequencies based on the frequency of the downlink signal of the macro cell. The frequency of the RRH and the frequency of the macro cell are in synchronization with each other. Therefore, as a result of the synchronization of the frequency of the user equipment with that of the macro cell, the frequency of the user equipment is synchronized with that of the RRH.

(c) The macro cell and the RRH configure a frequency using the same reference signal source. Specific examples of the reference signal source include a crystal unit, crystal oscillator, and clock oscillator.

A specific example of the specific example (b) of the method (2) of configuring a reference frequency is described with reference to FIG. 18. The downlink carrier frequency and uplink carrier frequency of the macro cell are represented as DL_f1 and UL_f1, respectively. The downlink carrier frequency and uplink carrier frequency of the RRH are represented as DL_f2 and UL_f2, respectively. The RRH receives the downlink carrier frequency DL_f1 of the macro cell and synchronizes frequencies based on the downlink carrier frequency DL_f1. The user equipment synchronizes frequencies based on the frequency DL_f1 of the downlink signal of the macro cell. The frequency of the RRH and the frequency of the macro cell are in synchronization with each other. Therefore, as a result of the synchronization of the frequency of the user equipment with that of the macro cell, the frequency of the user equipment is synchronized with that of the RRH.

The following three (1) to (3) are disclosed as specific examples of the method of configuring a parameter suitable for an optimum node.

(1) The macro cell notifies the user equipment of a parameter by dedicated signaling. This notification may be transmitted with an identifier of a target local node, for example, with the PCI and GCI. This enables to configure a parameter suitable for an optimum node per local node.

(2) The macro cell notifies the user equipment of a parameter using paging. An indicator showing a notification of a parameter suitable for an optimum node may be newly provided in a paging message. The following two (a1) and (a2) are disclosed as specific examples of the method of making a notification using paging. (a1) "Parameter suitable for an optimum node" is mapped to a paging message. As a specific example, "parameter suitable for an optimum node" is mapped to the PCCH. (a2) Calling through paging and RRC connection are performed, and then, "parameter suitable for an optimum node" is notified using dedicated signaling.

(3) The macro cell notifies the user equipment of a parameter using the broadcast information.

In the specific example (1) described above, a parameter is notified by dedicated signaling, whereby the macro cell and user equipment need to be in RRC connected. That is, in a case of an idle state of the user equipment, a parameter suitable for an optimum node cannot be configured. In addition, a parameter cannot be used in the initial uplink transmission, for example, RACH.

Meanwhile, the macro cell and user equipment need not to be in RRC connected in the specific examples (2) and (3) described above, differently from the specific example (1) described above. Therefore, a parameter suitable for an optimum node can also be configured to a user equipment in an idle state. In addition, a parameter suitable for an optimum node can also be used in the initial uplink transmission from the user equipment.

The following two (1) and (2) are disclosed as specific examples of the method in which a user equipment starts the use of the configuration of an uplink transmission suitable for an optimum node in uplink or the method in which a user equipment ends the use of the configuration of an uplink transmission suitable for an optimum node in uplink. In other words, the following two (1) and (2) are disclosed as specific examples of the method in which a user equipment switches from the configuration of the uplink transmission suitable for an optimum node in downlink to the configuration of the uplink transmission suitable for an optimum node in uplink or the method in which a user equipment switches from the configuration of the uplink transmission suitable for an optimum node in uplink to the configuration of the uplink transmission suitable for an optimum node in downlink.

(1) The macro cell notifies the user equipment that the use of the configuration of an uplink transmission suitable for an optimum node in uplink is started and that the use of the configuration of an uplink transmission suitable for an optimum node in uplink is ended. The following two (a) and (b) are disclosed as specific examples of the method of notifying the start and end.

(a) The information indicating that the use of the configuration of an uplink transmission suitable for an optimum node in uplink is started or the information "activation" indicating that activation is notified by dedicated signaling. Or, the information indicating that the use of the configuration of an uplink transmission suitable for an optimum node in uplink is ended or the information "deactivation" indicating deactivation is notified. The following three (A) to (C) are disclosed as specific examples of dedicated signaling. (A) The information is notified by RRC signaling or RRC message. (B) The information is notified by MAC signaling or MAC message. (C) The information is notified using layer 1 signaling, as a specific example, PDCCH.

(b) The information indicating that the use of the configuration of an uplink transmission suitable for an optimum node in uplink is started, or the information "activation" indicating activation is notified by paging. Or, the information indicating that the use of the configuration of an uplink transmission suitable for an optimum node in uplink is ended or the information "deactivation" indicating deactivation is notified. Indicator indicating a notification of the start and end may be newly provided in the paging message.

(2) The macro cell notifies only the start. The macro cell also notifies an effective period, and ends the use of the configuration of an uplink transmission suitable for an optimum node in uplink after a lapse of the effective period from the start. Also, the start of the use of the configuration of an uplink transmission suitable for an optimum node in uplink may be notified through a notification of a parameter suitable for an optimum node in the specific examples (1) and (2).

The macro cell may interrupt the reception of an uplink resource from the user equipment which has been notified that the use of the configuration of an uplink transmission suitable for an optimum node in uplink is started. The macro cell may restart the reception of an uplink resource from the user equipment which has been notified that the use of the configuration of an uplink transmission suitable for an optimum node in uplink is ended.

Alternatively, the macro cell may interrupt the reception of an uplink resource from the user equipment if the user equipment has good reception quality regarding the uplink resource of the macro cell in the RRH. The macro cell may restart the reception of an uplink resource from the user equipment if the user equipment has poor reception quality regarding the uplink resource of the macro cell in the RRH. There may be provided a threshold of the reception quality for judging an interruption or restart of the reception.

Alternatively, the resource whose reception has been interrupted may be scheduled to other user equipment. Specific examples of the other user equipment include a user equipment that is not located near the RRH and a user equipment that is located near the macro cell.

Switching on and off the function of the RRH to receive an uplink resource of a macro cell may be allowed.

Specific examples of the case in which the function to receive an uplink resource is switched on include the case in which there is a user equipment that selects the RRH as an optimum node. A notification made by a macro cell in a case where there is a user equipment that selects the RRH as an optimum node is conceivable as a specific example of the method in which the RRH recognizes on-timing.

Specific examples of the case in which the function to receive an uplink resource is switched off include the case in which there is no user equipment that selects the RRH as an optimum node. A notification made by a macro cell in a case where there is no user equipment that selects the RRH as an optimum node is conceivable as a specific example of the method in which the RRH recognizes off-timing.

In a case where the uplink transmission is configured suitably for an optimum node, which is for a user equipment, the macro cell may judge that there is a user equipment that selects the RRH as an optimum node. Meanwhile, in a case where the uplink transmission is not configured suitably for an optimum node, which is for a user equipment, the macro cell may judge that there is no user equipment that selects the RRH as an optimum node.

Next, a specific example of a sequence of a communication system in the second embodiment is described with reference to FIG. 24. FIG. 24 is a diagram showing an example of the sequence of the communication system in the second embodiment. The sequence shown in FIG. 24 is similar to the sequences shown in FIGS. 19, 22, and 23, and thus, the same steps are denoted by the same step numbers and common description is not given here.

This operation example discloses a case in which the RRH is installed in the coverage of the macro cell, and also discloses a case in which the user equipment camps on the macro cell and the optimum node for uplink is an RRH.

This operation example discloses the case in which the RRH determines a user equipment in the specific example (2) described above, as a specific example of a method of determining a user equipment whose optimum node differs between uplink and downlink. This operation example discloses the case in which a macro cell notifies a user equipment by dedicated signaling in the specific example (1) described above, as a specific example of the method of configuring a parameter suitable for an optimum node.

In Step ST2401, the macro cell notifies the RRH of the information required for receiving a reference signal. Specific examples of the information required for receiving a reference signal include an identifier of a user equipment during connection that is being served by the macro cell, a cell identifier of the macro cell, a user-equipment-specific parameter regarding the method of transmitting a reference signal specified from higher layers to a user equipment during connection that is being served by the macro cell, and a cell-specific parameter regarding the method of transmitting a reference signal.

In Step ST2402, the RRH evaluates the uplink reception quality of each user equipment at the RRH using the reception signal or reception data regarding the uplink resource of the macro cell.

In Step ST2403, the RRH judges whether or not there is a user equipment having the uplink reception quality higher than a threshold, based on the evaluation results of the uplink reception quality in Step 2402. In a case of judging that there is a user equipment having the uplink reception quality higher than the threshold in Step ST2403, the RRH moves to Step ST2404. In a case of judging there is no user equipment having the uplink reception quality higher than the threshold in Step ST2403, the RRH ends the process and moves to other process. The other process is not specific to the present invention, which is not described here.

In Step ST2404, the RRH determines, as a user equipment that needs support, the user equipment judged to have the uplink reception quality higher than the threshold in Step ST2403.

In Step ST2405, the RRH notifies the macro cell of the identifier of the user equipment that has been determined as a user equipment that needs support in Step ST2404.

In Step ST2406, the RRH notifies the macro cell that the own RRH is an optimum node in uplink for the user equipment that needs support, which has been notified in Step ST2405. Specifically, the RRH notifies the macro cell of the identifier of the own RRH.

In Step ST2407, the macro cell determines the configuration of an uplink transmission suitable for a node optimum for the user equipment received in Step ST2405. Specifically, the macro cell determines the configuration of the uplink transmission suitable for an optimum node in uplink, which has been received in Step ST2406. Specific examples of the parameters of uplink transmission include a path loss, timing advance command, and reference frequency f.

In Step ST2408, the macro cell notifies the user equipment of the configuration of an uplink transmission suitable for an optimum node in uplink, which has been determined in Step ST2407.

In Step ST2409, the user equipment reflects the configuration of the uplink transmission suitable for an optimum node in uplink, which has been received in Step ST2408.

In Step ST2410, the user equipment performs uplink transmission to the macro cell, based on the uplink transmission configuration suitable for an optimum node in uplink, which has been reflected in Step ST2409.

In Step ST2411, the macro cell interrupts the reception of the uplink resource of the user equipment that has been notified of the configuration of the uplink transmission suitable for an optimum node in uplink in Step ST2408. The macro cell may interrupt the reception of an uplink resource scheduled to the user equipment.

The second embodiment described above can achieve the following effects in addition to the effects of the first embodiment and the first modification of the first embodiment. As described above, a link imbalance causes a situation in which an optimum link is not used in uplink communication. In this case, the transmission power required by the user equipment becomes larger compared with the case in which an optimum link is used. This leads to a problem of increased power consumption of a user equipment.

In the present embodiment, the uplink transmission suitable for a node optimum for uplink is configured. As a result, the transmission power required by a user equipment is optimized. This leads to a reduction in power consumption of the user equipment. Additionally, unnecessary uplink transmission power from the user equipment can be reduced, leading to a reduction in uplink interference.

Meanwhile, in the solution of the second embodiment, the UE performs uplink transmission persistently to the macro cell on which the UE camps. The UE needs no additional notification or additional function. In this respect, the second embodiment is capable of constructing a communication system having excellent backward compatibility.

While the present embodiment has disclosed the case in which the carrier frequency of the local node differs from the carrier frequency of the macro cell, the present embodiment is also applicable to a case in which the carrier frequency of the local node and the carrier frequency of the macro cell are identical to each other. This enables to achieve similar effects to those of the present embodiment.

While the present embodiment has described the configuration of the communication system in a case where a remote radio head (RRH) is used as a local node, the local node is not limited to an RRH but may be a local node other than the RRH. The present embodiment is also applicable to local nodes other than the RRH, which enables to achieve similar effects to those of the present embodiment.

While the present embodiment has mainly disclosed a case in which an optimum node for uplink is a local node, the present embodiment is also applicable if the optimum node for uplink is a macro cell. This enables to achieve similar effects to those of the present embodiment.

Third Embodiment

A third embodiment discloses another solution to the same problem as that of the first embodiment and second embodiment described above. The solution in the third embodiment is described below. Carrier aggregation is performed using an uplink component carrier of an optimum node in uplink without using downlink component carriers thereof. Alternatively, carrier aggregation is performed using a downlink component carrier and an uplink component carrier of a macro cell and an uplink component carrier of the optimum node in uplink. Still alternatively, a component carrier of the optimum node for uplink is used in uplink of a secondary cell (SCell).

Figure 25:
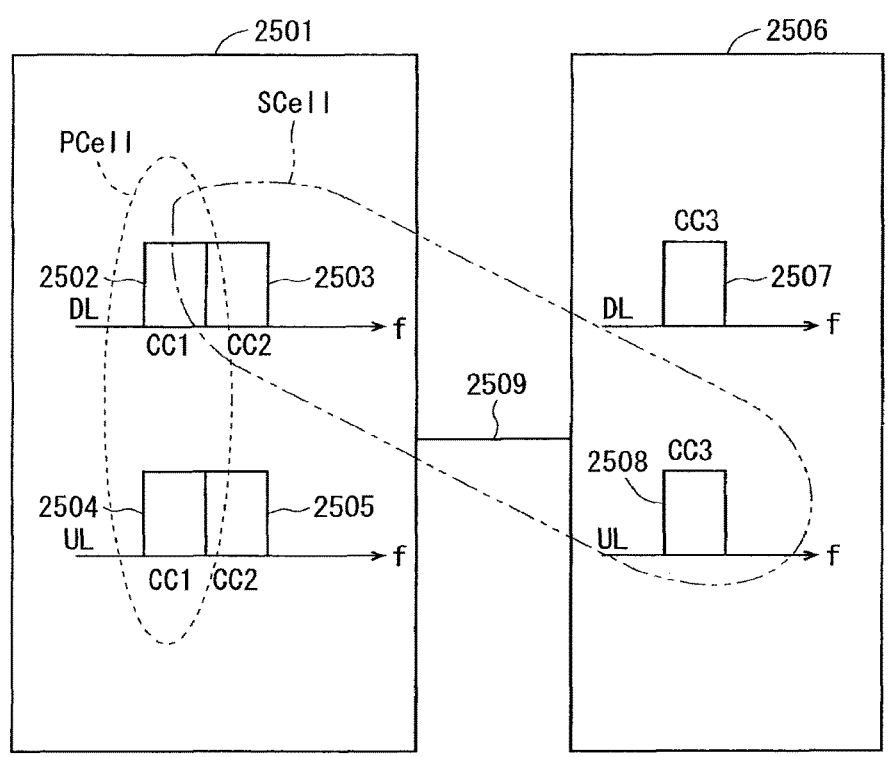
FIG. 25 is a diagram for describing the concept of a solution in a third embodiment.

The concept of the solution in the third embodiment is described with reference to FIG. 25. FIG. 25 is a diagram for describing the concept of the solution in the third embodiment.

A macro cell 2501 includes a DL_CC1 indicated by reference numeral 2502 and a DL_CC2 indicated by reference numeral 2503 as downlink component carriers. The macro cell 2501 also includes a UL_CC1 indicated by reference numeral 2504 and a UL_CC2 indicated by reference numeral 2505 as uplink component carriers.

An RRH 2506 includes a DL_CC3 indicated by reference numeral 2507 as a downlink component carrier. The RRH 2506 also includes a UL_CC3 indicated by reference numeral 2508 as an uplink component carrier. The macro cell 2501 and RRH 2506 are connected through a dedicated line 2509.

A user equipment selects the DL_CC1 indicated by reference numeral 2502 of the macro cell as a cell having the best downlink reception quality, and then camps on the DL_CC1 (see Non-Patent Document 3). That is, the DL_CC1 indicated by reference numeral 2502 of the macro cell serves as a downlink primary component carrier of the PCell. The SIB2 in the broadcast information notified by the downlink component carrier of the PCell shows a carrier frequency of an uplink resource. Here, the UL_CC1 of the macro cell 2501 is notified. That is, the PCell for the user equipment, which is indicated by a broken line in FIG. 25, is composed of the DL_CC1 and UL_CC1. The user equipment is located nearer the RRH than the macro cell. In that case, an optimum node in uplink is the RRH.

In the present embodiment, carrier aggregation is performed using the uplink component carrier UL_CC3 indicated by reference numeral 2508 of the RRH 2506 being an optimum node in uplink without using the downlink component carrier DL_CC3 indicated by reference numeral 2507 thereof.

Alternatively, carrier aggregation is performed using the downlink component carriers of the macro cell 2501 being an optimum node in downlink, which are specifically the DL_CC1 indicated by reference numeral 2502 and the DL_CC2 indicated by reference numeral 2503, the uplink component carriers of the macro cell 2501, which is specifically the UL_CC1 indicated by reference numeral 2504, and the uplink component carrier of the RRH 2506 being an optimum node in uplink, which is specifically the UL_CC3 indicated by reference numeral 2508.

Still alternatively, in uplink of the SCell, the uplink component carrier of the RRH 2506 being an optimum node in uplink, specifically, the UL_CC3 indicated by reference numeral 2508 is used. That is, the SCell for the user equipment indicated by a chain double-dashed line in FIG. 25 is composed of the DI CC2 and UL_CC3.

Disclosed below is a specific example of the method of using an uplink component carrier of an optimum node in uplink for carrier aggregation. A PCell notifies a specific user equipment of the uplink component carrier of the optimum node in uplink as the addition or modification of a SCell. As described above, it is studied that the PCell notifies the user equipment of the addition or modification of the SCell using "RRC Connection Reconfiguration message" of dedicated RRC signaling (see Non-Patent Document 2).

The method of using an uplink component carrier of an optimum node in uplink for carrier aggregation is described with reference to FIG. 25. Added to the DL_CC1 of the macro cell 2501 being a PCell as a SCell using dedicated RRC signaling are the downlink component carrier DL_CC2 included in the macro cell 2501 being an optimum node in downlink and the uplink component carrier UL_CC3 included in the RRH 2506 being an optimum node in uplink.

This is characteristic in that the downlink component carrier DL_CC2 and the uplink component carrier UL_CC3 are not linked by the SIB2 in the broadcast information notified by the downlink component DL_CC2. This is because an optimum node in downlink serves as an optimum node in uplink in a case where, for example, there is no local node in the coverage of the macro cell. In a case where, for example, a user equipment is located nearer the macro cell than the local node even if the local node is located in the coverage of the macro cell, an optimum node in downlink serves as an optimum node in uplink. Therefore, as conventionally, the SIB2 in the broadcast information notified by the downlink component DL_CC2 indicates the uplink resource carrier UL_CC2 of the same node. A specific user equipment whose optimum node differs between downlink and uplink is notified of the link with the UL_CC3 using dedicated RRC signaling.

A specific example of the specific user equipment is a user equipment located in the coverage of the RRH. A specific example of the method of judging a user equipment located in the coverage of the RRH is similar to the specific example of the method of determining a user equipment that needs support in the second embodiment described above, which is not described here. Note that in the present embodiment, the function of receiving an uplink component carrier of a macro cell is provided in the RRH, to thereby realize (B) of the specific example (1) and the specific example (2) described above.

A specific example of the method of selecting an optimum node in uplink is disclosed below. (1) An optimum node is an RRH being served by a macro cell. A specific example of the RRH being served by the macro cell is similar to the specific example of the first embodiment described above, which is not described here.

A problem of poor resource use efficiency arises in the specific example (1) of the method of selecting an optimum node in uplink. The specific example (2) of the method of selecting an optimum node in uplink is disclosed below as the method of solving the problem, (2) A different user equipment is scheduled for each node. A specific example of the method of determining an optimum node for uplink for each user equipment is similar to the specific example of the method of determining an optimum node for uplink in the second embodiment describe above, which is not described here.

The user equipment configures an uplink transmission suitable for an uplink component carrier of an optimum node. This optimizes the transmission power required by the user. As a result, the power consumption of the user equipment can be reduced. The uplink transmission is configured using parameters suitable for an optimum node, as the method of configuring an uplink transmission suitable for an uplink component carrier of an optimum node. Specific examples of the parameters include a path loss (PL), timing advance command, and reference frequency f. The timing advance command may be time alignment (TA).

The method of configuring a path loss suitable for an optimum node is similar to that of the second embodiment described above, which is not described here.

The method of configuring a timing advance command suitable for an optimum node is disclosed below. In the conventional technique, the uplink transmission timing for the PUSCH and SRS of the SCell is identical to that of the PCell (see Chapter 4.2.3 of Non-Patent Document 14). The present embodiment is also targeted for, as an optimum node, a node installed at a place physically remote from the node including the PCell.

The uplink component carrier of the optimum node is used for the SCell in the present embodiment, which causes the following problem in the conventional technique. Even if the user equipment simultaneously performs the transmission using the uplink component carrier of the PCell and the transmission using the uplink component carrier of the SCell, the transmission arrives at each node at different time. Therefore, the method of the conventional technique in which the uplink transmission timing for the PUSCH and SRS of the SCell is identical to that of the PCell poses a problem that the uplink transmission of the SCell may fail to be received normally. The method of configuring a timing advance command suitable for an optimum node is similar to that of the second embodiment described above, which is not described here.

The method of configuring a reference frequency suitable for an optimum node is disclosed below.

(1) A user equipment configures a reference frequency based on the measurement results. The user equipment measures the downlink resource of the RRH, and recognizes and configures a reference frequency. This configuration method (1) is more effective than the configuration method (2) described below in fewer errors because the downlink resource of the RRH is actually measured.

A specific example of the method (1) of configuring a reference frequency is described with reference to FIG. 25 described above. The carrier frequency of the downlink component carrier DL_CC1, carrier frequency of the downlink component carrier DL_CC2, carrier frequency of the uplink component carrier UL_1, and carrier frequency of the uplink component carrier UL 2 of the macro cell are represented as DL_f1, DL_2, UL_f1, and UL_f2, respectively. The carrier frequency of the downlink component carrier DL_CC3 and carrier frequency of the uplink component carrier UL_CC3 of the RRH are represented as DL_3 and UL_f3, respectively. The user equipment measures a downlink resource of the RRH, and recognizes and configures the downlink carrier frequency DL_f3 as a reference frequency.

Downlink operation needs to be performed in the RRH in the method (1) of configuring a reference frequency suitable for an optimum node, which poses a problem in effective use of radio resources. Methods (2) and (3) of configuring a reference frequency suitable for an optimum node are disclosed as the method of solving the above-mentioned problem.

(2) The frequency of the RRH is synchronized with the frequency of the macro cell. The following two (A) and (B) are disclosed as specific examples of the method for synchronization.

(A) The macro cell notifies the RRH of the frequency information. The frequency information may be a reference frequency or downlink carrier frequency. The RRH that has received the frequency information synchronizes the frequency of the RRH with the frequency of the macro cell. The user equipment synchronizes the frequencies based on the frequency of the downlink signal of the macro cell. The frequency of the RRH and the frequency of the macro cell are in synchronization with each other. Therefore, the frequency of the user equipment is synchronized with the frequency of the RRH as a result of the synchronization of the frequency between the user equipment and macro cell.

The following three (a1) to (a3) are disclosed as specific examples of the downlink carrier frequency notified by the macro cell in a case where there are a plurality of downlink component carriers in the macro cell. (a1) Carrier frequency of the downlink component carrier of the PCell. (a2) Carrier frequency of the downlink component carrier of the macro cell linked with the uplink component carrier of the RRH. (a3) Downlink carrier frequency of the macro cell that is recognized as a reference frequency by the user equipment.

The specific example (a1) of the specific example (A) in the method (2) of configuring a reference frequency is described with reference to FIG. 25 described above. The macro cell notifies the RRH of the frequency information. The frequency information is the downlink carrier frequency DL_f1 of the PCell. The RRH synchronizes the carrier frequency DL_13 of the downlink component carrier of the RRH to the frequency information received from the macro cell. The user equipment synchronizes frequencies based on the carrier frequency DL_f1 of the downlink component carrier of the PCell or the carrier frequency DL_f1 of the downlink component carrier of the macro cell.

(B) The RRH receives a downlink signal of the macro cell and synchronizes frequencies based on the frequency of the downlink signal. The user equipment synchronizes frequencies based on the frequency of the downlink signal of the macro cell. The frequency of the RRH and the frequency of the macro cell are in synchronization with each other. Therefore, the frequency of the user equipment is synchronized with the frequency of the RRH as a result of the synchronization of the frequency of the user equipment with the frequency of the macro cell.

The following three (b1) to (b3) are disclosed as specific examples of the downlink carrier frequency of the macro cell, which is received by the RRH, in a case where there are a plurality of downlink component carriers in a macro cell: (b1) carrier frequency of a downlink component carrier of a PCell, (b2) carrier frequency of a downlink component carrier of a macro cell linked with the uplink component carrier of an RRH, and (b3) downlink carrier frequency of a macro cell recognized as a reference frequency by a user equipment.

The specific example (b1) of the specific example (B) in the method (2) of configuring a reference frequency is described with reference to FIG. 25 described above. The RRH receives the downlink carrier frequency DL_f1 of the PCell of the macro cell and synchronizes frequencies based on the downlink carrier frequency DL_f1. The user III equipment synchronizes frequencies based on the frequency DL_f1 of the downlink signal of the macro cell. The frequency of the RRH and the frequency of the macro cell are in synchronization with each other. Therefore, the frequency of the user equipment is synchronized with the frequency of the RRH as a result of the synchronization of the frequency of the user equipment with the frequency of the macro cell.

The following two (1) and (2) are disclosed as specific examples of the method of configuring a parameter suitable for an optimum node.

(1) A macro cell notifies a user equipment of a parameter suitable for an optimum node by dedicated signaling. The conventional addition or modification of a SCell may be used. This enables to construct a communication system having excellent backward compatibility. The notification by dedicated signaling may be transmitted together with an identifier of a target local node, for example, together with the PCI, GCI, and the like. As a result, a parameter suitable for an optimum node can be configured per local node.

(2) A macro cell notifies the user equipment of a parameter suitable for an optimum node using the broadcast information.

The following two (1) and (2) are disclosed as specific examples of the method in which a user equipment starts the use of the configuration of an uplink transmission suitable for an optimum node in uplink, or the method in which a user equipment ends the use of the configuration of an uplink transmission suitable for an optimum node in uplink.

(1) A macro cell notifies a user equipment that the use of the configuration of an uplink transmission suitable for an optimum node in uplink is started and that the use of the configuration of an uplink transmission suitable for an optimum node in uplink is ended. The macro cell notifies, by dedicated signaling, the information indicating the start of the use of the configuration of an uplink transmission suitable for an optimum node in uplink or the information "activation" indicating activation. Or, the macro cell notifies the information indicating the end of the use of the configuration of an uplink transmission suitable for an optimum node in uplink or the information "deactivation" indicating deactivation.

The conventional addition, modification, and removal of a SCell, and activation and deactivation of a SCell may be used. For example, in a case where the addition of a SCell is notified, in a case where a SCell is added by modification, and in a case where the activation of a SCell is notified, the start of the use of the configuration of an uplink transmission suitable for an optimum node in uplink may be notified. Meanwhile, in a case where the removal of a SCell is notified and in a case where the deactivation of a SCell is notified, the end of the use of the configuration of an uplink transmission suitable for an optimum node in uplink may be notified. This enables to construct a communication system having excellent backward compatibility in that a conventional message can also be used.

(2) A macro cell notifies only the start. The macro cell also notifies an effective period, and after a lapse of the effective period from the start, ends the use of the configuration of an uplink transmission suitable for an optimum node in uplink. Alternatively, in the specific examples (1) and (2), the macro cell may notify the start of the use of the configuration of an uplink transmission suitable for an optimum node in uplink based on the notification of a parameter suitable for an optimum node.

Next, a specific example of a sequence of a communication system in the third embodiment is described with reference to FIG. 26. FIG. 26 is a diagram showing an example of the sequence of the communication system in the third embodiment. The sequence shown in FIG. 26 is similar to the sequence shown in FIG. 24, and thus, the same steps are denoted by the same step numbers and common description is not given here.

This operation example discloses a case in which an RRH is located in the coverage of a macro cell, and also discloses a case in which a user equipment camps on the macro cell and an optimum node for uplink is the RRH.

This operation example discloses the specific example (A1) of the specific example (A) in the specific example (1) described above, as a specific example of the method of judging a user equipment located in the coverage of the RRH. This operation example discloses, as a specific example of the method of configuring a parameter suitable for an optimum node, a case of the specific example (1) described above in which a macro cell notifies a user equipment by addition of a SCell.

In Step ST2601, the user equipment camps on the DL_CC1 being a downlink component carrier of the macro cell as a cell having the best downlink reception quality. The carrier frequency of the uplink resource is indicated by the SIB2 in the broadcast information notified by the downlink component carrier DL_CC1. Here, the UL_CC1 of the macro cell is notified. That is, the downlink component carrier and uplink component carrier of the PCell in the user equipment are DL_CC1 and UL_CC1, respectively.

In Step ST2602, the user equipment configures an uplink transmission suitable for the UL_CC1 of the macro cell being a PCell.

In Step ST2603, the DL_CC1 of the macro cell performs a downlink transmission to the user equipment.

In Step ST2604, the user equipment performs an uplink transmission to the UL_CC1 of the macro cell based on the uplink transmission configuration configured in Step ST2602.

In Step ST2605, the user equipment measures a neighboring cell. The user equipment may measure a neighboring cell for judging whether or not the own user equipment is a user equipment that needs support, for judging whether or not the own user equipment is located in the coverage of the RRH, or for determining an optimum node for uplink.

In Step ST2606, the user equipment reports, to the PCell, the measurement results of the neighboring cell performed in Step ST2605. The user equipment reports the measurement results to a control unit of the macro cell via the UL_CC1 of the macro cell.

In Step ST2607, the control unit of the macro cell judges whether or not there is a cell having downlink reception quality higher than a threshold, based on the measurement results reported from the user equipment in Step ST2606. In a case of judging that there is a cell having downlink reception quality higher than the threshold in Step ST2607, the control unit of the macro cell moves to Step ST2608. In a case of judging that there is no cell having downlink reception quality higher than the threshold in Step ST2607, the control unit of the macro cell ends the process and moves to other process. The other process is not specific to the present invention, which is not described here.

In Step ST2608, the control unit of the macro cell determines the user equipment that has reported the measurement results in Step ST2606 as a user equipment that needs support, a specific user equipment, or a user equipment located in the coverage of the RRH.

In Step ST2609, the control unit of the macro cell determines the cell that has been judged to have downlink reception quality higher than the threshold in Step ST2607 as an optimum node in uplink. In this operation example, the control unit determines the UL_CC3 of the RRH as an optimum node in uplink.

In Step ST2407, the macro cell determines the configuration of an uplink transmission suitable for an optimum node in uplink, which has been determined in Step ST2609, of the user equipment that has been determined as a user equipment located in the coverage of the RRH in Step ST2608. Specific examples of the parameters of uplink transmission include a path loss, timing advance command, and reference frequency f.

In Step ST2610, the control unit of the macro cell notifies the user equipment of the addition of a SCell via the PCell of the macro cell. In notifying the addition of a SCell, the UL_CC3 of the RRH being an optimum node in uplink, which has been determined in Step ST2609, is configured as an uplink component carrier of the SCell. The notification of the addition of a SCell includes the configuration of an uplink transmission suitable for an optimum node in uplink, which has been determined in Step ST2407. In notifying the addition of a SCell, a cell having good downlink reception quality is configured as a downlink component carrier. In this operation example, the DL_CC2 of the macro cell is configured as a downlink component carrier.

In Step ST2611, the user equipment configures an uplink transmission suitable for an optimum node in uplink, which has been received in Step ST2610. That is, the user equipment configures an uplink transmission suitable for the SCell added in Step ST2610. Specifically, the user equipment configures an uplink transmission suitable for the UL_CC3 of the RRH.

In Step ST2612, the DL_CC1 of the macro cell performs a downlink transmission to the user equipment. The DL_CC1 of the macro cell performs communication as a PCell.

In Step ST2613, the DL_CC2 of the macro cell performs a downlink transmission to the user equipment. The DL_CC2 of the macro cell performs communication as a SCell.

In Step ST2614, the user equipment performs an uplink transmission to the UL_CC1 of the macro cell based on the uplink transmission configuration configured in Step ST2602. The UL_CC1 of the macro cell performs communication as a PCell.

In Step ST2615, the user equipment performs an uplink transmission to the UL_CC3 of the RRH based on the uplink transmission configuration configured in Step ST2611. The UL_CC3 of the RRH performs communication as a SCell.

The embodiment described above can achieve the following effects. The uplink transmission suitable for an optimum node in uplink is configured, which optimizes the transmission power required by the user equipment. As a result, the power consumption of the user equipment can be reduced. Besides, unnecessary uplink transmission power from the user equipment can be reduced, leading to a reduction in uplink interference.

While the present embodiment has described the configuration of the communication system in a case where a remote radio head (RRH) is used as a local node, the local node is not limited to the RRH but may be a local node other than the RRH. The present embodiment is also applicable to local nodes other than the RRH, whereby similar effects to those of the present embodiment can be achieved.

First Modification of Third Embodiment

A problem to be solved in a first modification of the third embodiment is described below. Even in a case where the third embodiment described above is used, the following problem occurs. The PCell is used for transmission of the PUCCH from the user equipment (see Chapter 7.5 of Non-Patent Document 1). If the third embodiment is merely executed, the PUCCH cannot be transmitted using an optimum node in uplink. Therefore, there still remains a problem with the PUCCH, which has been yet to be solved in the third embodiment.

The optimum node in uplink may be changed to a PCell by the conventional carrier aggregation method. However, a PCell change involves handover processing. In a case where an optimum node in uplink is located in the coverage of the current node, two types of measurement configurations, measurement objects, and reporting configurations are respectively required. This is because the following configurations are necessary; the conventional configuration that supports handover out of the coverage of the current node (see Non-Patent Document 2), and the configuration that supports handover in a case where there is an optimum node in the coverage of the current node in uplink. That is, the handover method becomes complex, leading to a problem of an increased amount of signaling. As described above, the solution to change an optimum node in uplink to a PCell by the conventional carrier aggregation method involves a problem.

A solution in the first modification of the third embodiment is described below. The present modification mainly describes a portion different from the solution in the third embodiment described above, and a portion not to be described is similar to the third embodiment.

In the present modification, carrier aggregation is performed using downlink component carriers without uplink component carriers of the optimum node in downlink, and also carrier aggregation is performed using uplink component carriers without using a downlink component carrier of the optimum node in uplink.

Alternatively, carrier aggregation is performed using downlink component carriers without using uplink component carriers of a macro cell, and also carrier aggregation is performed using uplink component carriers without using a downlink component carrier of the optimum node in uplink. Still alternatively, in uplink of a primary cell (PCell) and in uplink of a secondary cell (SCell), component carriers of an optimum node in uplink are used. Or, the RRH to be installed in the coverage of the cell is dedicated to uplink reception. In the present modification, a SCell needs not to be specifically configured.

Figure 27:
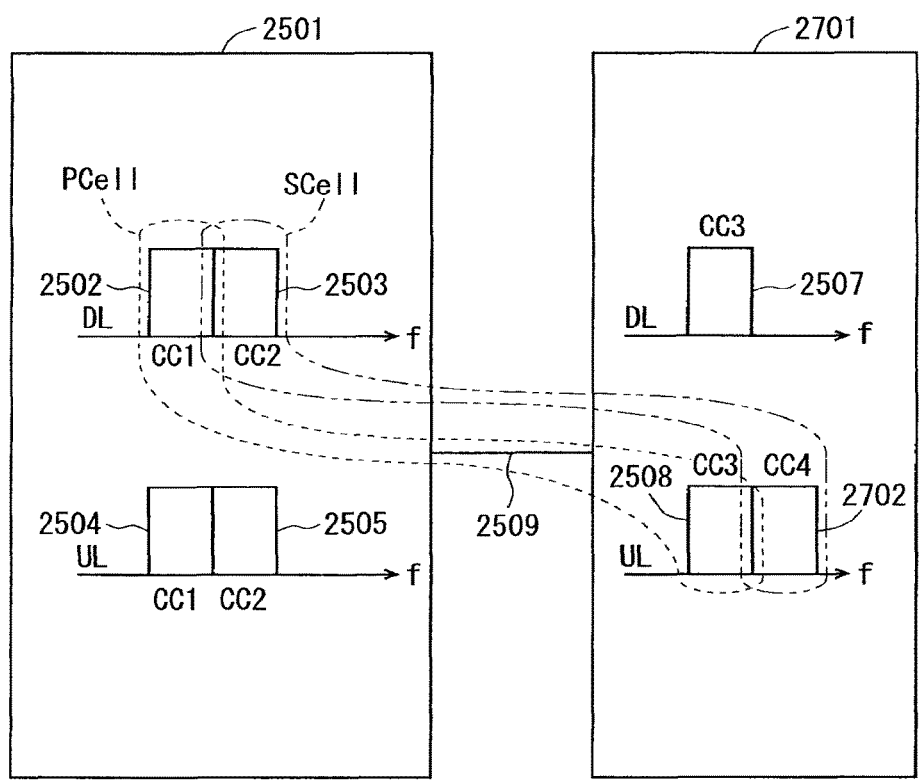
FIG. 27 is a diagram for describing the concept of a solution in a first modification of the third embodiment.

The concept of the solution in the first modification of the third embodiment is described with reference to FIG. 27. FIG. 27 is a diagram for describing the concept of the solution in the first modification of the third embodiment. The diagram shown in FIG. 27 is similar to the diagram shown in FIG. 25, and thus, portions corresponding to those of FIG. 25 are denoted by the same reference symbols and common description is not given here.

The macro cell 2501 includes the DL_CC1 denoted by reference numeral 2502 and the DL_CC2 denoted by reference numeral 2503 as downlink component carriers. The macro cell 2501 also includes the UL_CC1 denoted by reference numeral 2504 and the UL_CC2 denoted by reference numeral 2505 as uplink component carriers.

An RRH 2701 includes a DL_CC3 indicated by reference numeral 2507 as a downlink component carrier. The RRH 2701 also includes the UL_CC3 indicated by reference numeral 2508 and a UL_CC4 indicated by reference numeral 2702 as uplink component carriers. The macro cell 2501 and the RRH 2701 are connected through the dedicated line 2509.

The user equipment selects the DL_CC1 indicated by reference numeral 2502 of the macro cell as a cell having the best downlink reception quality, and camps on the DL_CC1 (see Non-Patent Document 3). That is, the DL_CC1 indicated by reference numeral 2502 of the macro cell serves as a downlink primary component carrier of a PCell.

In the first modification of the third embodiment, carrier aggregation is performed using the DL_CC1 and DL_CC2 being downlink component carriers without using the UL_CC1 and UL_CC2 being uplink component carriers of the macro cell 2501 being an optimum node in downlink. Also, carrier aggregation is performed using the UL_CC3 and UL_CC4 being uplink component carriers without using the DL_CC3 being a downlink component carrier of the RRH 2701 being an optimum node in uplink.

Alternatively, carrier aggregation is performed using the DL_CC1 and DL_CC2 being downlink component carriers without using the UL_CC1 and UL_CC2 being uplink component carriers of the macro cell 2501. Also, carrier aggregation is performed using the UL_CC3 and UL_CC4 being uplink component carriers without using the DL_CC3 being a downlink component carrier of an optimum node in uplink.

Still alternatively, in uplink of a primary cell (PCell) and uplink of a secondary cell (SCell), the UL_CC3 and UL_CC4 being uplink component carriers of the RRH 2701 being an optimum node in uplink are used.

That is, the PCell for the user equipment, which is indicated by a broken line in FIG. 27, is composed of the DL_CC1 and the UL_CC3. The SCell indicated by a chain double-dashed line in FIG. 27 is composed of the DL_CC2 and the UL_CC4.

A specific example of the method of using the uplink component carrier of the optimum node in uplink for carrier aggregation is disclosed below. The uplink component carrier of the optimum node in uplink is subjected to carrier aggregation for a specific user equipment.

The method of selecting an uplink for carrier aggregation is similar to a specific example of the method of determining an optimum node for uplink in the second embodiment described above, which is not described here.

A specific example of the method in which a PCell uses an uplink component carrier of an optimum node in uplink for carrier aggregation is disclosed below. The PCell notifies a specific user equipment of the uplink component carrier of an optimum node in uplink as a modification of the uplink component carrier of the PCell. Similarly to the addition and modification of a SCell, "RRC Connection Reconfiguration message" of dedicated RRC signaling is used. This enables to construct a communication system having excellent backward compatibility.

The present modification is characterized in that the uplink component carrier of the PCell is not linked by the SIB2 of the broadcast information. This is because in a case where, for example, there is no local node in the coverage of the macro cell, the optimum node in downlink serves as an optimum node in uplink. Even if there is a local node in the coverage of the macro cell, in a case where, for example, a user equipment is located nearer the macro cell than the local node, an optimum node in downlink serves as an optimum node in uplink. Therefore, the SIB2 shows the uplink resource on the same node as in a conventional case. For example, the uplink resource carrier UL_CC1 is shown by the SIB2 in the broadcast information notified by the downlink component DL_CC1. As in the present modification, a specific user equipment whose optimum node differs between downlink and uplink, is notified of the link with the UL_CC3 using dedicated RRC signaling.

The first modification of the third embodiment described above can achieve the following effects in addition to the effects of the third embodiment. As to the PUCCH, an uplink transmission suitable for an optimum node in uplink is configured, which optimizes the transmission power required by the user equipment. As a result, the power consumption of the user equipment can be reduced. In addition, unnecessary uplink transmission power from the user equipment can be reduced, leading to a reduction in uplink interference.

While the present modification has described the configuration of the communication system in a case where a remote radio head (RRH) is used as a local node, the local node is not limited to the RRH but may be a local node other than the RRH. The present modification is also applicable to local nodes other than the RRH, whereby similar effects to those of the present modification can be achieved.

Fourth Embodiment

A problem to be solved in a fourth embodiment is described below. Non-Patent Document 11 discloses the solution to an inter-cell interference problem in a heterogeneous network. Specifically, it is described that a pico cell is installed in the coverage of a macro cell, and a user equipment accesses the pico cell when the user equipment comes closer to the pico cell.

The details disclosed in Non-Patent Document 11 are described with reference to FIG. 16 described above. Description is given here by replacing the RRH 1603 shown in FIG. 16 with a pico cell. That is, a case in which the pico cell is installed in the coverage of the macro cell is assumed. The pico cell 1603 is installed in the coverage 1602 of the macro cell 1601. The pico cell 1603 has the coverage 1604. A user equipment is located near the macro cell 1601, and the user equipment communicates with the macro cell 1601. In a case where the user equipment moves closer to the pico cell 1603, the user equipment accesses the pico cell.

In a case where the optimum node in downlink is changed from the macro cell 1601 to the local node installed in the coverage 1602 of the macro cell 1601, that is, to the pico cell 1603 as described above, a handover occurs.

To allow the handover as described above, two types of measurement configurations, measurement objects, and reporting configurations are required respectively. This is because the following configurations are necessary; the conventional configuration that supports a handover out of the coverage of the current node (see Non-Patent Document 2), and the configuration that supports a handover in a case where there is an optimum node in the coverage of the current node in uplink. That is, the handover method becomes complex, leading to a problem of an increased amount of signaling.

As described above, a PCell in carrier aggregation is changed only through a handover. This causes a problem when an optimum node is changed to a PCell in uplink, as described above.

A solution in the fourth embodiment is described below. In the present embodiment, a carrier frequency of an RRH is different from a carrier frequency of a macro cell and a handover by a user equipment from the macro cell to the RRH being served by the macro cell is prohibited. Alternatively, a handover by a user equipment to a cell being served by a serving cell is prohibited. That is, even if the user equipment comes closer to the RRH being served by the macro cell, a handover to the RRH is not allowed. A specific example of the RRH being served by the macro cell and a specific example of the cell being served by the serving cell are similar to the specific examples of the RRH being served by the macro cell in the first embodiment described above, which are not described here.

A change of a PCell to an RRH being served by a macro cell is prohibited. Alternatively, a change of a PCell to a component carrier formed by a cell being served by a serving cell is prohibited.

In the fourth embodiment, a handover is prohibited even in the case where an optimum node in downlink is changed as described above. In this case, the downlink reception quality may worsen and a communication state in downlink may become worse, but a characteristic point of the solution in the fourth embodiment is as follows.

A cell to which a handover is prohibited in the fourth embodiment is, for example, a cell being served by a serving cell. The following three (1) to (3) are disclosed as specific examples of the cell being served by a serving cell. (1) Cell connected with the serving cell by a dedicated line. (2) Cell sharing the functionality of the serving cell. (3) Cell located in the coverage of the serving cell. Even if the solution in the fourth embodiment is carried out, the carrier frequency of the macro cell being a serving cell is different from the carrier frequency of the RRH, and thus, the downlink reception quality is not degraded. In a case where the RRH is located in the coverage of the serving cell, the downlink reception quality is not degraded because the downlink reception quality with respect to the serving cell is satisfied.

Whether or not the fourth embodiment is performed may be judged in accordance with the coverage size of the RRH being served by a macro cell or the cell being served by a serving cell. In this case, if, for example, the coverage of the RRH is larger than a threshold, it is judged that the fourth embodiment is not performed. Meanwhile, if the coverage of the RRH is smaller than the threshold, it is judged that the fourth embodiment is performed.

In the judgment of the coverage size, the downlink transmission power of the RRH being served by the macro cell or the cell being served by the serving cell may be used. In this case, it is judged that the fourth embodiment is not performed in a case of, for example, an RRH in high-power transmission. Meanwhile, it is judged that the fourth embodiment is performed in a case of an RRH not in high-power transmission.

The fourth embodiment described above can prevent the handover method from becoming complex, which solves a problem of an increased amount of signaling due to the complicated handover method.

While the present embodiment has disclosed the case in which the carrier frequency of the local node is different from the carrier frequency of the macro cell, the present embodiment is also applicable to a case in which the carrier frequency of the local node is identical to the carrier frequency of the macro cell.

Further, while the present embodiment has described the configuration of the communication system in a case where a remote radio head (RRH) is used as a local node, the local node is not limited to the RRH but may be a local node other than the RRH. The present embodiment is also applicable to local nodes other than the RRH, which enables to achieve similar effects to those of the present embodiment.

First Modification of Fourth Embodiment

A problem to be solved in a first modification of the fourth embodiment is described below. Even in a case where the fourth embodiment described above is used, the same problem as those of the first embodiment and second embodiment described above arises. A solution in the first modification of the fourth embodiment is described below.

In the present modification, the first embodiment, first modification of the first embodiment, and second embodiment are performed in addition to the fourth embodiment described above. Alternatively, in the present modification, the third embodiment described above is performed in addition to the fourth embodiment described above.

The first modification of the fourth embodiment above can achieve the following effects in addition to the effects of the fourth embodiment. An uplink transmission suitable for an optimum node in uplink is configured, which optimizes the transmission power required by the user equipment. As a result, the power consumption of the user equipment can be reduced. In addition, unnecessary uplink transmission power from the user equipment can be reduced, leading to a reduction in uplink interference.

Second Modification of Fourth Embodiment

A problem to be solved in a second modification of the fourth embodiment is described below. Even in a case where the third embodiment is performed in addition to the fourth embodiment in the first modification of the fourth embodiment described above, the same problem as that of the first modification of the third embodiment described above arises. A solution in the second modification of the fourth embodiment is described below.

In the present modification, the first modification of the third embodiment described above is performed in addition to the first modification of the fourth embodiment described above. Also, the uplink component carrier of the RRH being served by a macro cell can be used as an uplink component carrier of a PCell. Alternatively, the uplink component carrier of a cell being served by the serving cell can be used as an uplink component carrier of a PCell.

The second modification of the fourth embodiment above can achieve the following effects in addition to the effects of the first modification of the fourth embodiment. As to the PUCCH, an uplink transmission suitable for an optimum node in uplink is configured, which optimizes the transmission power required by the user equipment. As a result, the power consumption of the user equipment can be reduced. In addition, unnecessary uplink transmission power from the user equipment can be reduced, leading to a reduction in uplink interference.

Third Modification of Fourth Embodiment

A third modification of the fourth embodiment discloses another solution to the same problem as that of the second modification of the fourth embodiment described above.

In the present modification, the RRH is provided with a function of receiving an uplink component carrier of a macro cell in addition to that of the first modification of the fourth embodiment described above. Alternatively, the RRH may be provided with a function of receiving an uplink component carrier of a PCell of a macro cell. Still alternatively, the RRH may be only provided with a function of receiving the PUCCH among the uplink component carriers of the PCell of the macro cell.

The third modification of the fourth embodiment above can achieve the following effects in addition to the effects of the first modification of the fourth embodiment described above. As to the PUCCH, an uplink transmission suitable for an optimum node in uplink is configured, which optimizes the transmission power required by the user equipment. As a result, the power consumption of the user equipment can be reduced. In addition, unnecessary uplink transmission power from the user equipment can be reduced, leading to a reduction in uplink interference.

Fifth Embodiment

A problem to be solved in a fifth embodiment is described below. The local node conceivably has a smaller coverage than that of a macro cell. It is conceivable that in a case where the user equipment is moving, the user equipment may pass through the coverage of the local node in a short period of time. The following problem arises in a case where an "uplink transmission suitable for optimum node is configured" using the second embodiment, third embodiment, first modification of the third embodiment, first modification of the fourth embodiment, second modification of the fourth embodiment, and third modification of the fourth embodiment described above.

The problem to be solved in the fifth embodiment is described with reference to FIG. 28. FIG. 28 is a diagram for describing the problem of the fifth embodiment. The diagram shown in FIG. 28 is similar to the diagram shown in FIG. 21, and thus, the portions corresponding to those of FIG. 21 are denoted by the same reference numerals and common description is not given here.

An uplink transmission suitable for a local node being an optimum node is configured. As a result, the uplink transmission power of the user equipment serves as the uplink transmission power suitable for the local node. The user equipment 2101 performs an uplink transmission to the macro cell 2102 using the uplink 2106. In FIG. 28, the magnitude of the uplink transmission power is indicated by an arrow length of the uplink 2106. With reference to FIG. 28, the uplink transmission from the user equipment 2101 can be received in the range of a circle indicated by reference numeral 2108. That is, the macro cell 2102 cannot receive the uplink transmission from the user equipment 2101 after the uplink transmission power of the user equipment 2101 is adjusted to the uplink transmission configuration suitable for a local node being an optimum node. However, the RRH 2103 can receive the uplink transmission from the user equipment 2101.

Next, a case in which the user equipment has moved out of a coverage 2801 of the RRH 2103 is considered here. A user equipment 2101-2 performs an uplink transmission to the macro cell 2102 using an uplink 2106-2. In FIG. 28, the uplink transmission power is indicated by an arrow length of the uplink 2106-2. With reference to FIG. 28, the uplink transmission of the user equipment 2101 can be received in a range of a circle indicated by reference numeral 2108-2. That is, the macro cell 2102 cannot receive the uplink transmission from the user equipment 2101-2 in a case where the uplink transmission power of the user equipment 2101-2 has been adjusted to the uplink transmission configuration suitable for a local node being an optimum node and the user equipment has moved out of the coverage of the optimum node. In addition, the RRH 2103 cannot receive the uplink transmission from the user equipment 2101-2.

In this case, it is conceivable that a reception error may occur in the uplink transmission from the user equipment to the macro cell as described above. This causes a problem of a throughput reduction in uplink transmission.

The solution in the fifth embodiment is described below. Whether or not an "uplink transmission suitable for an optimum node" is configured is judged in accordance with a moving speed of the user equipment. Specifically, whether or not to perform the second embodiment, third embodiment, first modification of the third embodiment, first modification of the fourth embodiment, second modification of the fourth embodiment, and third modification of the fourth embodiment is judged in accordance with a moving speed of a user equipment. For example, in a case where the moving speed of the user equipment is higher than a predetermined threshold, an "uplink transmission suitable for an optimum node" is not configured. Meanwhile, in a case where the moving speed of the user equipment is lower than the predetermined threshold, an "uplink transmission suitable for an optimum node" is configured.

An effective period in which an "uplink transmission suitable for an optimum node" is configured may be distinguished in accordance with the moving speed of the user equipment. For example, in a case where the moving speed of the user equipment is higher than the predetermined threshold, an effective period in which an "uplink transmission suitable for an optimum node" is configured is set to be shorter than a predetermined reference period. Meanwhile, in a case where the moving speed of the user equipment is lower than the predetermined threshold, an effective period in which an "uplink transmission suitable for an optimum node" is configured is set to be equal to or longer than a reference period.

A specific example of the method of recognizing the moving speed of the user equipment is described below. It is possible to apply, for example, the method of recognizing the moving speed based on the number of cell reselections by a user equipment, whose standardization is pursued by 3GPP, the method of recognizing the moving speed based on Doppler frequency measurements, which is described in R2-075149 by 3GPP, and the method of recognizing the moving speed based on the positional information of a user equipment, which is acquired using a global positioning system (GPS).

The fifth embodiment above can achieve the following effects. An uplink transmission suitable for an optimum node for uplink is configured as in, for example, the third embodiment described above, which optimizes the transmission power required by the user equipment. As a result, the power consumption of the user equipment can be reduced. In addition, unnecessary uplink transmission power from the user equipment can be reduced, leading to a reduction in uplink interference. Further, even in a case where the local node has a relatively smaller coverage than that of a macro cell and the user equipment is moving, an occurrence of reception error in uplink transmission from the user equipment to the macro cell can be prevented.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

901 EPC communication unit, 902 communication with another base station unit, 903 protocol processing unit. 904 transmission data buffer unit. 905 encoding unit, 906 modulating unit, 907 frequency converting unit, 908 antenna, 909 demodulating unit, 910 decoding unit, 911 control unit, 1401, 1502, 1503, 1603 remote radio head (RRH), 1402, 1501, 1601 macro cell, 1403, 1504 dedicated line, 1602, 1604 coverage.

The invention claimed is:

1. A user equipment performing radio communication with a base station which configures a primary cell and a secondary cell,
   wherein the user equipment is configured to be informed, from the primary cell, of a timing advance for use in communicating to the secondary cell, the timing advance indicating an uplink transmission timing alignment value, and
   wherein the user equipment is configured to set a timing advance for use in communicating to the primary cell and the timing advance for use in communicating to the secondary cell and perform radio communication via carrier aggregation (CA) simultaneously over the primary cell and the secondary cell based on the set timing advance for each of the primary cell and the secondary cell, wherein the timing advance for use in communicating to the primary cell is different from the timing advance for use in communicating to the secondary cell, the timing advance for use in each of the primary cell and the secondary cell being configured to cause communication from the user equipment to a node in the primary cell and to a node in the secondary cell to arrive at each of the nodes at a same time,
   wherein the uplink transmission timing alignment value indicated by the set timing advance for each of the primary cell and the secondary cell indicates an added amount of timing advance or delay for the user equipment to wait before the user equipment sends a radio frequency signal for communication with each of the primary cell and the secondary cell respectively.

2. A base station, which configures a primary cell and a secondary cell, used in a communication system comprising the base station and a user equipment performing radio communication with the base station, the base station comprising:
   a transmitter configured to inform, via the primary cell, the user equipment of a timing advance for use in communicating to the secondary cell, the timing advance indicating an uplink transmission timing alignment value; and
   a receiver, wherein the transmitter and the receiver are configured to perform communication with the user equipment, such that the user equipment performs communication via carrier aggregation (CA) simultaneously over the primary cell and the secondary cell based on a timing advance for use in communicating to the primary cell and the timing advance for use in communicating to the secondary cell informed to the user equipment, wherein the timing advance for use in communicating to the primary cell is different from the timing advance for use in communicating to the secondary cell, the timing advance for use in each of the primary cell and the secondary cell being configured to cause communication from the user equipment to a node in the primary cell and to a node in the secondary cell to arrive at each of the nodes at a same time,
   wherein the uplink transmission timing alignment value indicated by the timing advance for each of the primary cell and the secondary cell indicates an added amount of timing advance or delay for the user equipment to wait before the user equipment sends a radio frequency signal for communication with each of the primary cell and the secondary cell respectively.

3. A user equipment performing radio communication with a base station which configures a primary cell and a secondary cell, the user equipment comprising:
   a controller;
   a transmitter that receives transmit data from the controller, converts the transmit data to first and second radio frequency signals, sends the first radio frequency signal for communication with the primary cell according to a first timing advance set by the controller, and sends the second radio frequency signal for communication with the secondary cell according to a second timing advance set by the controller, such that the user equipment perform radio communication via carrier aggregation (CA) simultaneously over the primary cell and the secondary cell based on the first timing advance and the second timing advance, wherein the first timing advance is different from the second timing advance, the timing advance for use in each of the primary cell and the secondary cell being configured to cause communication from the user equipment to a node in the primary cell and to a node in the secondary cell to arrive at each of the nodes at a same time; and
   a receiver that receives the radio frequency signals, converts the radio frequency signals to received data, and sends the received data to the controller,
   wherein the controller is programmed to receive the received data including information regarding at least one of the first timing advance and the second timing advance, the first timing advance indicating a first uplink transmission timing alignment value and the second timing advance indicating a second uplink transmission timing alignment value,
   wherein the first uplink transmission timing alignment value indicates a first added amount of timing advance or delay for the user equipment to wait before the transmitter sends the first radio frequency signal for communication with the primary cell, and the second uplink transmission timing alignment value indicates a second added amount of timing advance or delay for the user equipment to wait before the transmitter sends the second radio frequency signal for communication with the secondary cell.

4. The user equipment according to claim 3, wherein the radio frequency signals including the information regarding the second timing advance received by the receiver are transmitted from the primary cell.

5. The user equipment according to claim 3, wherein a first distance between the user equipment and the primary cell is different from a second distance between the user equipment and the secondary cell, and the first and second uplink transmission timing alignment values are used to compensate for a difference in radio signal propagation delay timing resulting from the difference between the first distance and the second distance.

* * * * *